US012800077B2

(12) United States Patent
Ripple et al.

(10) Patent No.: US 12,800,077 B2
(45) Date of Patent: Nov. 17, 2026

(54) SYSTEMS FOR DISCONNECTING A HYDRAULIC FRACTURING PUMP FROM A HYDRAULIC FRACTURING MISSILE

(71) Applicant: Paloma Technology Holdings LLC, Midland, TX (US)

(72) Inventors: Robert Ripple, Richmond, TX (US); Bryan Wilborn, Midland, TX (US); Roman Eddie Cline, Midland, TX (US); Colton Trego, Odessa, TX (US)

(73) Assignee: Paloma Technology Holidings LLC, Midland, TX (US)

( * ) Notice: Subject to any disclaimer, the term of this patent is extended or adjusted under 35 U.S.C. 154(b) by 0 days.

(21) Appl. No.: 19/301,969

(22) Filed: Aug. 16, 2025

(65) Prior Publication Data

US 2026/0168602 A1 Jun. 18, 2026

Related U.S. Application Data

(60) Provisional application No. 63/684,736, filed on Aug. 19, 2024.

(51) Int. Cl.
*F16L 25/04* (2006.01)

(52) U.S. Cl.
CPC .................................... *F16L 25/04* (2013.01)

(58) Field of Classification Search
CPC ....................................................... F16L 25/04
See application file for complete search history.

(56) References Cited

U.S. PATENT DOCUMENTS

| | | | | | |
|---|---|---|---|---|---|
| 2,907,242 | A * | 10/1959 | Chakroff | F16L 19/005 285/38 |
| 3,353,847 | A * | 11/1967 | Brown | F16L 37/002 285/321 |
| 3,608,932 | A * | 9/1971 | Brown | E21B 33/038 285/912 |
| 10,683,708 | B2 * | 6/2020 | Hill | F04B 53/22 |
| 11,242,950 | B2 * | 2/2022 | Johnson | F16L 37/05 |
| 11,396,799 | B2 | 7/2022 | Johnson et al. | |
| 11,591,889 | B2 | 2/2023 | Johnson et al. | |
| 11,655,926 | B2 | 5/2023 | Johnson et al. | |
| 11,959,358 | B2 | 4/2024 | Beason et al. | |
| 12,071,843 | B2 | 8/2024 | Johnson et al. | |
| 12,117,113 | B2 * | 10/2024 | Post | F04B 53/22 |
| 12,140,259 | B2 | 11/2024 | Johnson et al. | |
| 2017/0212535 | A1 | 7/2017 | Shelman et al. | |
| 2018/0045331 | A1 | 2/2018 | Lopez et al. | |
| 2024/0418067 | A1 | 12/2024 | Johnson et al. | |

* cited by examiner

*Primary Examiner* — Eric Keasel
(74) *Attorney, Agent, or Firm* — E. Randall Smith; E. Randall Smith, PC

(57) ABSTRACT

Systems for disconnecting the respective interconnected high pressure (HP) and low pressure (LP) fluid flow lines extending between a hydraulic fracturing (frac) pump and a frac missile are provided. Certain embodiments involve a disconnect trailer separate and distinct from the frac pump, its carrier and the frac missile. First and second rotation drivers are disposed on the disconnect trailer and configured to engage and rotate at least part a corresponding connector coupled between the respective interconnected HP and LP fluid flow lines without any personnel in the red zone.

23 Claims, 29 Drawing Sheets

SYSTEMS FOR DISCONNECTING A HYDRAULIC FRACTURING PUMP FROM A HYDRAULIC FRACTURING MISSILE

CROSS REFERENCE TO RELATED APPLICATIONS

The present application claims priority to U.S. Provisional Patent Application Ser. No. 63/684,736 filed on Aug. 19, 2024 and entitled "Apparatus, Systems & Methods for Disconnecting a Frac Pump from a Frac Missile and Related Apparatus, Systems & Methods", the entire contents of which are hereby incorporated by reference herein.

FIELD OF THE DISCLOSURE

The present disclosure relates generally to improved hydraulic fracturing operations and related systems, apparatus and methods. In various embodiments, the present disclosure relates to systems, apparatus and methods for disconnecting, and possibly also connecting, one or more hydraulic fracturing pumps (or other components) from a hydraulic fracturing missile (or other components).

BACKGROUND

Hydraulic fracturing ("frac") operations typically include the process of pressurizing a mixture of water, proppant and chemicals ("frac fluid") and then sending it into the well(s). Most commonly, one or more frac blenders (or other sources) will deliver the frac fluid at low pressure (LP) to a frac missile. The frac missile, sometimes referred to as a frac manifold, frac pump output-header or by other names, then usually directs the frac fluid at low pressure to one or more "frac pumps, which will pressurize the frac fluid and deliver it back to the frac missile at high pressure (HP). For the reader's convenience, this general process is sometimes referred to herein as the "pressurization" operation or process. From the frac missile, the pressurized frac fluid is directed to the well(s) or other destinations (e.g., zipper manifold).

The frac missile typically includes a "LP side" having one or more LP fluid flow lines which receives the frac fluid and directs it to the frac pumps, and a "HP side" having one or more HP fluid flow lines that receive the frac fluid from the frac pumps and directs it to the desired destinations. Consistent with that, the frac pump normally has at least one LP fluid flow line that will be fluidly coupled to the LP line of the frac missile (e.g., at a LP line outlet port) for receiving the frac fluid therefrom and at least one HP fluid flow line fluidly coupled to the HP line of the frac missile (e.g., at a HP line inlet port) for returning the frac fluid under high pressure.

At the hydraulic fracturing job site or frac pad, the frac missile is located within an area known as the "red zone." The red zone is a high-risk area where personnel can be exposed to increased hazards, particularly those associated with pressurized equipment and potential equipment failures and thus requires strict safety protocols. At least during the pressurization operations, it is desirable that no personnel be within the red zone to help minimize risks and ensure the safety of personnel.

Most frac jobs currently require many frac pumps (e.g., up to twenty or more) coupled to the frac missile. Each frac pump is carried on a separate trailer or truck ("frac pump carrier"), the combination of which is sometime referred to as a well fracturing pump unit, hydraulic frac pump or pump unit. The pump units are very expensive, large, heavy-duty vehicles normally having a length of at least 50', a width of at least 8.0', a height of at least 13' and a weight of at least 60,000 lbs. Presently, the cost of renting a pump unit can often range from $40,000-160,000 and be the biggest expense at a frac job. Any period when the fracturing operations are halted or delayed, such as when a frac pump is not actively engaged in pressurizing and pumping fracturing fluid (sometimes referred to as Non-Productive Time (NPT)), can negatively impact efficiency, cost-effectiveness and overall operational goals of the frac job. Presently, NPT is said to cost $40,000 or more per hour.

Due to the nature of the pressurization process, frac pumps often need to be taken off-line for inspection, servicing, maintenance, replacement or other reasons during frac operations. This requires, among other things, disconnecting the respective LP and HP flow lines that connect the frac pump and frac missile. Presently known frac pump disconnect systems are believed to have one or more disadvantages. For example, conventional techniques can require personnel in the red zone and shutting down the entire frac job (the frac missile, frac pumps, frac blender, wireline operations), causing costly delays and, at times, jeopardizing the well's viability or integrity and slowing other operations, such as wireline operations (sometimes referred to as electrical line or E-line operations).

For other examples, at least one known frac pump disconnect system involves the use of complex, specialized equipment that is expensive and requires (non-offthe-shelf) frac pump disconnect system Original Equipment Manufacturer (OEM) components that are often not readily available, may need to be custom-ordered and/or obtained from or worked on by particular machine shops having specialized machines, equipment and/or tooling, increasing costs and potential NPT (e.g., when parts are needed at the job site). Due to the complexity of these systems and their use, frac pump disconnect OEM personnel typically need to be present during operations, causing potential delays and increased costs. The system's complexity also adds multitudes of potential failure points to the pressurization operation.

For yet further examples, these frac pump disconnect systems normally require a specialized, automated frac missile and are thus believed to be incompatible with any other (existing) missiles, adding exorbitant cost, failure points and potential NPT. In addition, these systems ordinarily cannot be used with existing pump units, but require custom modification by the frac pump disconnect OEM of each pump unit to be used. The process of sending any, or entire fleets of, pump units to the frac pump disconnect OEM for modification and subject to the OEM's scheduling and specialized personnel availability can translate into numerous weeks of down-time and enormous lost opportunity costs to the pump unit owners.

For still further examples, these frac pump disconnect systems commonly involve the use of valves that need to be maintained with grease and the frac pump disconnect OEM's specialized auto-grease system, which is costly and adds more potential failure points. Also, it is believed these systems may sometimes vibrate substantially during operations, which can cause premature wear, damage, leakage, malfunction or have other undesirable effects on components. For another example, a major component of these frac pump disconnect systems rests on the ground at the frac site between the frac missile and pump unit. This component is not mobile or coupled to, or carried by, the pump unit and thus requires a separate vehicle to move it into and out of the red zone and between locations, adding time and complexity to the operations.

It should be understood that the above-described disadvantages, limitations, features, capabilities, examples and other details are provided for illustrative purposes only and are not intended to limit the scope or subject matter of this disclosure or the appended claims. Thus, none of the claims of this patent or any related patent should be limited by the above discussion or construed to address, include or exclude each or any such disadvantages, limitations, features, capabilities, examples or details merely because of their mention above.

Accordingly, there exists a need for improved systems, apparatus and methods for disconnecting (and potentially also connecting) a frac pump from a frac missile and related systems, apparatus and methods.

BRIEF SUMMARY OF EXEMPLARY EMBODIMENTS

In various embodiments, the present disclosure involves systems for rotatably disconnecting a first HP fluid flow line coupled to a frac pump from a second HP fluid flow line of a frac missile, and a first LP fluid flow line coupled to the frac pump from a second LP fluid flow line of the frac missile, without any personnel in the red zone. The frac pump is disposed on a frac pump carrier and these systems include a disconnect trailer separate and distinct from the frac pump, frac pump carrier and frac missile. The disconnect trailer is movable with the frac pump carrier toward and away from the frac missile in the red zone.

A first portion of a HP line connector is associated with the first HP fluid flow line and a second portion of the HP line connector is associated with the second HP fluid flow line. At least part of each of the first and second HP line connector portions is rotatably engageable with and disengageable from at least part of the other respective HP line connector portion to rotatably connect and disconnect the first and second HP line connector portions. Rotatable disengagement of the first and second HP line connector portions disengages the first and second HP fluid flow lines from one another. At least a first rotation driver is disposed on the disconnect trailer and configured to engage and rotate at least part of one of the first and second HP line connector portions into and out of engagement with at least part of the other respective HP line connector portion without any personnel in the red zone.

A first portion of a LP line connector is associated with the first LP line and a second portion of the LP line connector is associated with the second LP line. At least part of each of the first and second LP line connector portions is rotatably engageable with and disengageable from at least part of the other respective LP line connector portion to rotatably connect and disconnect the first and second LP line connector portions. Rotatable disengagement of the first and second LP line connector portions disengages the first and second LP lines from one another. At least a second rotation driver is disposed on the disconnect trailer and configured to engage and rotate at least part of one of the first and second LP line connector portions into and out of engagement with at least part of the other respective LP line connector portion without any personnel in the red zone.

At least one switch is configured to actuate the first and second drivers and is selectively operable by personnel outside the red zone. The disconnect trailer is configured to be movable with the frac pump carrier away from the frac missile and red zone after the respective LP and HP flow lines are disconnected.

The following features are optional. The switch(es) may include at least one manually-operated "on-off" lever or button, at least one key or at least one keystroke of an electronic device. At least one actuator may be associated with the first and second rotation drivers, disposed on the disconnect trailer and configured to selectively rotate the first and second rotation drivers without any personnel in the red zone. A first actuator may be associated with and configured to selectively rotate the first rotation driver and a second actuator may be associated with and configured to selectively rotate the second rotation driver. The switch(es) may be configured to actuate the actuator(s). A first switch may be associated with and configured to actuate the first actuator and a second switch may be associated with and configured to actuate the second actuator.

The first and second portions of the HP line connector may be threadably engageable. At least part of one of the first and second HP line connector portions may include male threads and at least part of the other of the first and second HP line connector portions may include corresponding female threads engageable with the male threads. One of the first and second HP line connector portions may include a threaded nut rotatably engageable with the other respective HP line connector portion. The first rotation driver may be configured to engage and rotate the threaded nut. The HP line connector may be a hammer union (HU) connector, wherein the first or second HP line connector portion may include a HU nut that is rotatable into and out of threadable engagement with the other HP connector portion and the first rotation driver may be configured to engage and rotate the HU nut.

At least a first gear wheel may be rotatably coupled to the first rotation driver. The first gear wheel may be configured to be selectively actuated to help rotate the first rotation driver. A first gearbox may be disposed on the disconnect trailer, the front end of which is configured to be closer to the frac missile and the rear end of which is configured to be closer to the frac pump during operation of the first rotation driver. The first gearbox may at least partially house the first rotation driver and first gear wheel.

The first and second portions of the HP line connector may be threadably engageable, wherein at least part of the first HP line connector portion includes male threads and at least part of the second HP line connector portion includes corresponding female threads. A HP connection line may be coupled between the first and second HP fluid flow lines. The HP fluid flow connection line may include at least a first pipe section, which is coupled to the first HP fluid flow line and carries the first HP line connector portion, and at least a second pipe section, which is coupled to the second HP fluid flow line and carries the second HP line connector portion. The first and second pipe sections of the HP fluid flow connection line may be configured to be engaged and disengaged to connect and disconnect the first and second HP fluid flow lines. The first pipe section may be configured to extend from the first HP fluid flow line into the first gearbox from the rear end toward the front end thereof and the second pipe section may be configured to extend from the second HP fluid flow line to the front end of the first gearbox.

At least one stop may be associated with the first pipe section and configured to prevent the first pipe section from sliding forward in the first gearbox during disconnection of the first and second pipe sections. A first yoke may be configured to be rigidly engageable with the second pipe section and releasably engageable with the first gearbox. The first yoke may be configured to prevent rotation of the second pipe section during actuation of the first rotation driver.

In some embodiments, the present disclosure involves systems for rotatably disconnecting a first HP fluid flow line fluidly coupled to a frac pump from a second HP fluid flow line fluidly coupled to a frac missile without any personnel in the red zone. The frac pump is disposed on a frac pump carrier and these systems require at least one HP fluid flow connection line fluidly coupled between the first and second HP fluid flow lines. The HP fluid flow connection line includes at least a first pipe section that is fluidly coupled to the first HP fluid flow line and carries a male threaded portion of a connector and at least a second pipe section that is fluidly coupled to the second HP fluid flow line and carries a female threaded portion of the connector. The first and second pipe sections are configured to be engaged and disengaged to connect and disconnect the first and second HP fluid flow lines. These systems also include a wheeled carrier separate and distinct from the frac pump, frac pump carrier and frac missile. The wheeled carrier is movable toward and away from the frac missile in the red zone.

At least a first rotation driver is disposed on the wheeled carrier and configured to engage and rotate the male threaded portion of the connector into and out of engagement with the female threaded portion of the connector without any personnel in the red zone. A first gearbox is disposed on the wheeled carrier and at least partially houses the first rotation driver. The front end of the first gearbox is configured to be closer to the frac missile and the rear end thereof is configured to be closer to the frac pump. The first pipe section is configured to extend from the first HP fluid flow line into the first gearbox from the rear end toward the front end thereof and the second pipe section is configured to extend from the second HP fluid flow line to the front end of the first gearbox. A first yoke is rigidly engageable with and rotationally lockable to the second pipe section and rigidly releasably engageable with the first gearbox at two or more locations. The first yoke is configured to prevent rotation of the second pipe section in any direction during actuation of the first rotation driver.

The following features are optional. The yoke may be configured to releasable couple the second pipe section to the first gearbox. The yoke may include a main body having at least first and second opposing sides and first and second arms extending laterally from the first and second opposing sides of the main body. Each arm may be rigidly releasably engageable with the first gearbox. At least one stop may be associated with the first pipe section and configured to prevent the first pipe section from sliding forward in the first gearbox during disconnection of the first and second pipe sections.

At least a first gear wheel may be rotatably coupled to the first rotation driver and at least partially housed in the first gearbox. The first gear wheel may be configured to be selectively actuated to rotate the first rotation driver. However, in some embodiments, the first gearbox may not include any gear assembly components. The first gearbox may be coupled to the wheeled carrier with an upwardly biased floating plate and a plurality of fasteners associated therewith. Each fastener may provide a gap below the floating plate and be configured to allow the floating plate to move up and down in the gap.

Accordingly, the present disclosure includes features and advantages which are believed to enable it to advance frac pump disconnect (and possibly also connection) technology. Various potential characteristics, advantages, features and benefits of the present disclosure are described above and others will be readily apparent to those skilled in the art upon consideration of the following detailed description of various embodiments and referring to the accompanying exemplary drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF EXEMPLARY EMBODIMENTS

Figure 1:
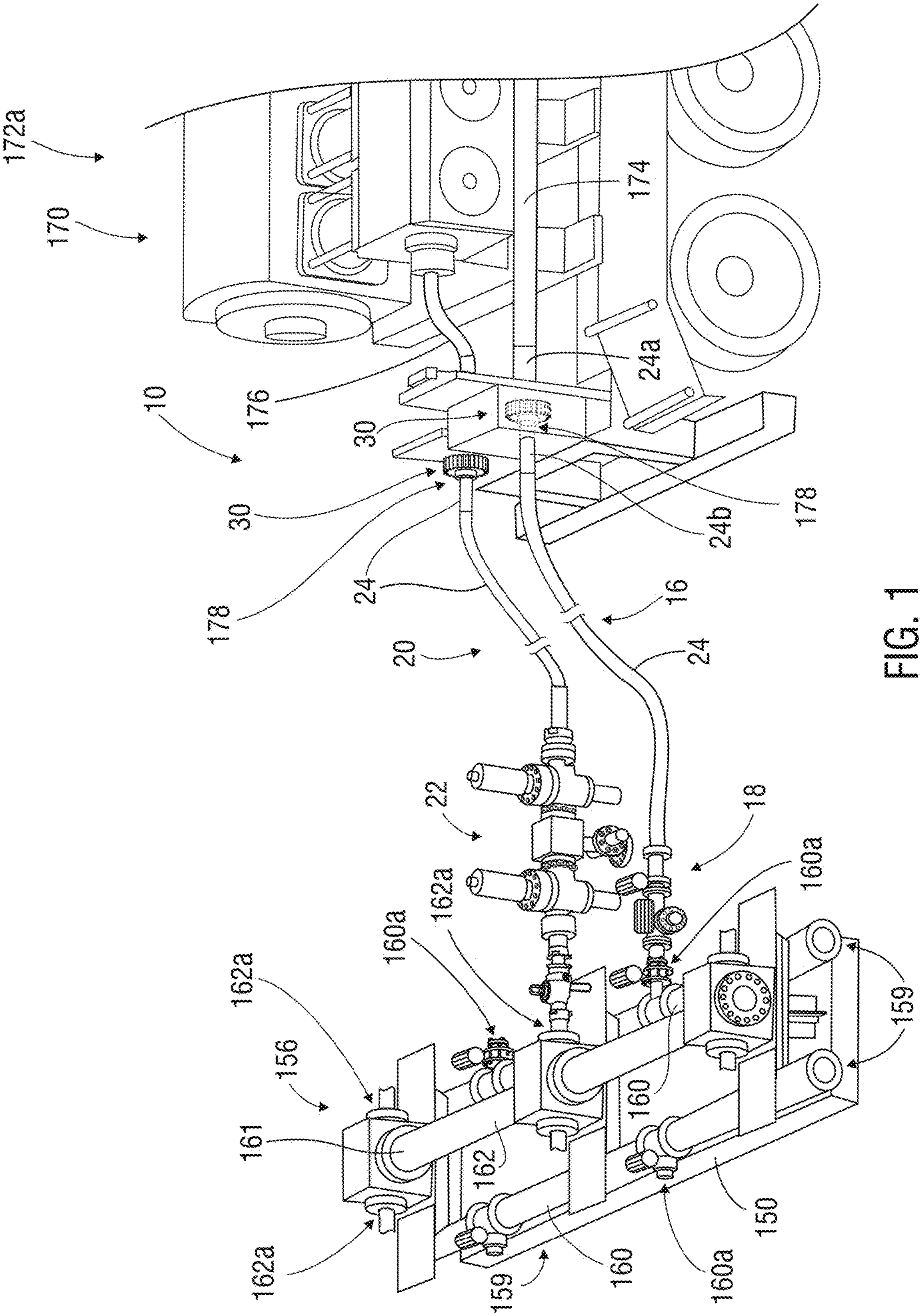
FIG. 1 is a perspective view of parts of an exemplary frac pump disconnect (FPD) system shown coupled between an exemplary frac pump and frac missile in accordance with one or more embodiments of the present disclosure.

Characteristics and advantages of the present disclosure and additional features and benefits will be readily apparent to those skilled in the art upon consideration of the following detailed description of exemplary embodiments and referring to the accompanying figures. It should be understood that the description herein and appended drawings, being of exemplary embodiments, are not intended to limit the scope of this patent, its claims or any patent or patent application claiming priority hereto or the claims therein. On the contrary, the intention is to cover all modifications, equivalents and alternatives falling within the spirit and scope of this disclosure. Many changes may be made to the particular embodiments and details disclosed herein without departing from such spirit and scope.

In showing and describing preferred embodiments in the appended figures, common or similar components, features and elements are referenced with like or identical reference numerals or are apparent from the figures and/or the detailed description and other parts of this patent. The figures are not necessarily to scale and certain features and certain views of the figures may be shown exaggerated in scale or in schematic in the interest of clarity and conciseness. Being of exemplary embodiments, the appended figures should not be construed as limiting upon the present disclosure or appended claims or the disclosure or claims of any related patents or patent applications, except as may be specified otherwise.

When reference numbers are followed by a lowercase letter (e.g., first and second connectors 117*a*, 117*b*), they are each the same type of component or feature (e.g., a connector 117) having the same exemplary features, but a different location, use or other characteristic(s). For some features or components, the drawings and/or discussion herein may include only reference numerals followed by lowercase letters (e.g., first and second connectors 117*a*, 117*b*), without any separate reference to or mention of the primary feature alone (e.g., connector 117). In those instances, it should be presumed that the referenced items (e.g., first and second connectors 117*a*, 117*a*) are examples of the primary feature (e.g., connector 117), even though the primary feature is not shown or referenced separately. For example, the description herein may mention connector 117, but the drawings only provide reference numerals for the first and second connectors 117_a_, 117_b_. Those references are intended and should be construed to be disclosures of the connector 117.

Reference herein and in the appended claims to components, features, aspects, etc. in a singular tense does not limit the present disclosure or appended claims to only one such component, feature or aspect, but should be interpreted generally to mean one or more, except as may be specified otherwise. Accordingly, the use of "a", "an" or "the" before a noun refers to and should be interpreted to mean "one or more", except as may be specified otherwise. For example, a recitation in the description or claims herein of "a connector coupled between X and Y" should be construed to mean that "one or more connectors is coupled between X and Y", unless a different construction is expressly provided. Also, the use of "(s)" in reference to an item, aspect, component, feature, action, etc. (e.g., "surface(s)") should be construed to mean "at least one".

Certain terms are used herein and in the appended claims to refer to particular exemplary features and components and are not intended to and should not limit the scope of this patent or any appended claims or the disclosure or claims of any related patents or patent applications, except as may be specified otherwise. Moreover, as one skilled in the art will appreciate, different persons may refer to a feature or component by different names and this document does not intend to distinguish between components and features that differ in name but not function.

The terms "and/or", "either" and "or" are used herein to provide alternate possibilities, only one of which may be present. All such possibilities do not need to be available. For example, if an embodiment of a component is described as "having a collar or coupling", it may include only one or more collars, only one or more couplings or at least one of each. For another example, if an embodiment of a component is described as "having a collar and/or a coupling", it may include only one or more collars, only one or more couplings or at least one of each. Thus, the use of "and/or", "either" or "or" herein thus does not require all of the possibilities be available, just any one or more of them.

The phrases "at least one among" and variations thereof as used herein generally have the same meaning as "and/or". For example, if an embodiment of a component is described as "having at least one among a collar, coupling and connector", it may include only one or more collars, only one or more couplings, only one or more connectors or any combination thereof. Thus, the use of "at least one among" herein and in any appended claims does not require all those possibilities to be available, just any one or more of them.

The phrases "except as may be specified otherwise" and variations thereof mean "except and only to the extent as may be expressly specified otherwise herein or in any particular claims hereof and only for such specific references or claims and potentially one or more other claims depending therefrom".

As used throughout and in all parts of this patent, the following additional terms have the following meanings, except as may be specified otherwise:

The terms "automated" and variations thereof refer to and include operable with the use of, or communicably coupled to or via, one or more electronic components or devices. Some potential examples of electronic components and devices are electronic controllers, laptop, desktop and personal computers, tablet devices, other computing devices, other computer hardware and related equipment, mobile devices, smart phones and other smart devices, wearable devices (e.g., watch, jewelry, eyewear, implanted chip or other device), AI devices, IoT devices, robotic devices, terminals, user interfaces, keypads, keyboards, touchscreens or other touch-activated features, biometrics readers or receivers or other bio-activated features (e.g., facial recognition, fingerprint recognition, voice-activated, eye-activated), computer software, network equipment and interconnection devices, data communication devices (e.g., wireless and/or hard-wired communication), cloud, server and other data storage devices, and the like. Automated may involve any desired form of actuation (e.g., by signal, touch, voice, biometrics, light, heat, pressure, robotic, AI or IoT driven).

The terms "automatic" and variations thereof mean without human involvement. In some instances, automatic actions or processes may involve robots and robotic components, artificial intelligence-driven components/circuitry, virtual entities, beings and avatars and the like or the efforts or results thereof.

The terms "camera", "sensor" and variations thereof as used herein can include any device and related technology (e.g., processor, control software) capable of sensing, capturing, recording, indicating and/or storing visual images (e.g., via photographs, film or video signals, digital or pixelated data) or sensing, measuring or detecting one or more variables or the presence or location of one or more events, objects or areas, such as, without limitation, photographic, videographic, photodiode, photoelectric, infrared (IR) or position-sensing scanners, lasers, position or other sensors, transducers, detectors and the like. The present disclosure is not limited by the form, configuration, components or particular operation of a camara or sensor.

The terms "connector", "coupling" and the like, and variations thereof, include any suitable form of hardware or configuration of components that causes the referenced items to be connected together as desired. The present disclosure and appended claims are thus not limited to the specific types of couplings and connectors described herein or shown in the appended drawings, except as may be specified otherwise.

The terms "coupled", "connected", "engaged" and the like, and variations thereof refer to and include either an indirect or direct connection or engagement except as may be specified otherwise. Thus, if a first device couples to a second device, that connection may be through a direct connection, or through an indirect connection via other devices and/or connections, except as may be specified otherwise.

The terms "decoupler" and variations thereof refer to a component or series of components that involves the coupling and/or decoupling of two or more things.

The terms "driver" and variations thereof refer to and include one or more components that transmit force or motion to one or more other components to produce movement.

The terms "elongated" and variations thereof as used herein mean and refer to an item having an overall length (during the intended use of the item) that is greater than its average width.

The terms "fluid" and variations thereof may include one or more liquids, gases and/or solids, including, without limitation, foam, gel, solvent, chemicals, lubricant, materials, particles, proppant or a combination thereof. The form, components, properties and any other characteristics of any fluid that may be mentioned herein are not limiting upon the present disclosure or appended claims, except as may be specified otherwise.

The terms "for example", "exemplary", "e.g.", "such as" and variations thereof are used herein to provide one or more possible examples of the referenced item, feature, detail, circumstance, etc. that may be present, possible or occur in some instances. Such examples are neither exhaustive nor exclusive, the only possibilities or required, except as may be specified otherwise.

The term “frac missile” and variations thereof can include any equipment that receives HP fluid from one or more frac pumps.

The terms “frac pump” and variations thereof refer generally to powerful, high-pressure pumps used in hydraulic fracturing to pressurize fluid for injection into underground rock formations to create or expand fractures therein. Frac pumps are often diesel-powered or turbine-powered and mounted on trailers, trucks or skids, but may have other configurations and characteristics. A few examples of presently commercially available exemplary “frac pumps” are the SPM™ Model QWS 2500 Quintuplex frac pump (see e.g., rigsmarket.com/main/uncategorized/quintuplex-frac-pump/); GD Energy Products™ models GDC2500, 3000 and others (see e.g., gdenergyproducts.com/products/pumps/frac-pumps); Profrac® frac pumps (see e.g., profrac.com/services/frac-pumps/), Jereh Energy Equipment and Technologies Corporation frac pumps (see e.g., jereh-eet.com/intellifrac-electric-fracturing-equipment.htm), NOV™ frac pumps (see e.g., nov.com/products/ideal-efrac-fleet), Liberty Energy, Inc. frac pumps (e.g., libertyenergy.com/completion-services/frac/) and frac pumps by Evolution Well Services® (evolutionws.com/services/ews-features/). However, the type, capacity and other characteristics of any frac pumps are not limiting upon the present disclosure, except as may be specified otherwise. Accordingly, this disclosure and the appended claims, or those of any related patents or patent applications, are not limited by the type, configuration, characteristics or any other details of any frac pumps, except as may be specified otherwise.

The terms “high pressure”, “HP” and variations thereof are used interchangeably to refer generally to fluid pressure used in connection with hydraulic fracturing operation at between approximately 3,000-20,000+ psi, but which may vary depending upon the fluid, equipment, application, environment or circumstances of use, other variables or a combination thereof. The present disclosure and appended claims, as well as those of any related patents and patent applications, should not be limited to or by the above pressure range, except as may be specified otherwise. In other words, the particular HP pressure or pressure range in any instance should not be limiting upon the present disclosure and appended claims or that of any related patents and patent applications, except as may be specified otherwise.

The terms “including” and “comprising” are used herein and in the appended claims in an open-ended fashion and thus should be interpreted to mean “including, but not limited to”.

The terms “invention”, “present invention” and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

The terms “line” and variations thereof mean and refer to a fluid flow line, such as a pipe.

The terms “low pressure”, “LP” and variations thereof are used interchangeably herein to refer generally to fluid pressure used in connection with hydraulic fracturing operations pressures at or below approximately 3,000 psi, but which may vary depending upon the fluid, equipment, application, environment or circumstances of use, other variables or a combination thereof. The present disclosure and appended claims, as well as those of any related patents and patent applications, should not be limited to or by the above pressure range, except as may be specified otherwise. In other words, the particular LP pressure or pressure range in any instance should not be limiting upon the present disclosure and appended claims or that of any related patents and patent applications, except as may be specified otherwise.

The terms “minimal” and variations thereof generally mean no more than 5-10%.

The terms “operatively coupled” and variations thereof refer to a situation where two or more things are connected, joined or associated in a way that allows them to work together or interact, typically in a functional or operational manner. In some instances, it may involve a relationship where one of the element’s action or state affects the other, enabling a specific function or process. The connection or associated of the elements can be direct or indirect.

The terms “personnel”, “operator”, “person” and the like refer to and include one or more humans.

The terms “pipe” and variations thereof refer to and include one or more rigid or flexible hoses, conduits, pipes or other components having at least one fluid flow passageway therein (e.g., PUP or PUP joint, flow iron, connectors, sleeves) or a combination thereof. The pipe may be constructed of any suitable, appropriate (e.g., temperature, strength, pressure rated) material depending upon the component and application, such as for example, steel, hard piping, flexible pipe, flexible hose, rigid hose, poly pipe, thermoplastic and the like. The type, dimensions, configuration and other characteristics of any pipe mentioned, shown or required herein are not intended to and should not be limiting upon the present disclosure or any appended claims or those of any related patents and patent applications, except as may be specified otherwise.

The terms “pipe section” and variations thereof refer to a length of pipe.

The terms “rigidly coupled” and variations thereof mean connected together in a manner that is intended not to allow any, or more than an insubstantial, tolerable, nominal or minimal amount of relative movement therebetween as may be expected during typical or normal operations. In other words, if components A and B are rigidly coupled together, they are not movable relative to one another (more than an insubstantial, tolerable, nominal or minimal amount) during typical or expected operations.

The terms “sling” and variations thereof refer to and include at least one elongated member useful to suspend at least one other component, such as, but not limited to a strap, chain, belt, rope, hoist, etc.

The terms “substantial” and variations thereof refer to more than expected, or normal, under typical operating conditions, and in some instances by at least approximately 75%, but may vary depending upon the context or topic being discussed, such as the type of component, equipment, application, circumstances of use, other variables or a combination thereof.

The terms “underlying structure” and variations thereof generally refer to whatever carrier or structure one or more decouplers is ultimately carried on in any particular arrangement, such as, but not limited to a frac pump carrier, decoupler trailer, skid or the like.

The terms “universal”, “modular” and variations thereof are used interchangeably herein to refer generally to a component, item, structure, system or feature having a standard construction or standardized units, features or dimensions for ease, flexibility and versatility in its use, interchangeability, replacement, positioning, interconnection, deployment, removal, any other purposes or a combination thereof.

It should be noted that any of the above terms may be further explained, defined, expanded or limited below or in other parts of this patent. Further, the above list of terms is not all inclusive and other terms may be defined, used or explained below or in other sections of this patent.

The following numerals are used herein for referencing various exemplary structural components, items or features of exemplary embodiments herein, but are not intended to and should not limit the scope of this patent or any appended claims, except as may be expressly specified otherwise. These terms and others used in this patent are believed to have a sufficiently well-understood and definite meaning to persons of ordinary skill in the art as the name for structure:

10—frac pump disconnect (FPD) system
16—LP connection line
16*a*—first end (LP connection line16)
18—LP bleed-off manifold
20—HP connection line
20*a*—first end (HP connection line 20)
22—HP bleed-off manifold
24—pipe section
24*a*—first pipe section
24*b*—second pipe section
25—expandable connection conduit (ECC)
26—jointed section (of ECC 25)
27—swivel union or joint
28—flexible pipe or hose
29—reel or spool
30—decoupler
30*a*—first decoupler (for LP connection flow line 16)
30*b*—second decoupler (for HP connection flow line 20)
31—disconnect assembly or gearbox
31*a*—front end (of gearbox)
31*b*—rear end (of gearbox)
32—slotted guide post or rail
33—carrier (for reel or spool 29)
36—rotation driver or tool
37—large-OD portion (of rotation driver 36)
38—small-OD portion (of rotation driver 36)
39—central bore (of rotation driver 36)
40—notch (of rotation driver 36)
42—annual sleeve
46—gear assembly
48—primary gear wheel
49—tooth (of primary gear wheel 48)
52—connection aperture (of primary gear wheel 48)
54—fastener
56—central bore (of primary gear wheel 48)
58—actuator
58*a*—actuator (for LP decoupler 30*a*)
58*b*—actuator (for HP decoupler 30*b*)
60—torque tool
61—retainer ring
60*a*—hydraulically-actuated torque tool
60*b*—pneumatically-actuated torque tool
62—socket (of the torque tool 60)
66—pinion gear
68—profile (of pinion gear 66)
70—tooth (of pinion gear 66)
71—finger (of pinion gear 66)
72—carrier plate
72*a*—front carrier plate
72*b*—rear carrier plate
73—main bore (of carrier plate 72)
74—receiver hole (of carrier plate 72)
75—bushing or wear ring
76—power unit or source
78—hydraulic power unit
80—sheath
82—activator or switch
86—hydraulic pump reservoir (for HPU 78)
90—reaction or biasing arm
92—alignment pin hole (in carrier plate 72)
94—enclosure
96—opening (in enclosure 94)
100—detector
100*a*—camera
101—check valve
102—primary HP pump isolation valve
103—bleed-off valve
104—tee or cross
105—secondary or redundant HP pump isolation valve
106—primary LP pump isolation valve
107—bleed-off valve
108—secondary or redundant LP pump isolation valve
109—actuator
110—support structure
110*a*—skid
110*b*—platform
110*c*—leg
112—mast
114—cradle
120—gantry
122—transport points
123—fork pockets
124—sling
126*a*—first side (of suspension arm 128)
126*b*—second side (of suspension arm 128)
128—suspension arm
129—end cap (of suspension arm 128)
130—positioner
134—hoist
135—up/down mechanism
138—roller or wheel
140—rail
144—post
146—base (of gantry 120)
150—base (of frac missile 156)
156—frac missile
159—LP side (of frac missile 156)
160—LP line (of frac missile 156)
160*a*—LP line outlet port (of frac missile 156)
161—HP side (of frac missile 156)
162—HP line (of frac missile 156)
162*a*—HP inlet port (of frac missile 156)
170—frac pump
172—frac pump carrier
172*a*—frac pump trailer
173—bumper
174—LP line (to/from frac pump 170)
176—HP line (to/from frac pump 170)
178—connector
178*a*—connector
179*a*—first portion (of connector 178)
179*b*—second portion (of connector 178)
180—rotatably-engageable connector
180*a*—HU connector
184—nut (of rotatably-engageable connector 180)
184*a*—HU nut
184*b*—wingnut

Figure 2:
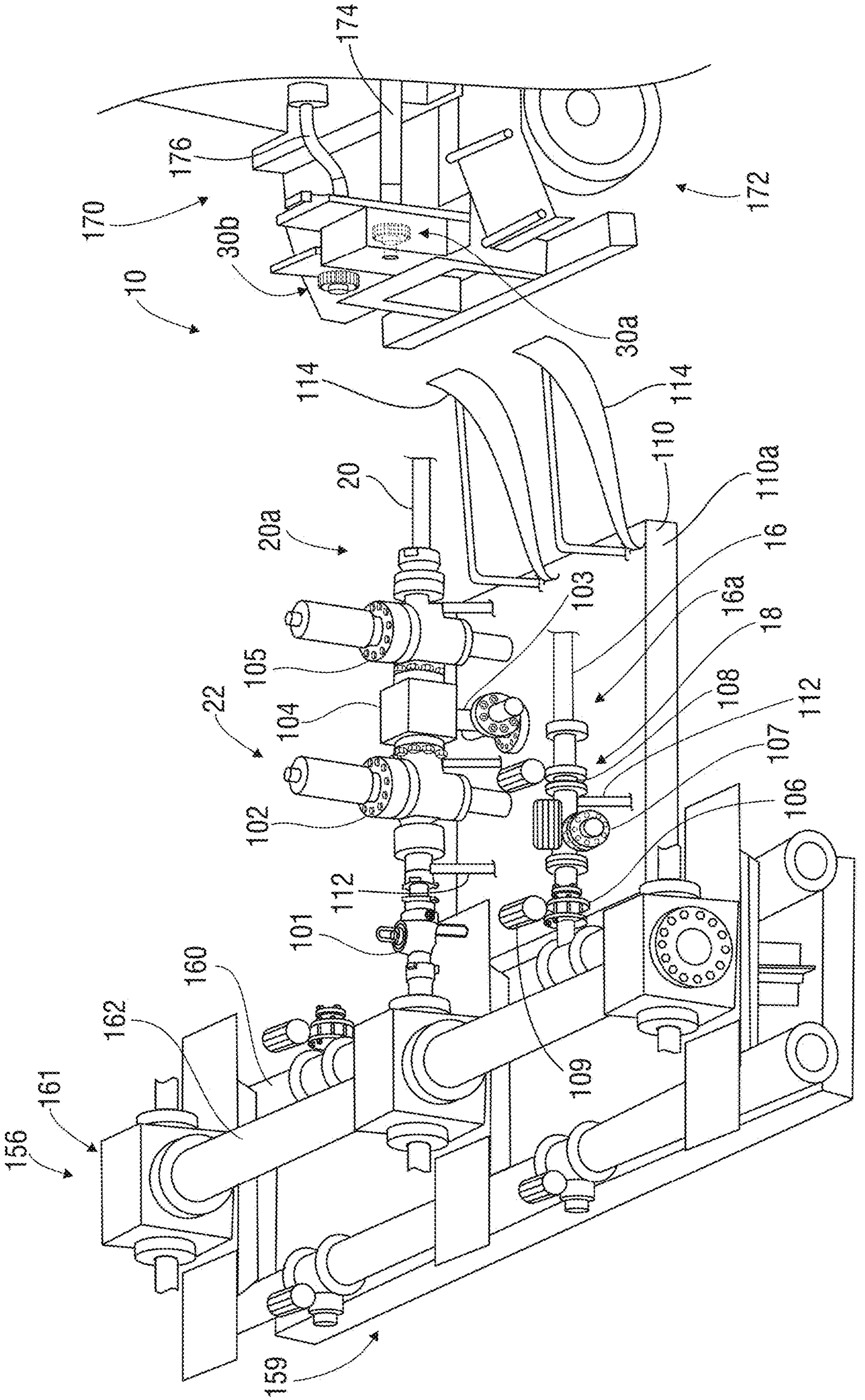
FIG. 2 is a partial view of the exemplary FPD system shown in FIG. 1 including an exemplary support structure in accordance with one or more embodiments of the present disclosure.

186—lug (of nut 184)
188—male sub
188*a*—male HU sub (of HU connector 180*a*)
192—female sub
192*a*—female HU sub (of HU connector 180*a*)
193—loading segment
194—snap ring
196—support frame
198—pedestal
199—platform
200—operator
210—disconnect carrier
212—disconnect trailer
214—front end (of disconnect carrier 210)
215—rear end (of disconnect carrier 210)
216—universal coupling
220—connection arm
222—extension (of connection arm 220)
223—bent hitch pin
224—bracket
226—clamp
230—main body (of clamp 226)
234—finger (of clamp 226)
236—connector
240—bar
242—receiver
243—aperture
244—vertical post
246—pipe clamp
250—choke
252—pressure transducer
260—upper support plate
261—front end (of upper support plate 260)
262—underside (of upper support plate 260)
263—left side (of upper support plate 260)
264—right side (of upper support plate 260)
266—torsion or connector bar
268—nut
270—mounting block
270*a*—upper mounting block portion
270*b*—lower mounting block portion
274—fastener
276—stop
280—lower support plate
284—stabilizer
288—fastener
289—nut
290—shoulder bolt
292—upper shoulder (of shoulder bolt 290)
296—biasing member
298—spacer
300—spring
304—spring mount
304*a*—upper spring mount
304*b*—lower spring mount
310—filler or size-adjuster
312—bushing
320—stop
322—projection
326—pipe clamp
328—bolt
330—vibration dampener
340—substructure
344—support wheel
348—wheel mount
349—shield
360—deflector
364—sloped plate
370—anti-rotation device or yoke
375—main body
376—gripper or clamp
378*a*—first clamp portion
378*b*—second clamp portion
380—arm
380*a*—first arm
380*b*—second arm
384—receiver
386—alignment portion
387—guide
390—spear or bar Referring initially to FIGS. 1 & 2, a frac pump disconnect (FPD) system 10 useful to help selectively disconnect one or more frac pumps 170 (or other equipment) from one or more hydraulic frac missiles 156 (manifolds, or other equipment) in accordance with various embodiments of the present disclosure is provided. The FPD system 10 may, for example, be useful to disconnect one or more suction, or LP, fluid flow lines 174 of, coming off or fluidly coupled to the frac pump(s) 170 from one or more LP fluid flow lines 160 of the frac missile 156 (or other equipment). Likewise, the FPD system 10 may be useful to disconnect one or more discharge, or HP, fluid flow lines 176 of, coming off or fluidly coupled to the frac pump(s) 170 from one or more HP fluid flow lines 162 of the frac missile 156 (or other equipment). In some configurations, the FPD system 10 may also or instead be useful to connect one or more frac pumps 170 (e.g., lines 174, 176) or other equipment to one or more frac missiles 156 (e.g., lines 160, 162) or other equipment.

As indicated above, the FPD system 10 may be used for disconnecting and/or connecting frac pumps 170 and frac missiles 156 or any other desired equipment. Accordingly, all the discussion, drawings and other disclosure herein with respect to the use of the FPD system 10 with frac missiles 156 and frac pumps 170 applies equally to disconnecting (and/or possibly connecting) other equipment or components. Consequently, the present disclosure and appended claims are not limited to use of the FPD system 10 with only frac pumps 170 and frac missiles 156, except as may be specified otherwise. Additionally, to save on redundancy, wordiness and lengthiness of this patent, any discussion or illustrations herein of components, methods or other details that relate to disconnecting various embodiments may be used equally or similarly (e.g., in reverse) for connecting and vice versa, except as may be specified otherwise or as may be evident from the description or drawings herein or the nature of the particular details of the subject matter at issue.

To also save on redundancy, wordiness and lengthiness of this patent, some of the description and drawings herein relating to various components, operations, features and other details associated with the FPD system 10 may be provided only in the context of connecting, disconnecting or other aspects of the respective LP line(s) 160, 174 of the frac missile 156 and frac pump 170 or the respective HP line(s) 162, 176 of the frac missile 156 and frac pump 170, but not both. In such instances, such descriptions and drawings may, in various embodiments, apply equally or similarly to the other, except as may be specified otherwise or as may be evident from the description or drawings herein or the nature of the particular details of the subject matter at issue. Thus, except for such exceptions, all description and drawings provided herein with respect to connecting, disconnecting or other aspects relating to only the LP line(s) 160, 174 are hereby incorporated by reference herein in their entireties with respect to the HP line(s) 162, 176 and vice versa. In any case, the present disclosure is not limited to using only the components, operations, features and other details discussed herein relating to connecting, disconnecting or other aspects of the respective LP line(s) 160, 174 and HP line(s) 162, 176. Any other suitable components, operations, features and other details may be used for either or both.

Referring still to FIGS. 1 & 2, in various embodiments, the selective disconnection (e.g., and/or connection) of one or more frac pumps 170 from one or more frac missiles 156 with the exemplary FPD system 10 may be (i) fully or partially automated, effected by manual actuation or a combination thereof, (ii) made without any personnel in the red zone and/or depressurizing or interrupting operation of the frac missile 156 and/or other frac pumps 170, (iii) made without modifying or adding components to the frac missile 156, frac pump 170, frac pump carrier 172 or a combination thereof, (iv) have any other characteristics or (v) a combination thereof. In some embodiments, an operator 200 not in the red zone, such as at the front of the frac pump 170 or its carrier 172 (e.g., FIG. 3A), a remote location away from the red zone or work site or elsewhere, may initiate, or cause, the connection and/or disconnection of the frac pump 170 and frac missile 156. If desired, once a frac pump 170 has been disconnected with use of the exemplary FPD system 10, the frac pump 170 or its carrier 172 may be movable away from the red zone or frac missile 156 for repair, maintenance, cleaning, replacement or any other reasons (e.g., by one or more personnel not in the red zone and without interrupting operation of other frac pumps 170 or the frac missile 156) and thereafter moved back to and reengaged with the frac missile 156.

When the FPD system 10 is used with one or more frac pumps 170 and frac missiles 156, the frac pumps 170 and missiles 156 may have any form, construction, components, configuration and operation, all of which are not limiting upon the present disclosure, except as may be specified otherwise. For example, the frac missile 156 may include a suction, or low-pressure, side 159 and a discharge, or high-pressure, side 161 mounted to and/or carried upon one or more bases 150 (e.g., frac missile skids). The illustrated LP side 159 of the frac missile 156 includes at least one LP line 160 and the HP side 161 includes at least one HP line 162. For example, two LP lines 160 and one HP line 162 are shown, but the frac missile 156 could have fewer or more LP lines 160 (e.g., 1, 3, 4, etc.) and HP lines 162 (e.g., 2, 3, 4, etc.).

Figure 4:
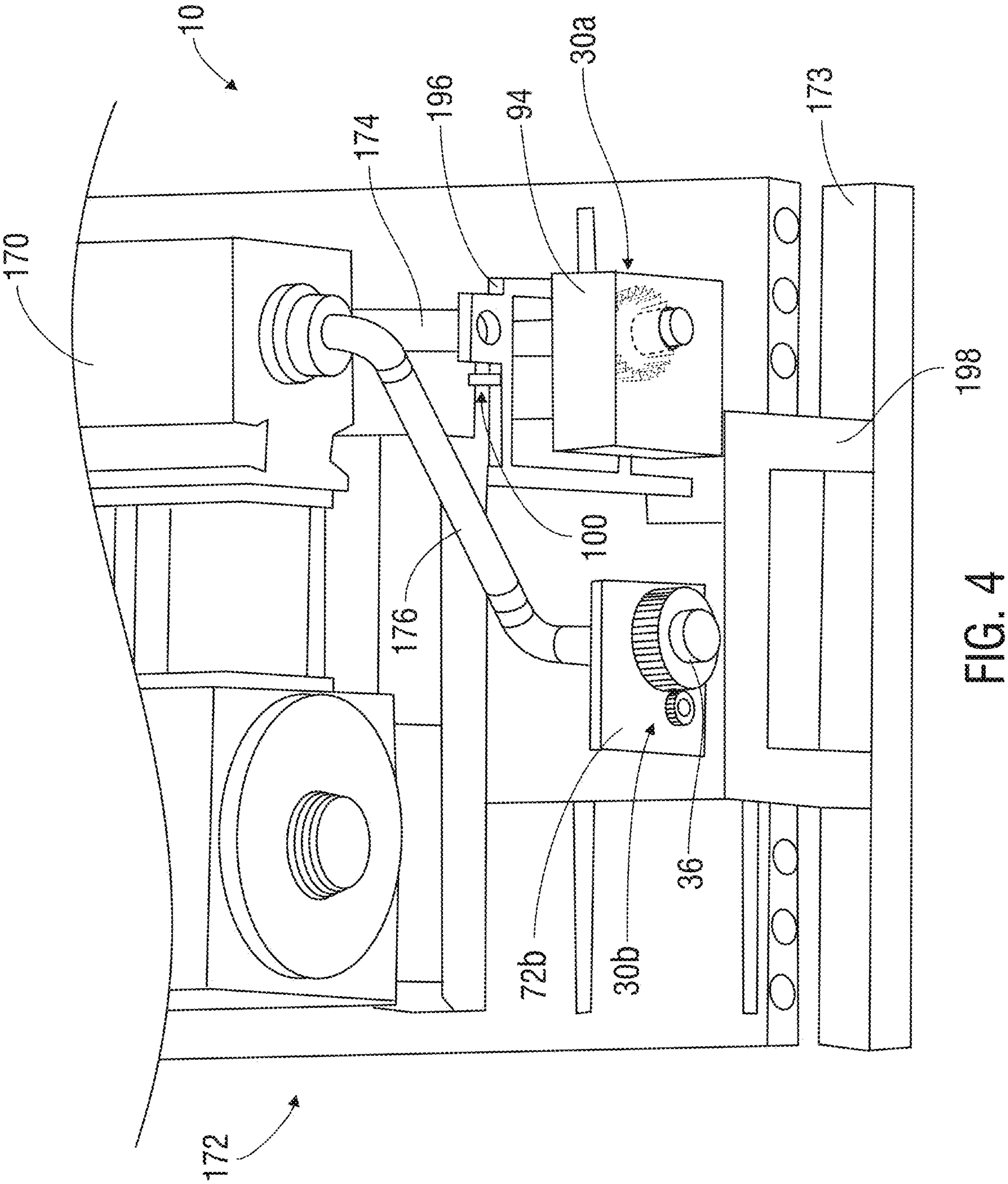
FIG. 4 is a partial view of the exemplary FPD system shown in FIG. 1 in accordance with one or more embodiments of the present disclosure.

Still referring to FIGS. 1 & 2, the exemplary frac pump 170 is shown deployed on a frac pump carrier 172, such as a frac pump trailer 172*a*, truck or any other desired structure, vessel or the like. One or more respective LP and HP lines 174, 176, constructed of rigid or flexible pipe, hose or any other suitable construction, are fluidly coupled to ("come off") the illustrated frac pump 170 (e.g., FIG. 4). The illustrated LP line 174 is configured to be fluidly coupled to the LP side 159 (e.g., one or more LP lines 160) of the frac missile 156, such as at one or more LP line outlet ports 160*a* thereof. The illustrated HP line 176 is configured to be fluidly coupled to the HP side 161 (e.g., one or more HP lines 162) of the frac missile 156, such as one or more HP line inlet port 162*a* thereof. It should be understood, however, that the present disclosure is not limited to or by any of the above, or any other, details of the frac pump 170 and frac missile 156, which may have any form, configuration, components and operation, except as may be specified otherwise.

The subject equipment (e.g., frac missile 156 and frac pump 170) may be (e.g., fluidly and mechanically) connected and disconnected with the FPD system 10 in any suitable manner. In this embodiment, one or more LP fluid flow connection lines 16 may be selectively connectable and disconnectable between the frac pump 170 (e.g., LP line 174) and LP side 159 (e.g., LP line 160) of the frac missile 156 with one or more connectors 178. Likewise, one or more exemplary HP fluid flow connection lines 20 may be connectable and disconnectable between the frac pump 170 (e.g., HP line 176) and HP side 161 (e.g., HP line 162) of the frac missile 156 with one or more connectors 178. In some embodiments, the same connector 178 may be used for both the LP and HP connection lines 16, 20.

In other embodiments, the LP and/or HP connection lines 16, 20 and/or connectors 178 may not be included. For example, the LP and/or HP lines 174, 176 of the frac pump 170 may be fluidly connectable directly to the respective LP and/or HP sides 159, 161 of the frac missile 156 without any connection lines 16, 20. In some instances, one or more connectors 178 may be used to directly couple the LP and/or HP lines 174, 176 of the frac pump 170 with the respective LP and/or HP sides 159, 161 of the frac missile 156. If desired, both the LP and HP sides 159, 161 of the frac missile 156 may be coupled to the frac pump 170 with a single connector 178.

Figure 5B:
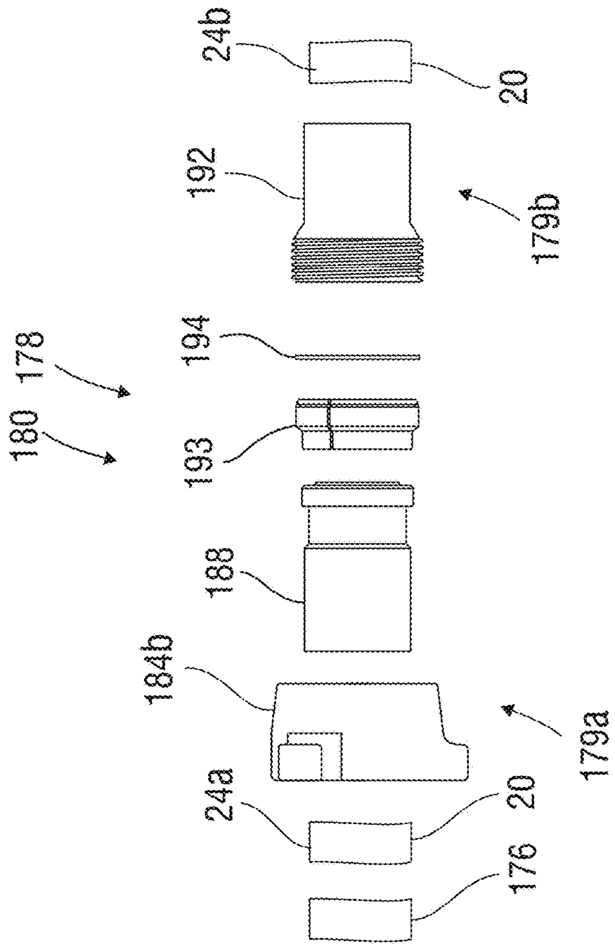
FIG. 5B is an exploded view of another exemplary connector in accordance with one or more embodiments of the present disclosure.
Figure 5A:
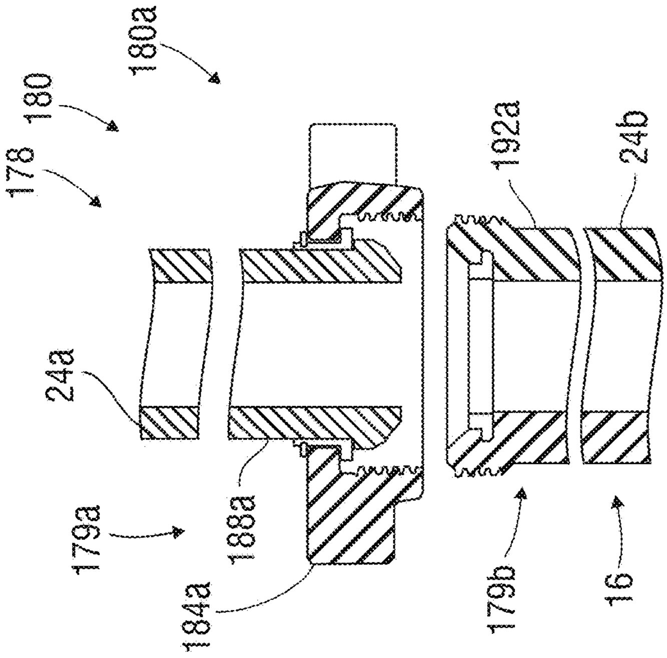
FIG. 5A is a partial cross-sectional view of an exemplary connector in accordance with one or more embodiments of the present disclosure.

Referring now to FIG. 5A-B, the connector 178 may have any suitable form, configuration, components, construction and operation. For example, the connector 178 may provide a pinned, sleeved, riveted, clamped, ball-locked, flanged, crimped or other connection. In some embodiments, the connector 178 may include first and second portions, 179*a*, 179*b* which are selectively releasable engageable with one another. An exemplary connector 178 may be a rotatably-engageable connector 180 having a first connector portion 179*a* that includes a male sub 188 and a second connector portion 179*b* that includes a female sub 192. The exemplary male sub 188 may provide male threads which are threadably engageable with female threads provided by the female sub 192. It should be noted that the male threads may be on a component, or part, associated with the male sub 188 (e.g., HU nut 184*a*, wingnut 184*b*, etc.) and the female threads may be on a component, or part, associated with the female sub 192. In other words, in the context of this patent, the first connector portion 179*a* of a rotatably engageable connector 180 that includes a male sub 188 does not require the male threads be on the male sub 188 itself, but could be on a related component. Same for the female threads of the second connector portion 179*b* of a rotatably engageable connector 180.

In some embodiments, the rotatably-engageable connector 180 may be a hammer union (HU) connector 180*a* (e.g., FIG. 5A) having a male HU sub 188*a* and a female HU sub 192*a*. Typically, a HU nut 184*a* is part of, or associated with or coupled to the male HU sub 188*a* and threadably engages the female HU sub 192*a*. Thus, as an example of the first portion 179*a* of a connector 178, the first portion 179*a* of a HU connector 180*a* may include both the male HU sub 188*a* and HU nut 184*a*. However, the HU connector 180*a* may include any other parts and have any suitable configuration. For example, the HU nut 184*a* may instead be associated with the female HU sub 192*a*. Moreover, the present disclosure is not limited by the form, configuration, components, operation or any other details of the connector 178, which may be a rotatably-engageable connector 180 with threaded or other forms of first and second connector portions 179*a*, 179*b*, a HU connector 180*a* or any other form of connector 178 (with or without any desired form of connector portions 179*a*, 179*b*), except as may be specified otherwise. For example, the (e.g., HP) connector 178 of FIG. 5B is a TSI Flow Products 3" DC15 Connection having a wingnut 184*b* with male threads that is coupled to the male sub 188 (e.g., by numerous loading segments 193 and a snap ring 194) to form the first connector portion 179*a* and which threadably engages female threads of the second connector portion 179*b*. See e.g., tsiflowproducts.com/frac-flowback/dc15-connection. Another example of a (e.g., LP) connector that may be useful as the connector 178 in various embodiments, is the Dixon Valve & Coupling Company, LLC HUMF100300CS—Dixon Complete Assembly Frac Fitting. See e.g., dixonvalve.com/en/products/dixon-complete-assembly-frac-fitting/humf100300cs. Thus, while the exemplary FPD system 10 is often illustrated and described herein with the use of a HU connector 180*a*, it can be used with any sort of connectors 178.

Referring back to FIG. 1, when included, the LP and HP connection lines 16, 20 may have any suitable form, configuration, components, location and operation. For example, each connection line 16, 20 may include one or more sufficiently-rated pipe sections 24, such as one or more rigid or flexible hoses, pipes, other conduits (e.g., PUP or PUP joint), any other form of fluid passageways or a combination thereof. In this embodiment, the LP connection line 16 includes one or more interconnected pipe sections 24 which are fluidly coupled to the LP line 160 of the frac missile 156 and releasably engageable (via one or more connectors 178) with the LP line 174 coming off the frac pump 170 or one or more pipe sections 24 fluidly coupled thereto. The exemplary LP connection line 16 includes one of the connector portions 179*a* or 179*b* (e.g. FIG. 5A) of the connector 178, which is engageable with a corresponding connector portion 179*b* or 179*a* (e.g. FIG. 5A) fluidly coupled to the LP line 174 coming off the frac pump 170.

Similarly, the illustrated HP connection line 20 includes one or more interconnected pipe sections 24 which are fluidly coupled to the HP line 162 of the frac missile 156 and releasably engageable (via one or more connectors 178) with the HP line 176 coming off the frac pump 170 or one or more pipe sections 24 fluidly coupled thereto. The exemplary HP connection line 20 includes one of the connector portions 179*a* or 179*b* (e.g. FIG. 5A) of the connector 178, which is engageable with a connector portion 179*b* or 179*a* (e.g. FIG. 5A) on the HP line 176 coming off the frac pump 170.

Figure 13A:
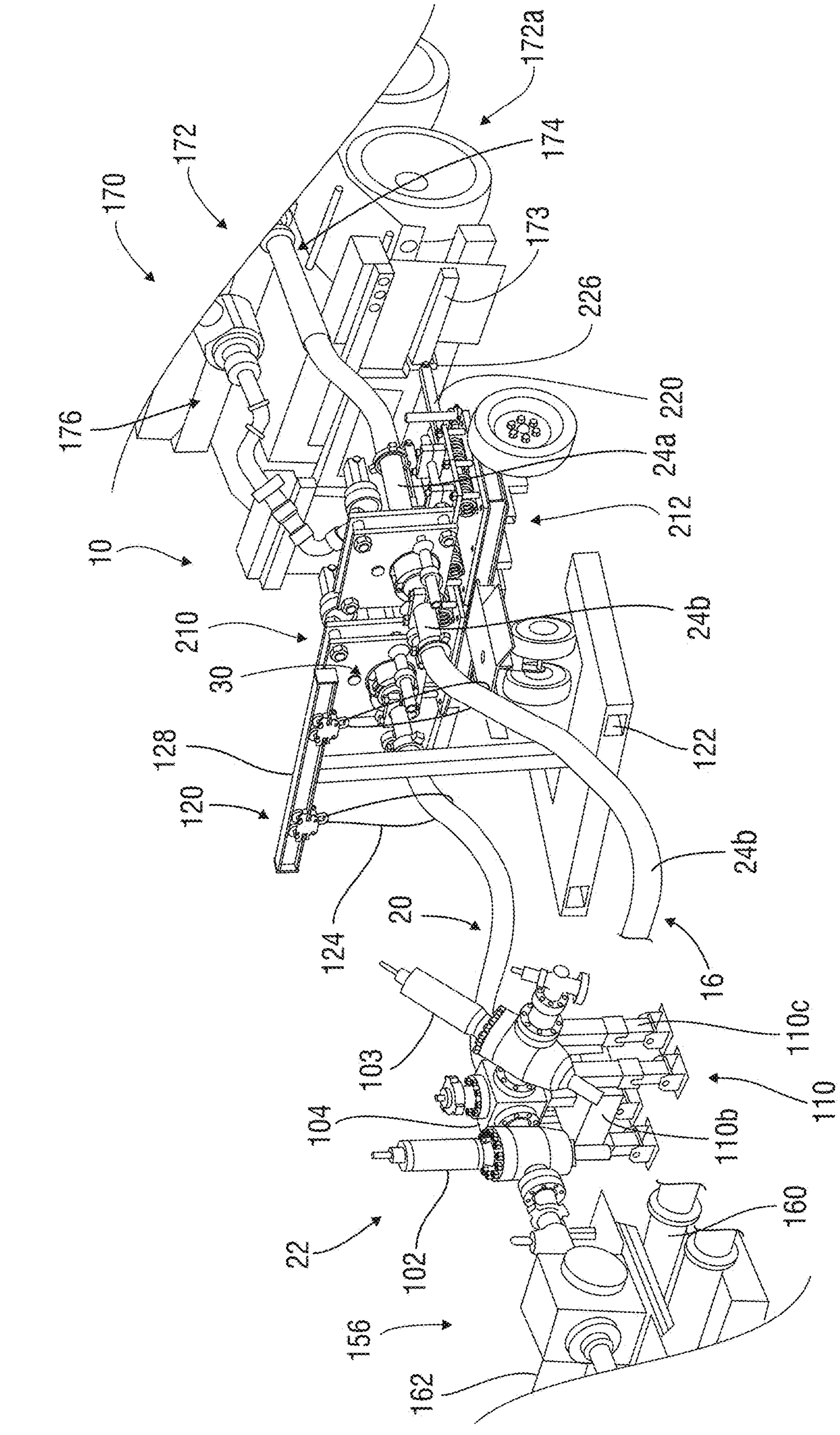
FIG. 13A is another perspective view of parts of an exemplary FPD system employed with an exemplary frac pump and frac missile in accordance with one or more embodiments of the present disclosure.
Figure 14A:
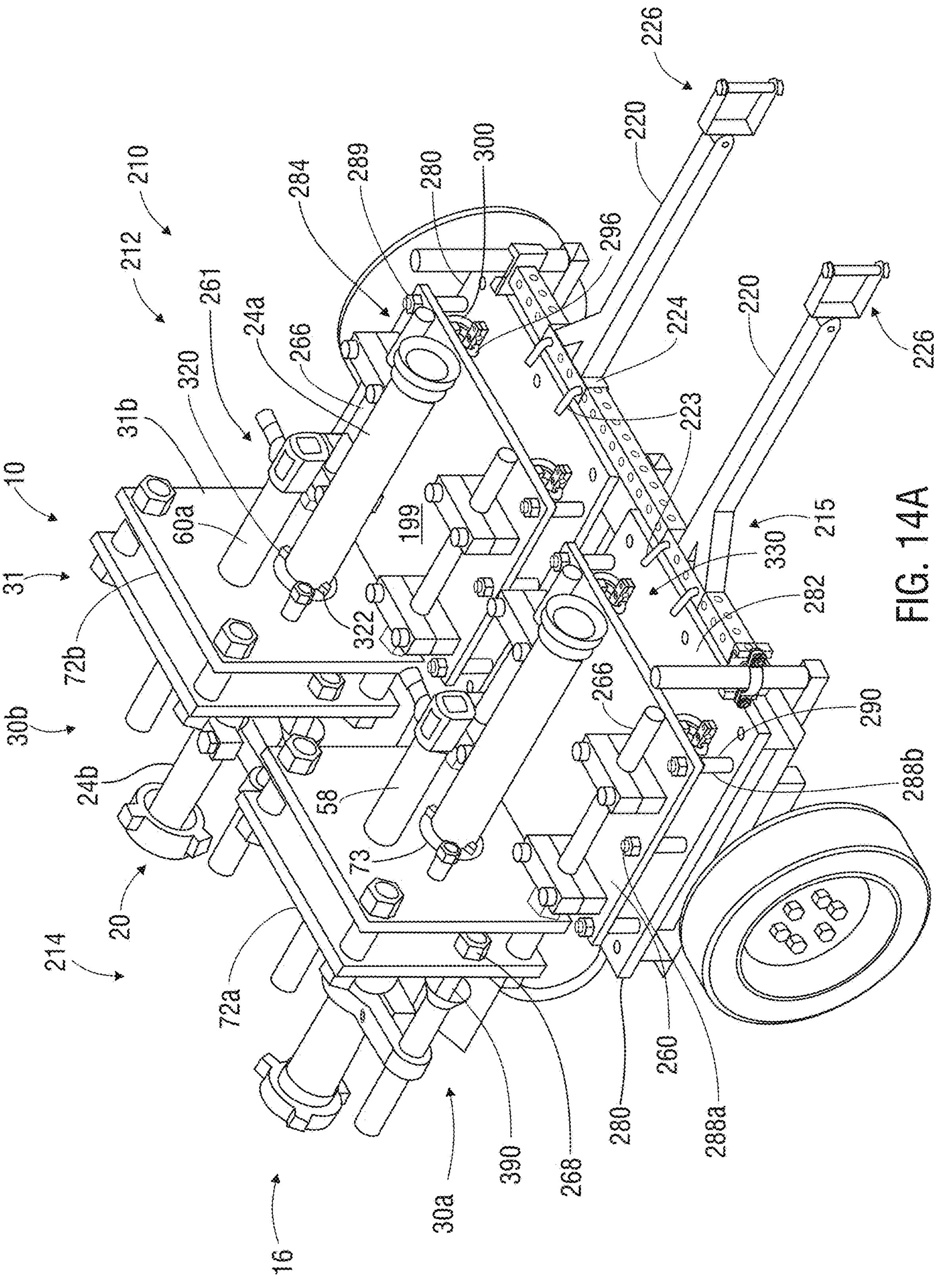
FIG. 14A is a rear perspective view of parts of an exemplary FPD system shown carried on an exemplary disconnect trailer in accordance with one or more embodiments of the present disclosure.
Figure 14B:
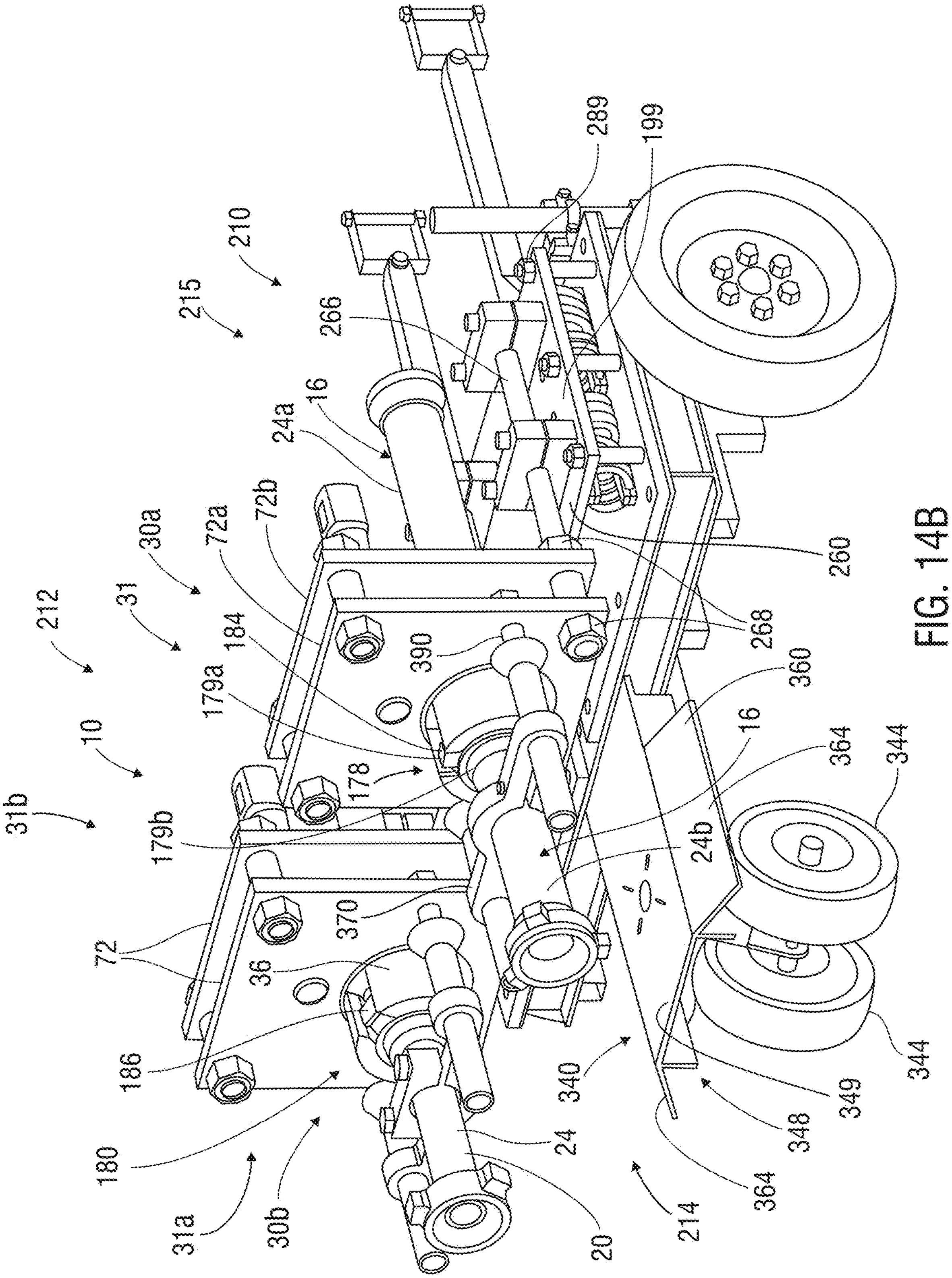
FIG. 14B is a front perspective view of parts of the exemplary FPD system shown in FIG. 14A in accordance with one or more embodiments of the present disclosure.

However, any other configuration of connection lines 16, 20 and connectors 178 may be used. For example, the above configuration could be reversed, where the LP and HP connection lines 16, 20 are instead coupled to the frac pump 170 and releasably engageable (via one or more connectors 178) with the LP and HP lines 160, 162 of the frac missile 156 or one or more interconnected pipe sections 24 fluidly coupled thereto. For another example, the embodiment of FIGS. 13A & 14A show the LP connection line 16 having multiple pipe sections 24, at least a first exemplary pipe section 24*a* fluidly coupled to the LP line 174 of the frac pump 170 and at least a second pipe section 24*b* fluidly coupled to the LP line 160 of frac missile 156. As shown in FIG. 14B, the illustrated first pipe section 24*a* carries one of the connector portions 179*a*, 179*b*, while the illustrated second pipe section 24*b* carries the other connector portions 179*a*, 179*b*. For example, the first pipe section 24*a* may carry the first connection portion 179*a* (e.g., the male sub 188), and the second pipe section 24*b* may carry the second connector portion 179*b* (e.g., the female sub 192). The exemplary HP connection line 20 can be similarly configured. Thus, the present disclosure is not limited by the location, configuration or makeup of the LP and HP connection lines 16, 20 and connectors 178, except as may be specified otherwise.

Referring back to FIG. 2, in another independent aspect of the present disclosure, a series of fluidly coupled components (e.g., one or more valves, crossover connections, tee connectors, flanges, swivel joints, seals), may be coupled to, or part of, the frac missile 156, frac pump 170, LP and/or HP connection lines 16, 20 or other components. For example, some or all of these components may be provided on or part of a respective LP and/or HP bleed-off manifold 18, 22. In the present embodiment, the bleed-off manifolds 18, 22 are provided at or proximate to the ends 16*a*, 20*a* of the respective LP and HP connection lines 16, 20 closest to the frac missile 156. Accordingly, the respective exemplary connection lines 16, 20 extend from the corresponding bleed-off manifolds 18, 22 toward the frac pump 170. However, the LP and/or HP bleed-off manifolds 18, 22 may have any other suitable location or may not be included. For example, the LP and/or HP bleed-off manifolds 18, 22, or components thereof, may be part of the LP and/or HP connection lines 16, 20.

When included, the bleed-off manifolds 18, 22 may have any suitable form, construction, components and configuration. In this embodiment, starting from the frac missile 156 (e.g., HP line 162) and going in the direction of the frac pump 170, among its components, the HP bleed-off manifold 22 may include a check valve 101, primary pump isolation valve 102, bleed-off valve(s) 103 (e.g., coming off a tee, or cross, 104) and secondary, or redundant, pump isolation valve 105. The exemplary secondary isolation valve 105 may be included, for example, to back-up, or provide redundancy of, the primary isolation valve 102, provide an extra element of pressure control before bleed-off, for any other purposes or a combination thereof. These components may have any suitable form, configuration, components and operation. For example, the check valve 101 may be a flapper valve, the isolation valves 102, 105 may be hydraulicly-actuated gate valves and the bleed-off valve 103 may be a plug or gate valve (e.g., the same type valve as the isolation valve 105).

Figure 13B:
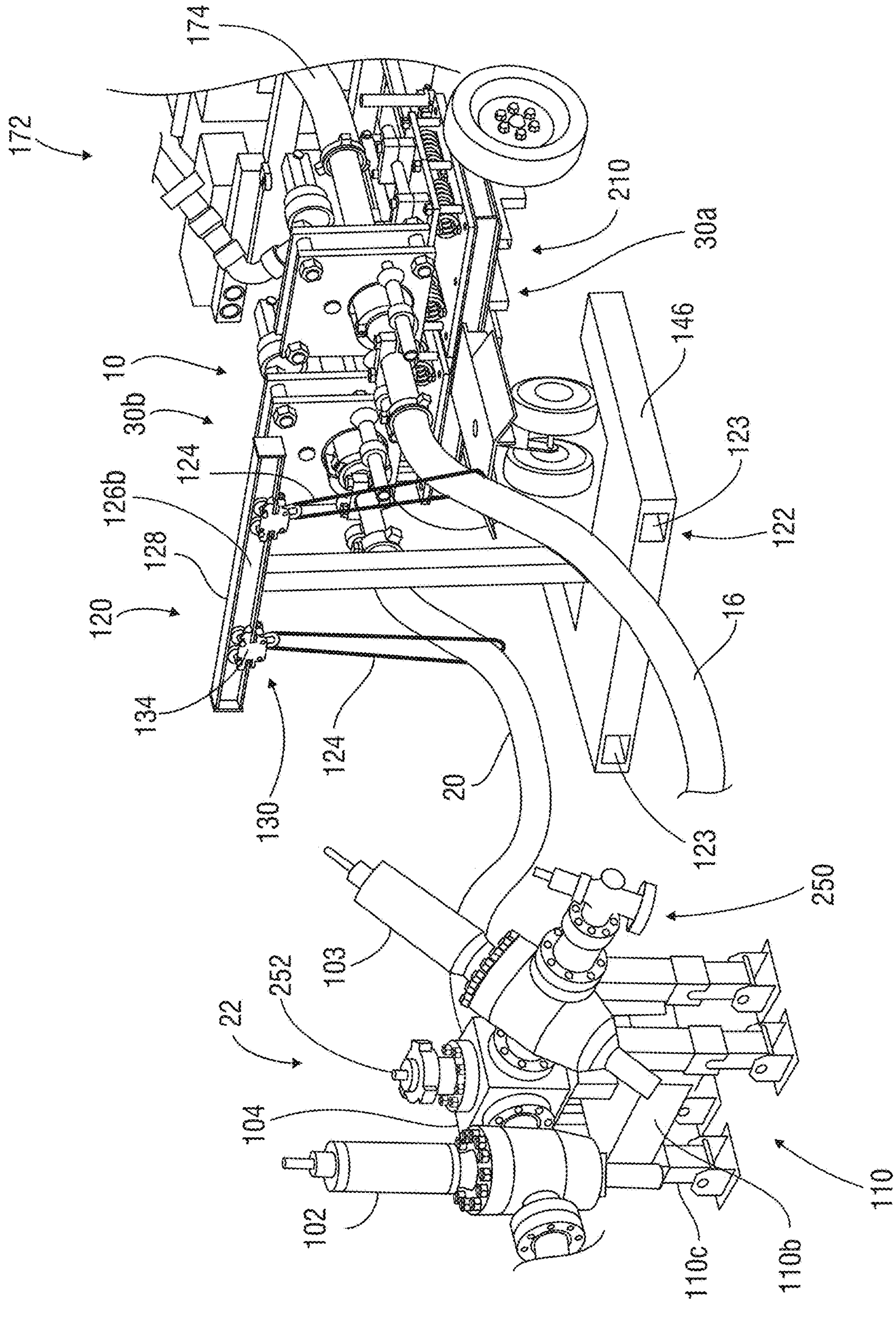
FIG. 13B is a partial view of the exemplary FPD system shown in FIG. 13A in accordance with one or more embodiments of the present disclosure.

The HP bleed-off manifold 22 may include additional or different components. For example, in FIG. 13B, a positive choke 250 is coupled to the bleed-off valve 103 for discharge control (e.g., discharge to containment tank, open top, vent to atmosphere, etc.). For other examples, one or more pressure or flow measurement devices may be included. In FIG. 13B, at least one pressure transducer 252 is included to help verify that pressure in the subject flow path(s) has been bled to zero and/or for any other purposes.

Referring back to FIG. 2, the LP bleed-off manifold 18, when included, may also have any suitable components and operation. In this embodiment, starting from the frac missile 156 (e.g., LP line 160) and going in the direction of the frac pump 170, the LP bleed-off manifold 18 may include a primary pump isolation valve 106, bleed-off valve 107 and secondary, or redundant, pump isolation valve 108. The exemplary secondary isolation valve 108 may be included to back-up, or provide redundancy of, the primary isolation valve 106, provide an extra element of pressure control before bleed-off, for any other purposes or a combination thereof.

Figure 13C:
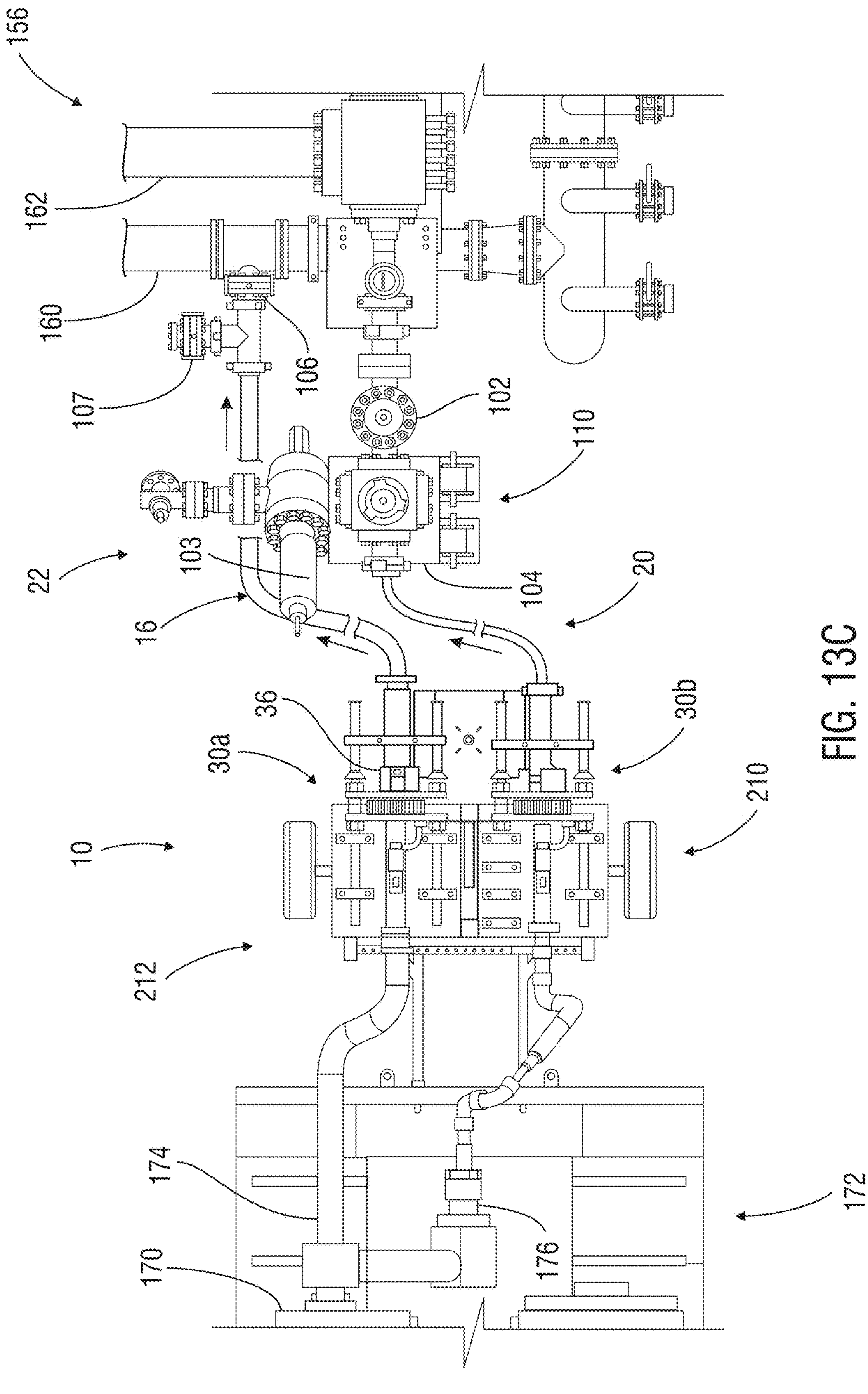
FIG. 13C is a top view of parts of the exemplary FPD system shown in FIG. 13A in accordance with one or more embodiments of the present disclosure.

These components may have any suitable form, configuration, components and operation. For example, each valve 106-108 may be a butterfly valve operated via an actuator 109. For another example, many or all of the exemplary valves used with the FPD system 10 (e.g., valves 102, 103,

105, 106) may be serviceless (e.g., gate) valves not requiring maintenance with grease or the use of special grease systems. However, the LP bleed-off manifold 18 may include additional or different components. Moreover, the present disclosure neither requires the inclusion of, nor is limited to, the above components, configurations and locations of bleed-off manifolds 18, 22. For example, in FIG. 13C, there is no separate LP bleed-off manifold 18 and one or more LP bleed-off components (e.g., the primary isolation valve 106 and bleed-off valve 107) are directly coupled to the frac manifold 156.

Referring briefly back to FIG. 2, if desired, one or both of the LP and HP bleed-off manifolds 18, 22 (or any desired components thereof), may be provided on a support structure 110 or the like. The support structure 110 may have any suitable form, configuration, components and operation. For example, the support structure 110 may include a stand, skid, vehicle, dolly, wagon, trailer, automated or non-automated carrier or framework. In this embodiment, the support structure 110 is skid 110*a* having one or more masts 112 to support LP and HP bleed-off manifolds 18, 22. For another example, the support structure 110 in FIGS. 13A-C includes at least one platform 110*b* and at least one leg 110*c* associated with the components of the HP bleed-off manifold 22. The illustrated platform 110*b* supports the cross 104 and four height-adjustable exemplary legs 110*c* (e.g., jack stands) support the platform 110*b* and manifold components. However, the present disclosure does not require a LP and/or HP bleed-off manifold 18, 22 or the exemplary configurations or types of components mentioned above, except as may be specified otherwise.

Referring back to FIGS. 1-4, in another independent aspect of the present disclosure, the FPD system 10 may include any suitable components, configuration and operation to help selectively disconnect and, in some embodiments, to connect, a frac pump 170 (or other component) from a frac missile 156 (or other component). In the illustrated embodiment, the FPD system 10 includes one or more decouplers 30 configured to help selectively connect and disconnect the respective LP lines 160, 174 and HP lines 162, 176 of the frac missile 156 and frac pump 170. For example, a separate and distinct decoupler 30*a*, 30*b* is shown provided for each respective connection line 16, 20, the first decoupler 30*a* being useful with the LP connection line 16 and the second decoupler 30*b* useful with the HP connection line 20.

In other embodiments, a different combination or configuration of decouplers 30 may be used to assist in disconnecting (and possibly also connecting) any desired number of LP lines 160, 174 and HP lines 162, 176 of the frac missile 156 and frac pump 170. For example, a single decoupler 30 may be used for selectively connecting and disconnecting both of the LP and HP lines 174, 176 (coming off the frac pump 170) with/from the LP and HP sides 159, 161 of the frac missile 156. For another example, different decouplers 30 (or couplers and decouplers) may be used for connecting verses disconnecting the LP lines 160, 174 and/or HP lines 162, 176.

Referring specifically to FIG. 1, when included, the decoupler 30 may have any suitable purpose(s). For example, when one or more connectors 178 is used to connect one or more LP and/or HP connection lines 16, 20 between the frac missile 156 and frac pump 170, the decoupler(s) 30 may be selectively actuated to open, disconnect or disengage the connector(s) 178 (e.g., connector portions 179*a*, 179*b*, see e.g., FIGS. 5A-B), effectively disconnecting the frac pump 170 from the frac missile 156. As noted, in many embodiments, the decoupler 30 can also be used to engage or connect the connector(s) 178 to connect the frac pump 170 and frac missile 156.

Figure 7:
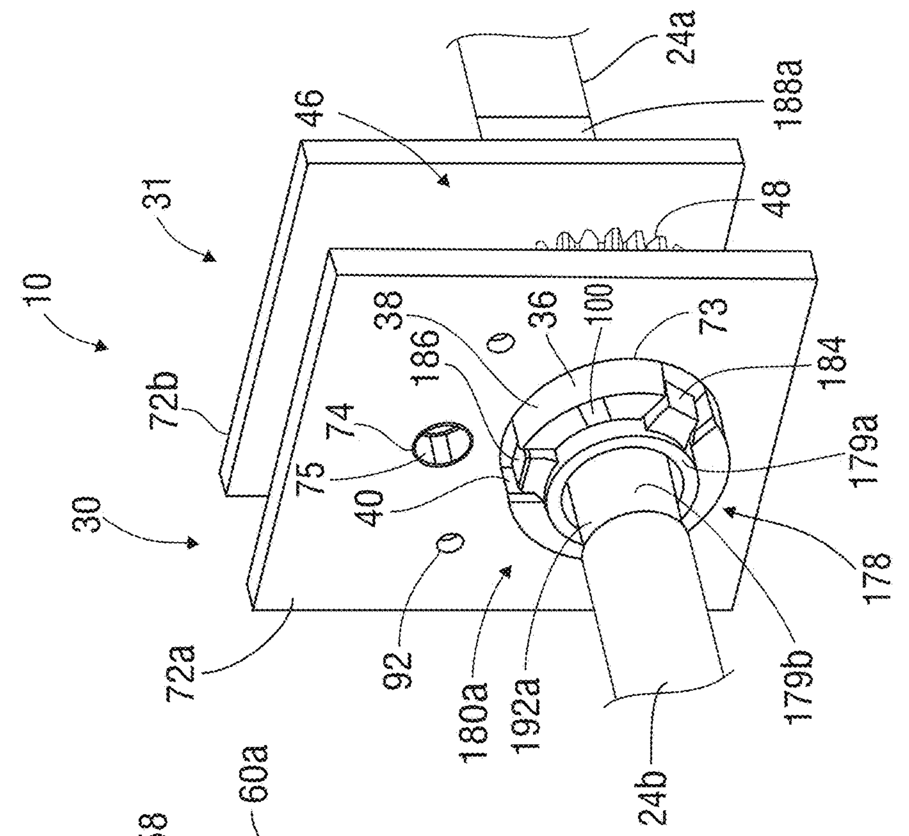
FIG. 7 is a perspective view of an exemplary gearbox in accordance with one or more embodiments of the present disclosure.
Figure 6:
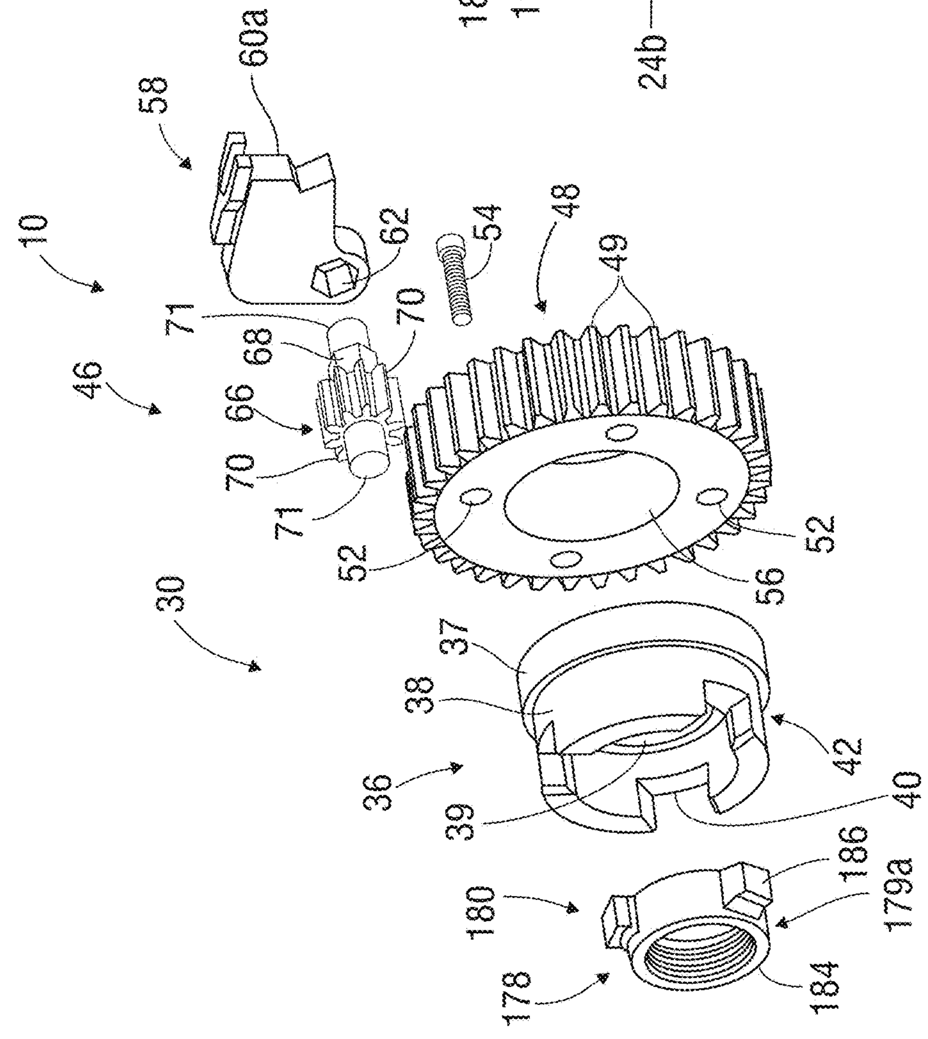
FIG. 6 is an exploded view of an exemplary decoupler and related components in accordance with one or more embodiments of the present disclosure.

Referring now to FIGS. 6 & 7, the decoupler 30 may have any suitable form, configuration, components, construction and operation to help disconnect (and maybe also connect) the connector(s) 178. In various embodiments, the decoupler 30 may include one or more grippers, clamps, tongs or other devices to help connect and/or disconnect the connector(s) 178. When the connector 178 includes first and second connector portions 179*a*, 179*b* which are mateable, the exemplary decoupler 30 may be configured to disconnect (and possibly also connect) the mateable connector portions 179*a*, 179*b*. When the connector 178 is a rotatably-engageable connector 180 having first and second connector portions 179*a*, 179*b* which are rotatably mateable, the decoupler 30 may include one or more rotation tools, or drivers, 36.

When included, the rotation tool 36 may have any suitable form, configuration, construction, components and operation. For example, the rotation tool 36 may be useful to engage and rotate at least part of at least one of the connector portions 179*a*, 179*b* into and out of engagement with the other respective connector portion 179*b*, 179*a* (e.g., without any personnel in the red zone). In the present embodiment, the rotation tool 36 is configured to engage at least part of the first connector portion 179*a* having male threads and rotate it relative to the second connector portion 179*b* having female threads. For example, when the first connector portion 179*a* includes a nut 184 (e.g., HU nut 184*a*, FIG. 5A; wingnut 184*b*, FIG. 5B) or similar structure or component, the rotation tool 36 may be configured to grip and rotate it relative to the second connector portion 179*b*.

Still referring to FIGS. 6 & 7, the exemplary rotation tool 36 is shown with respect to a HU connector 180*a* (e.g., FIG. 5A), but could equally be used for engaging/disengaging other forms of rotatably-engageable connectors 180 (e.g., FIG. 5B). In the present embodiment, the rotation tool 36 is configured to engage and rotate the HU nut 184*a* of the male HU sub 188*a* relative to, and into and out of threadable engagement with, the female HU sub 192*a* to separate the HU connector 180*a*.

The exemplary rotation tool 36 may rotate the nut 184 (or other components) in any suitable manner. In the present embodiment, the rotation tool 36 is configured so that rotation of the rotation tool 36 rotates the nut 184. For example, the rotation tool 36 may include one or more notches 40 (or other features or components) engageable with one or more lugs 186 (or other features or components) of the nut 184 and be configured to bias the lug(s) 186 (and nut 184) in a rotational path. In the present embodiment, the rotation tool 36 includes three such notches 40, but could instead include 1, 2, 4 or more. The exemplary notches 40 are formed in a small outer diameter (OD) portion 38 of the rotation tool 36, which extends from a large-OD portion 37 thereof. However, the rotation tool 36 may rotate the nut 184 (or other components) in any other manner. For example, the rotation tool 36 may translate linear movement into rotational movement of the nut 184, or be used to separate the first and second connector portion 179*a*, 179*b* in any other suitable manner.

Referring still to FIGS. 6 & 7, when included, the exemplary notch(es) 40 of the rotation tool 36 may engage the lug(s) 186 (or other portion) of the nut 184 or any other form or feature of connector portion(s) 179*a*, 179*b* in any suitable manner. For example, the rotation tool 36 may be in the form of, or include, an annual sleeve 42 having a central bore 39 and which slides at least partially over the nut 184 to align the notch(es) 40 with the associated lug(s) 186. In the illustrated embodiment, the rotation tool 36 can be maintained in an at least substantially fixed position relative to the nut 184, with the notches 40 staying aligned at least partially around the corresponding lugs 186. However, the rotation tool 36 may not include any notches 40 and/or have one or more different features or components that engage, or rotate, the lug(s) 186 or other parts or components of the nut 184 or connector 178 in any other desired manner.

Referring specifically to FIG. 6, in another independent aspect, the decoupler 30 may be actuated to help disconnect (and, in many embodiments, connect) the connector(s) 178 in any suitable manner. For example, one or more actuators 58 may be used to actuate the decoupler 30. When the decoupler 30 includes a rotation tool 36, such as in the present embodiments, the actuator 58 may be used to rotate the rotation tool 36. For example, the actuator 58 may be configured to selectively acuate one or more gear assemblies 46 (or other components) operatively coupled to the rotation driver(s) 36. In other embodiments, the actuator 58 may be directly coupled to the rotation tool 36 or used to drive any other components.

When included, the gear assembly 46 may have any suitable form, configuration, construction components and operation. For example, the gear assembly 46 or one or more components thereof, may provide a 3.5 to 1 or any other desired gear ratio. The exemplary gear assembly 46 is engageable with the rotation tool 36 and configured to rotate it (in at least one direction) to apply the desired rotational distance and torque to at least part of the desired connector portion 179*a*, 179*b* (e.g., the nut 184) to engage or disengage the rotatably-engageable connector 180. In the present embodiment, the gear assembly 46 includes at least one primary (e.g., bull) gear wheel 48 rotatably coupled to the rotation tool 36, so that rotation of the primary gear wheel 48 will be translated to rotation of the rotation tool 36 (then to the nut 184). If desired, the primary gear wheel 48 may be sized to provide the desired, or an optimal, rotational distance of and/or translation of torque to the rotation tool 36.

Still referring to FIG. 6, the exemplary primary gear wheel 48 may be rigidly, releasably coupled to the rotation tool 36, such as with one or more bolts, pins, protrusions or other feature(s) sufficient to provide the desired translation of rotation and torque (e.g., 6,000 ft/lbs. or more or less) to the rotation tool 36. For example, the illustrated primary gear wheel 48 includes numerous (e.g., four) spaced-apart connection apertures 52 extending therethrough at different locations therein to provide a rigid, releasable connection to the rotation tool 36 (e.g., at corresponding receiving holes (not shown) formed in the back of the rotation tool 36) with fasteners 54 (e.g., bolts, pins, rods, etc.). However, 1, 2, 3, 5 or more corresponding sets of connection apertures 52, receiving holes and fasteners 54 may be used. Moreover, the primary gear wheel 48 may be releasably or permanently coupled to, or associated with, the rotation tool 36 in any other manner or may be integral therewith or not included.

The exemplary actuator 58 may be used to selectively rotate the primary gear wheel 48 of the gear assembly 46 (or other components) in any suitable manner. In this embodiment, the actuator 58 is operatively coupled to the primary gear wheel 48 and configured to apply the desired torque (e.g., measured at or via the power source 76 (FIG. 3A) and sufficient to engage, or disengage, one or more elastomeric seals inside the female sub 192) and rotational movement thereto to connect and/or disconnect the connector 178. In some embodiments, the same actuator 58 may be useful to both connect and disconnect the associated connector 178, or separate actuators 58 for each action may be used. Likewise, the same or different actuators 58 may be used to actuate both decoupler 30*a*, 30*b* or just one of them.

Figure 14C:
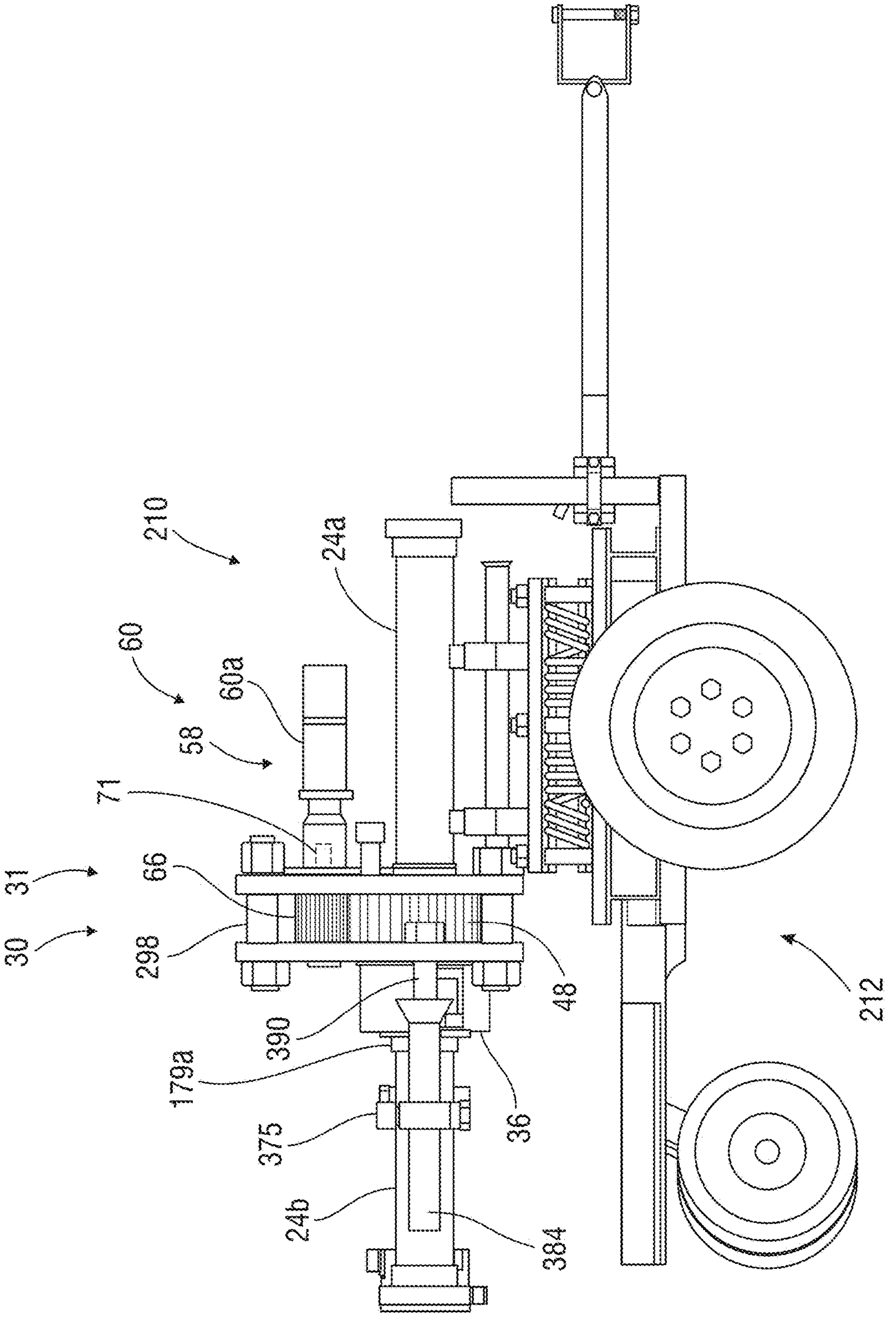
FIG. 14C is a side view of parts of an exemplary FPD system shown carried on a disconnect trailer in accordance with one or more embodiments of the present disclosure.
Figure 14D:
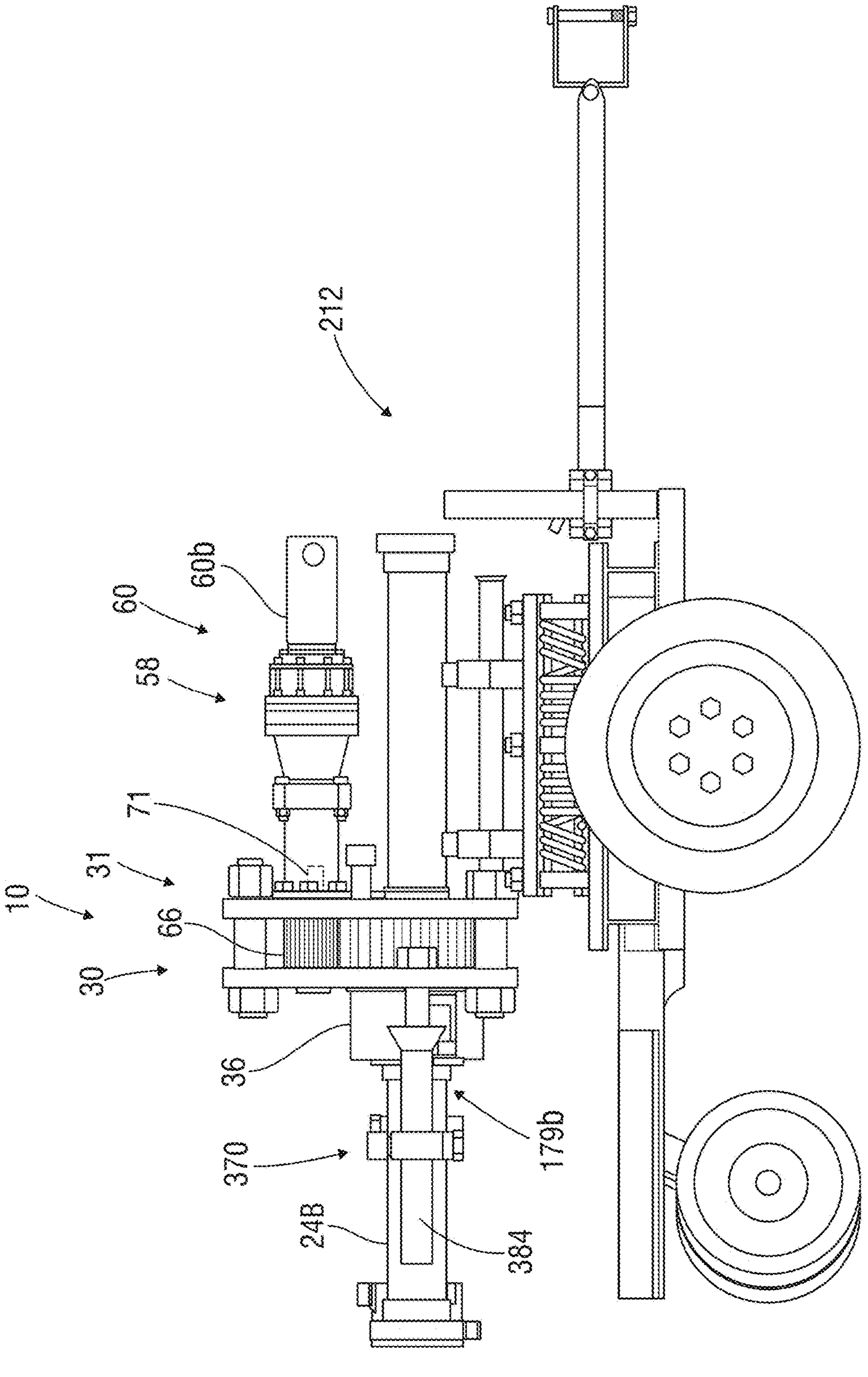
FIG. 14D is a side view of parts of another exemplary FPD system shown carried on a disconnect trailer in accordance with one or more embodiments of the present disclosure.

Still referring to FIG. 6, in various embodiments, the actuator 58 may include a motor, or torque tool, 60 having any suitable form, configuration, components and operation. The illustrated torque tool 60 is a hydraulically-driven torque tool 60*a* (e.g., torque wrench with actuator assembly), but could be powered in any other manner. One presently commercially available example of a hydraulically-actuated torque tool 60*a* that may be used with various embodiments of the present disclosure is the Hytorc® model STEALTH 4 hydraulic torque wrench with 2-⅜" hex socket. (See e.g., hytorc.com/stealth). For another example, FIG. 14C uses another exemplary form and configuration of hydraulically-driven motor 60*a*, such as the presently commercially available Young Powertech hydraulic motor Model No. YMSY-315 (See e.g., youngpowertech.com/catalogs, drive.google.com/file/d/1mtxA6TiGTYz0DWHhSau01WfICIHcREzH/view). In FIG. 14D. the illustrated actuator 58 is a pneumatic torque tool 60*b* (configured to be powered by a pneumatic power unit), such as the presently commercially available RTP Nutrunner Model RTP4100C-HR25 by Atlas Copco North America LLC. (See e.g., atlascopco.com/en-us/itba/products/bolt-tightening-solutions/continuous-rotation/rtp-4100c-hr25-sku8431104100.) However, the present disclosure is not limited to these exemplary types and configurations of actuators 58.

Referring back to FIG. 6, the illustrated torque tool 60 includes a selectively rotatable (e.g., hex) socket 62 (or other feature) configured to apply the desire torque to the primary gear wheel 48 and cause the desired rotation thereof, but any other mechanisms or features may be used. In this example, the socket 62 of the torque tool 60 is coupled to the primary gear wheel 48 via a pinion gear 66 arranged to transfer the rotational force and torque from the torque tool 60 to the primary gear wheel 48. For example, the pinion gear 66 may include (i) a (e.g., hex head) profile 68 that mates with the geometry of the socket 62 of the torque tool 60, (ii) one or more fingers 71 (e.g., extending from the front and rear ends thereof) for mounting the pinion gear 66 and/or other purposes and (ii) one or more teeth 70 engageable with one or more teeth 49 of the primary gear wheel 48 to translate rotation and torque from the torque tool 60 to the primary gear wheel 48.

However, the torque tool 60 may be engaged with the primary gear wheel 48 (e.g., to cause the desired effect) in any other manner, such as via weld and/or one or more releasable or permanent pins, bolts, adapters, clamps, grippers, couplings, fasteners, joints or other features, or may be integral therewith. Moreover, the torque tool 60 or other form of actuator 58 may have any other form, configuration, components and operation and the primary gear wheel 48 or rotation tool 36 may be selectively rotatable in any other suitable manner. Accordingly, the present disclosure is not limited to the particular components, configuration and operation of the actuator 58, torque tool 60 or related components as described and shown herein, except as may be specified otherwise.

Figure 3A:
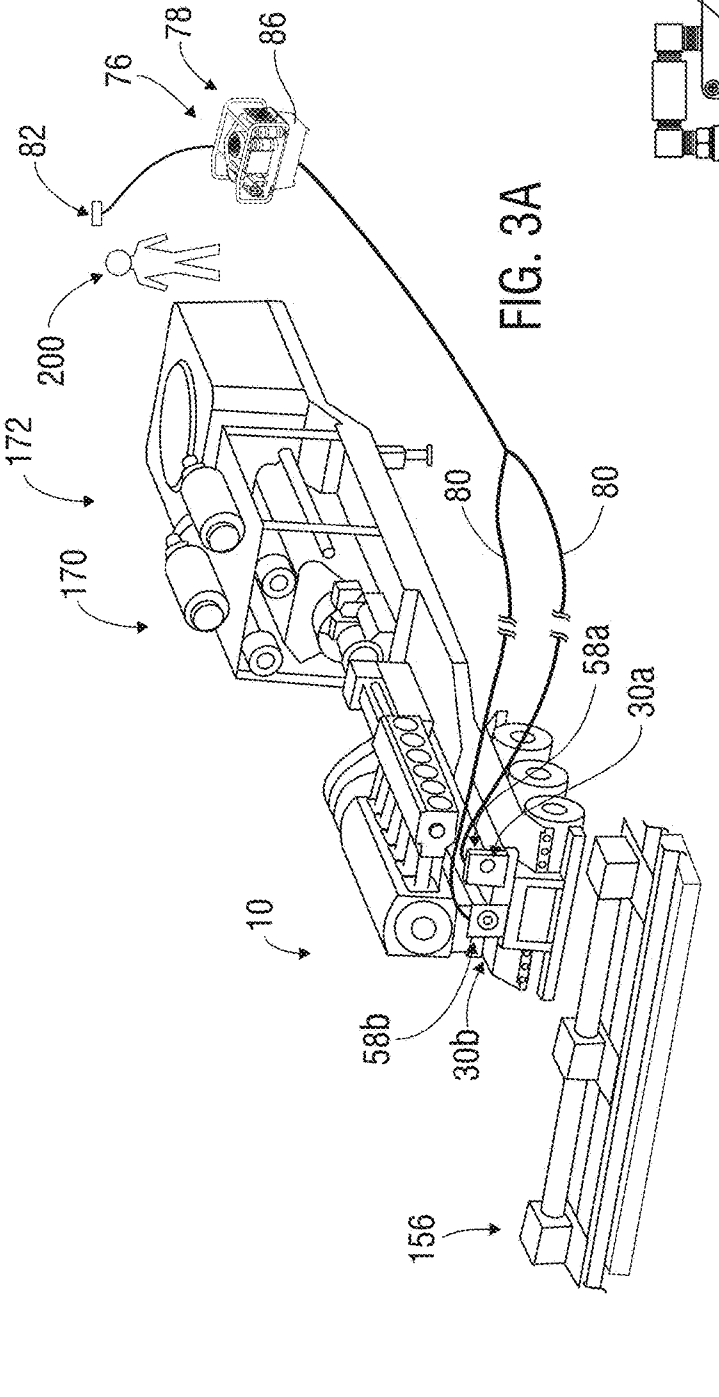
FIG. 3A is another perspective view of parts of an exemplary FPD system including exemplary decoupler actuation-related components in accordance with one or more embodiments of the present disclosure.
Figure 3B:
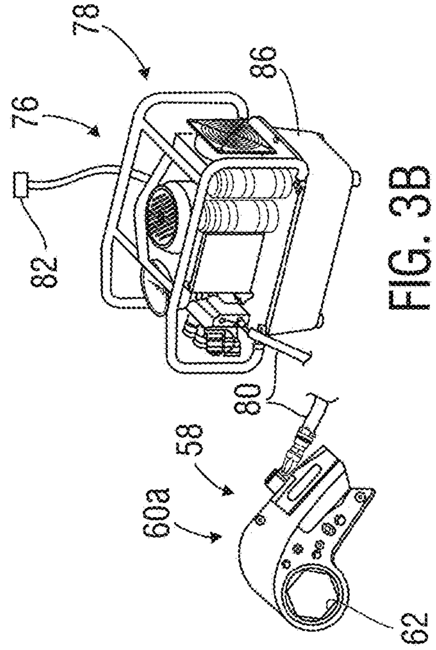
FIG. 3B is another perspective view of parts of an exemplary FPD system in accordance with one or more embodiments of the present disclosure.
Figure 3C:
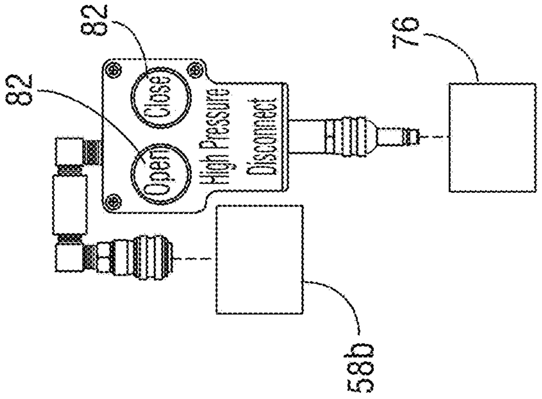
FIG. 3C is a top view of parts of an exemplary FPD system in accordance with one or more embodiments of the present disclosure.

Referring now to FIGS. 3A-C, in another independent aspect of the present disclosure, the exemplary decoupler 30 and/or related components (e.g., actuator 58) may be powered in any suitable manner. For example, each actuator 58 (e.g., torque tool 60) may be self-powered, communicably coupled to one or more power units, or sources, 76 for powering the actuator 58 (or one or more components thereof) or powered in any other manner. In this embodiment, a single power source 76 is configured to power separate actuators 58*a*, 58*b* for the respective LP and HP decoupler 30*a*, 30*b*. In other embodiments, each actuator 58*a*, 58*b* may have its own power source 76 or any other configuration may be used.

In the illustrated example, the socket 62 of each torque tool 60 is hydraulically driven and the power source 76 is a hydraulic power unit 78. Each exemplary torque tool 60 is fluidly coupled to the hydraulic power unit 78 with a pair of hydraulic transmission conduits, such as flexible hoses (e.g., in one or more sheaths 80), but could be communicably coupled to the power source(s) 76 in any other manner. Moreover, the torque tool 60 or other form of actuator 58 may be powered in any other manner, such as with battery, electric, pneumatic, solar, wind, nuclear or other forms of power. For example, one or more power sources 76 may include one or more pneumatic, nuclear, solar, wind or other power units, batteries or electric motors, connections to local power grids or the like. In some instances, the actuator 58 may be self-powered and/or not coupled to any separate power source 76, or multiple (e.g., redundant) power sources 76 may be used.

Still referring to FIGS. 3A-C, the power source(s) 76 may be provided in any desired manner. In the present embodiment, the power source 76 (shown having a hydraulic pump reservoir 86) may be carried on a dedicated support (e.g., vehicle, dolly, wagon, trailer, automated or non-automated carrier or framework that is separate and distinct from other components) such as to allow it to be easily transported and/or moved between different missiles 156, frac pumps 170, FPD systems 10 or work sites and/or for any other purposes. In other embodiments, the power source(s) 76 may be provided on the frac pump carrier 172, disconnect carrier 210 (e.g., FIG. 13A) or other component. Moreover the power source(s) 76, when included, may be provided in any other manner and at any other location.

In another independent aspect of the present disclosure, the decoupler(s) 30 and/or associated actuator 58 (or other components) may be automated and/or actuated automatically, semi-automatically, manually or in any other manner. In the present embodiment, the decouplers 30 are manually actuated by at least one operator 200 located outside the red zone. This may be accomplished in any suitable manner. For example, each decoupler 30*a*, 30*b*, actuator 58*a*, 58*b*, associated power source(s) 76, other related components or a combination thereof may be associated with one or more activators, or switches, 82, such as an electronic or manual, "on-off" or other switch or lever, control button, key, keystroke on an electronic component (e.g., computer, controller, keypad, wearable device, etc.) or other feature or mechanism which can be turned "on" and "off" or otherwise controlled outside the red zone by an operator 200 by hand, via electronic device, hard-wired communication, via wireless communication (e.g., off-site, remotely) or in any other manner (e.g., by signal, touch, voice, biometrics, light, robotic, AI or IoT driven). However, the activator 82 may have any other form, configuration and operation and the decoupler(s) 30 may be activated in any other manner.

If desired, the power source 76 and/or activator 82 may be positioned a desired distances outside the red zone, such as at or near the front end of the frac pump carrier 172 (e.g., trailer 172*a*, truck), where an operator 200 can manipulate the activator(s) 82 to activate the decoupler(s) 30 and initiate connection and/or disconnection of the frac pump 170 (e.g., the LP and/or HP line 174, 176, FIG. 1) from the frac missile 156 (or other components).

Figure 8:
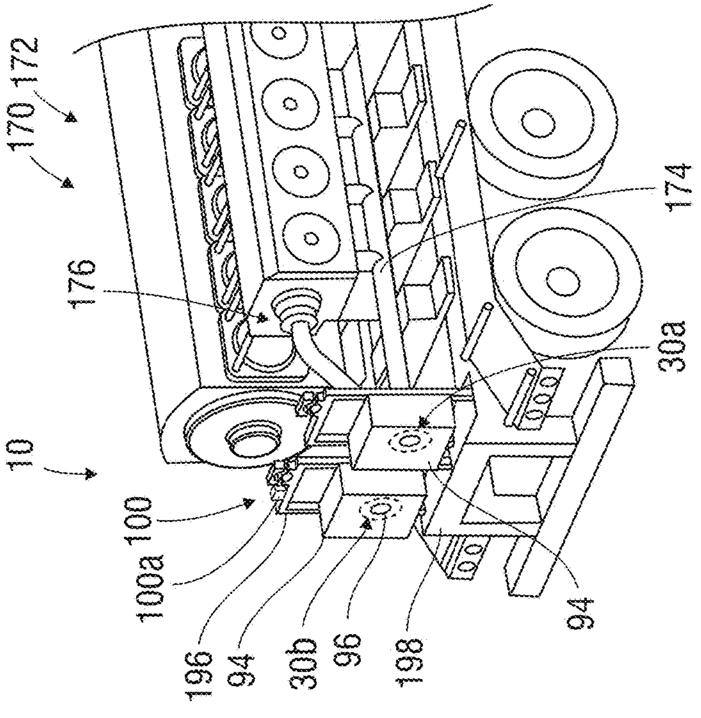
FIG. 8 is another perspective view of parts of an exemplary FPD system in accordance with one or more embodiments of the present disclosure.
Figure 9:
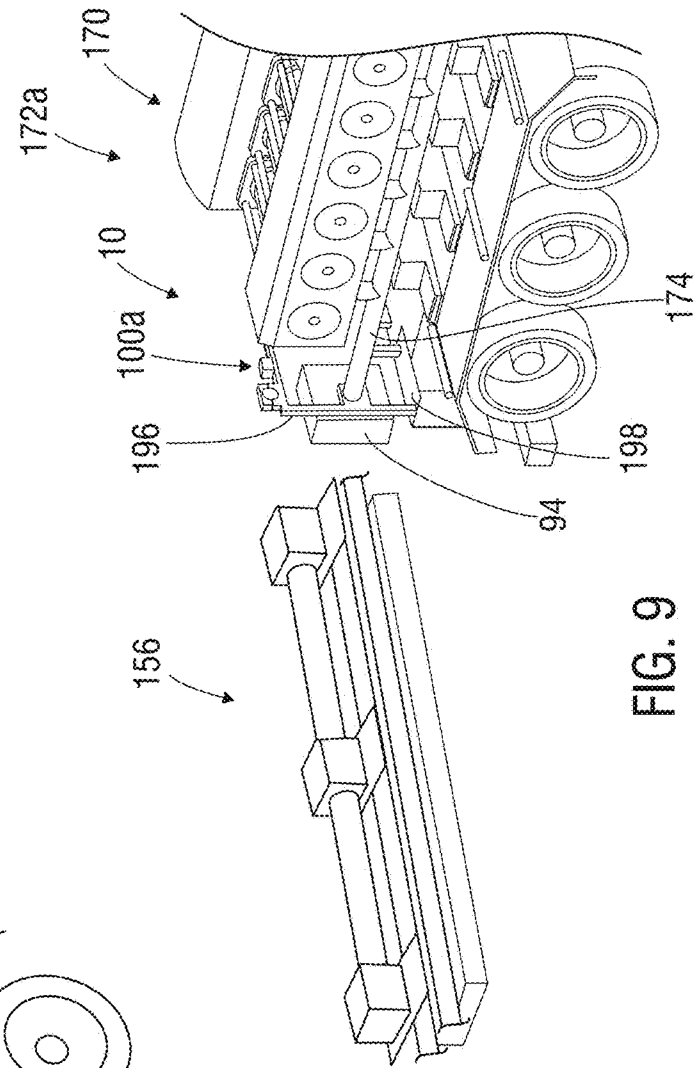
FIG. 9 is another perspective view of parts of an exemplary FPD systemin accordance with one or more embodiments of the present disclosure.

Referring briefly to FIGS. 8 & 9, in another independent aspect, one or more detectors 100 may be used to determine (i) when one or more connectors 178 (e.g., FIG. 7) have been disconnected and/or connected with use of the exemplary FPD system 10 or (ii) any other desired event, variable or condition (e.g., the position of any components). The detector 100 may have any suitable form, configuration, components, location and operation. For example, the detector(s) 100 may include one or more cameras 100*a* configured to provide visual confirmation of the desired event, variable or condition (e.g., connection or disconnection of one or more connectors 178, FIG. 7). For another example, the detector 100 may including one or more sensors to detect the position or movement of, measure the distance of travel of or another variable, event or condition relating to the connector 178 or part thereof (e.g., first and/or second portions 179*a*, 179*b*, nut 184 e.g., FIG. 7) or any other components.

Figure 11:
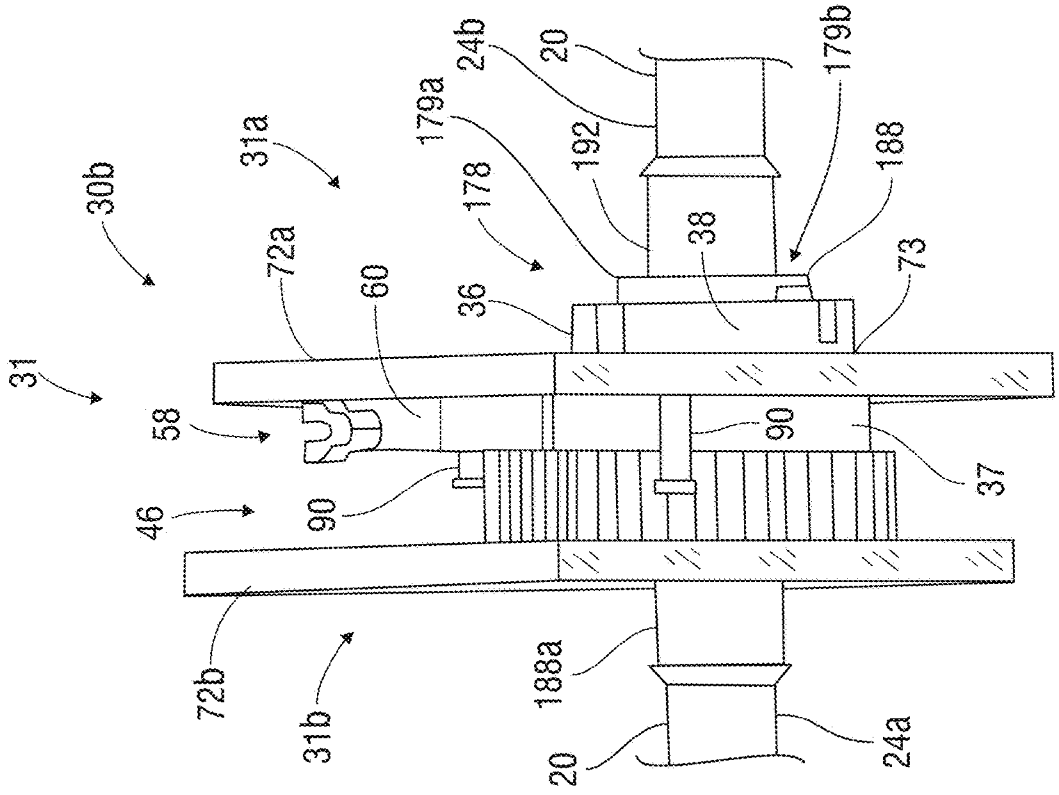
FIG. 11 is a perspective view of the exemplary gearbox shown in FIG. 10 in accordance with one or more embodiments of the present disclosure.
Figure 10:
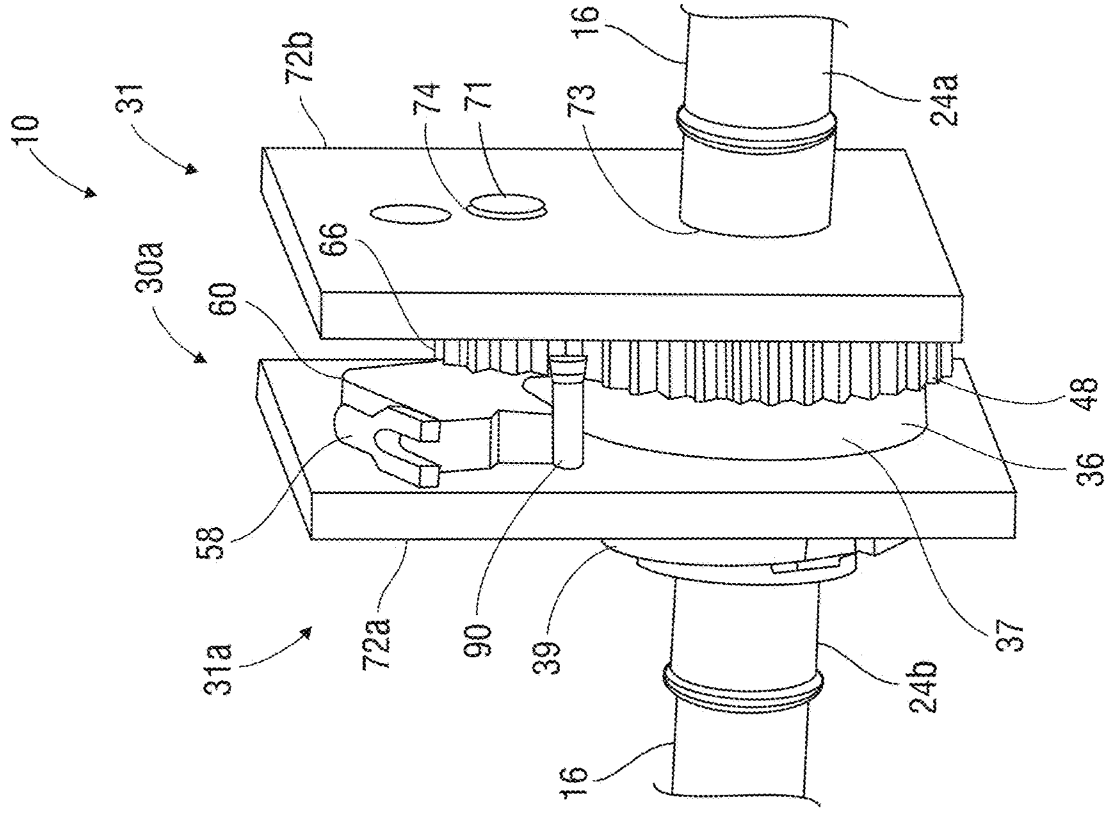
FIG. 10 is a perspective view of an exemplary gearbox in accordance with one or more embodiments of the present disclosure.

Referring now to FIGS. 10 & 11, in yet another independent aspect, the decoupler(s) 30 and related components may be housed, or carried, in any suitable manner. For example, the decoupler(s) 30 and related components may part of a disconnect assembly 31, which may have any suitable components, configuration, location and operation. In the present embodiment, the disconnect assembly 31, sometimes referred to herein as the "gearbox assembly" or "gearbox", includes at least part of the decoupler 30, gear assembly 46 and actuator 58 and one or more carrier plates 72 that house, support or carry them. However, the gearbox 31 may include additional or different components. For example, the gearbox 31 may include one or more portions of the LP or HP connection line 16, 18 (e.g., FIGS. 7 & 14B) and the respective connector portion 179*a*, 170*b* coupled thereto. In the present embodiments, the gearbox 31 may be said to include the first and second pipe section 24*a*, 24*b* and corresponding connector portions 179*a*, 179*b*. For another example, the gearbox 46 may not include any part of the gear assembly 46, such as when a gear assembly 46 is not used to help actuate the rotation drivers 36 or other form of decoupler 30. Other embodiments may not include any carrier plates 72. Accordingly, the gearbox 31 is not limited to configurations that include gear components or carrier plates.

In the present embodiment, each decoupler 30*a*, 30*b* is associated with a separate gearbox 31 having a dedicated pair of front and rear carrier plates 72*a*, 72*b*. However, in other configurations, both decouplers 30*a*, 30*b* may be housed in or associated with the same gearbox 31 and carrier plates 72*a*, 72*b*, or with any other components (e.g., suspended in, mounted on or otherwise associated with a mandrel, carrier sleeve, pedestal, housing other support structure or component). Accordingly, the present disclosure is not limited to the use of a gearbox 31 or carrier plates 72 for carrying or housing the decoupler(s) 30 and other components.

Still referring to FIGS. 10 & 11, the carrier plate(s) 72 may have any suitable form, configuration, components and operation. In this embodiment, each carrier plate 72 is an at least substantially flat, at least substantially vertically-oriented plate or any other form of component. Thus, while the illustrated carrier plates 72 are plates, they may have any other form or configuration. When the exemplary gearbox 31 is assembled, the carrier plates 72*a*, 72*b* of each pair may be generally upright, rigidly coupled, parallel and spaced-apart (e.g., via one or more spacers 298 (e.g., tap-end studs), FIG. 14E). The plates 72*a*, 72*b* may be maintained in spaced relationship to help position, protect and prevent interference with components mounted therebetween (e.g., primary gear wheel 48, pinion gear 66) or held thereby, for any other purposes or a combination thereof. In this embodiment, the plates 72*a*, 72*b* are held in spaced relationship by two upper spacers 298 (short tension rods) and two torsion bars 266 serving as long, lower spacers 298, but any other quantity, form and configuration of spacers 298 may be used.

The illustrated carrier plates 72*a*, 72*b* include alignable respective main bores 73 that allow the passage therethrough and/or alignment of at least part of the corresponding HP or LP connection line 20, 16 and/or the connector portion 179*a*, 179*b* carried thereby and/or access thereto, for any other purposes or a combination thereof. In this example, the aligned bores 73 of the carrier plates 72*a*, 72*b* allow at least partial passage therein of the first and/or second portions 179*a*, 179*b* of the rotatably-engageable connector 180 and the associated respective first and/or second pipe sections 24*a*, 24*b*.

One or more components of the exemplary decoupler 30 may be coupled to or associated with one or more carrier plates 72 in any suitable manner. In this embodiment, the exemplary rotation tool 36, gear assembly 46 and actuator 58 (e.g., torque tool 60) are at least partially mounted between the carrier plates 72*a*, 72*b*, such as to help support and position them, shield them from debris, isolate them for personnel safety, position them relative to the connector 178 (e.g., the first and second portions 179*a*, 179*b*), for any other purposes or a combination thereof. For example, the primary gear wheel 48 may be coupled to the rear of the rotation tool 36 and held in position (e.g., sandwiched) between the rotation tool 36 and rear carrier plate 72*b*.

In other embodiments, the rotation tool 36, gear assembly 46, actuator 58 and/or other components related thereto may not be located between the carrier plates 72*a*, 72*b*. For example, in FIGS. 14C-D, the actuators 58 (e.g., torque tools 60*a*, 60*b*) are shown coupled to the rear of the respective rear carrier plates 72*b*, where they engage a finger 71 of the pinion gear 66 (or other components).

Referring again to FIGS. 10 & 11, the central bores 39, 56 of the exemplary respective rotation tool 36 and primary gear wheel 48 may be at least partially aligned with the main bores 73 of the carrier plates 72*a*, 72*b* (e.g., FIGS. 6 & 7), such as to allow the passage therethrough of at least part of the connector 178 (e.g., the first and/or second connector portions 179*a*, 179*b*) and the associated respective first and/or second pipe section 24*a*, 24*b* and/or for any other purposes. In the illustrated embodiments, the aligned bores 39, 56 and 73 allow at least partial passage therethrough of the first portion 179*a* of the illustrated rotatably-engageable connector 180 and at least part of the associated first pipe section 24*a*. The large-OD portion 37 of the illustrated rotation tool 36 may be located between the carrier plates 72*a*, 72*b* (e.g., to abut the back of the front carrier plate 72*a*) and allow the small-OD portion 38 to extend through the bore 73 of the front carrier plate 72*a* with the notches 40 positioned forward of the front carrier plate 72*a* to engage the desired part of the connector 178 (e.g., lugs 186 of nut 184) and/or for any other purposes.

Referring briefly back to FIGS. 6 & 7, the exemplary pinion gear 66 has front and rear fingers 71, which fit into and are rotatable within corresponding receiver holes 74 of the respective carrier plates 72*a*, 72*b* to help retain the pinion gear 66, primary gear wheel 48, rotation tool 36 and actuator 58 (e.g., which slides onto one of the fingers 71) in position between the carrier plates 72*a*, 72*b* and/or for any other purposes. If desired, one or more removeable and/or replaceable bushings, or wear rings, 75 may be provided in one both receiver holes 74. For example, the wear rings 75 may be constructed of material (e.g., brass, bronze, etc.) that is softer than the material of the carrier plates 72*a*, 72*b* and/or the fingers 71 of the pinion gear 66 or other components situated therein, so that impact or contact between them may cause wear or damage to the wear ring(s) 75 before (e.g., substantially) wearing or damaging those other components.

Now referring back to FIGS. 10 & 11, in some embodiments, one or more reaction, or biasing, arms 90 may be provided to prevent undesirable rotation of the actuator 58 and/or for any other purposes. In the illustrated embodiment, a pair of reaction arms 90 extend at least partially between the plates 72*a*, 72*b* into corresponding alignment pin holes 92 in either or both plates 72*a*, 72*b* to limit rotation of the torque tool 60 in one direction when the decoupler 30 is used to disconnect the connector 178 and in the other direction if the decoupler 30 is used to connect the connector 178.

If desired, the carrier plate 72 may be universal and used as either the front or rear carrier plate 72*a*, 72*b* for both the LP and HP decouplers 30*a*, 30*b*. In other words, for some embodiments, only one form and configuration of carrier plate 72 need be manufactured, stored, transported, stocked, replaced, etc. The carrier plate 72 may be made universal in any suitable manner. For example, all, most or many of the components that extend through or engage the carrier plate 72 can be interchangeable for both the LP and HP decouplers 30*a*, 30*b*. In the present embodiment, all such components are interchangeable, except the LP connection line 16 and potentially other components related thereto may have a larger OD than the HP connection line 20 (and potentially other components related thereto). In such instances, the main bore 73 of the exemplary carrier plate 72 may be configured to accommodate different sized connection lines 16, 20 and related components (e.g., connector portions 179*a*, 179*b*) that may pass therethrough.

Figure 14E:
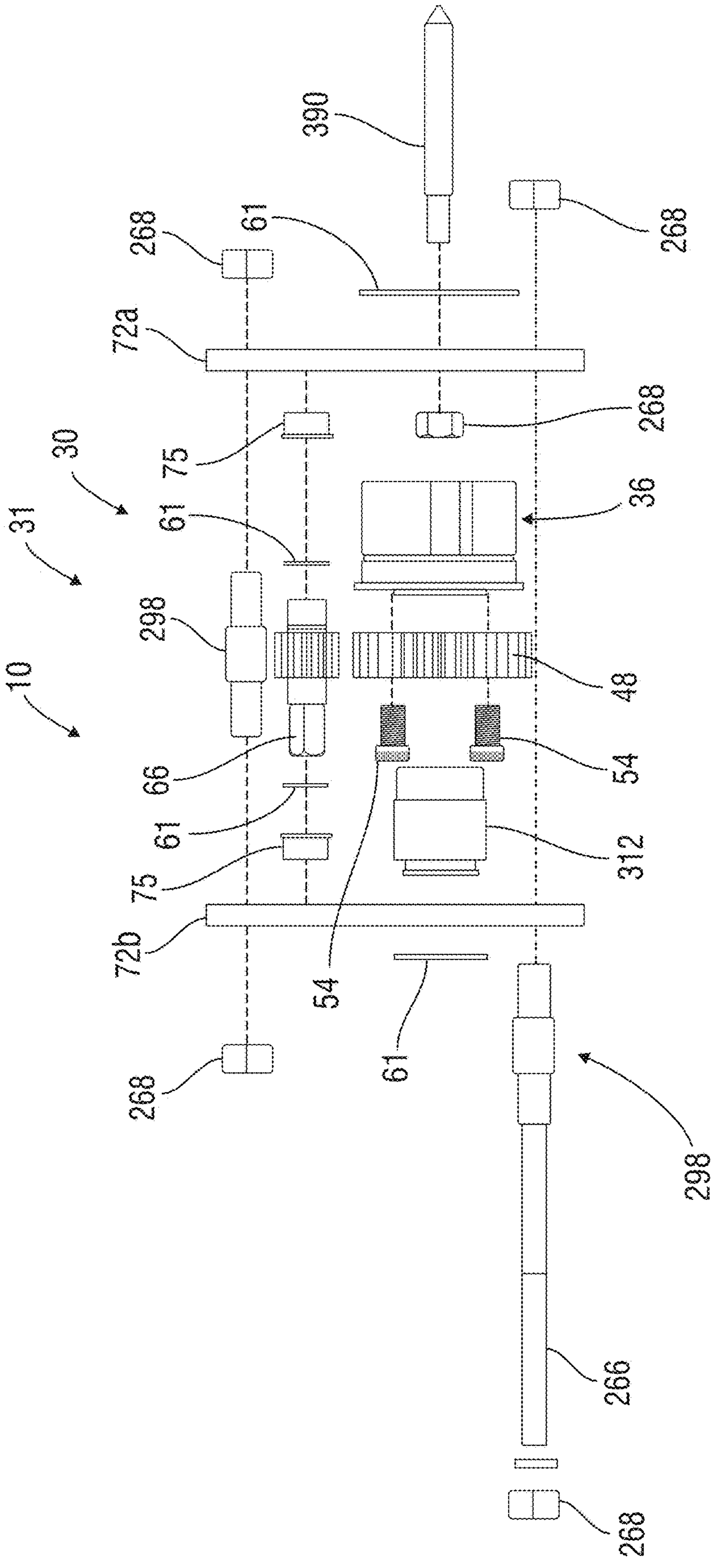
FIG. 14E is an exploded view of parts of an exemplary gearbox and other components of the exemplary FPD system in accordance with one or more embodiments of the present disclosure.
Figure 14F:
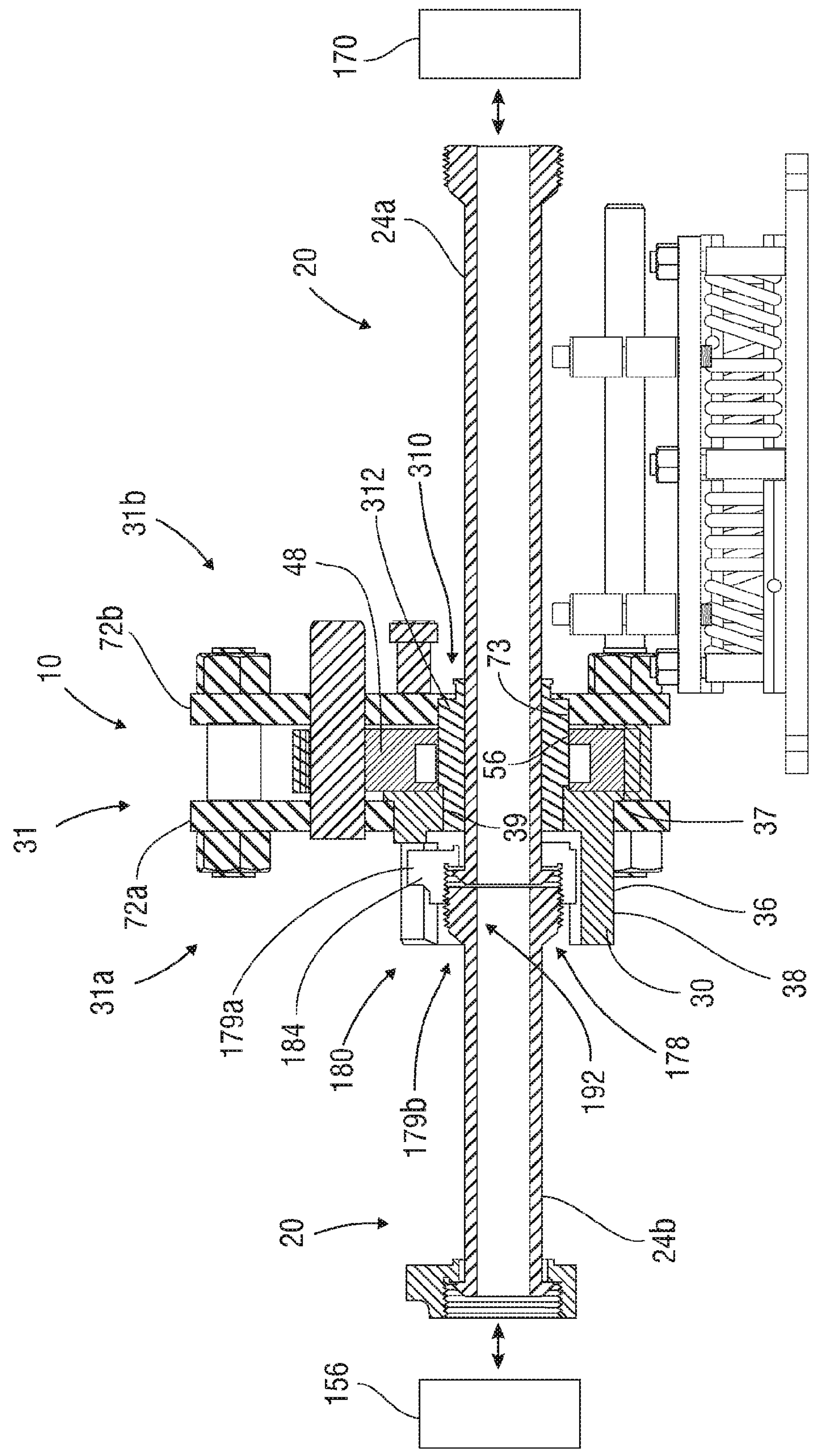
FIG. 14F is a partial cross-sectional view of parts of an exemplary FPD system in accordance with one or more embodiments of the present disclosure.

Jumping to FIG. 14F, the main bore 73 of the exemplary "universal" carrier plate 72 may be configured to accommodate different sized connection lines 16, 20 and related components in any suitable manner. For example, the main bore 73 may have an adjustable inner diameter (ID) to accommodate any expected sized pipes and related components. In some embodiments, the carrier plate 72 may have a selectively adjustable-ID retractor or other mechanism useful to vary the ID of the main bore 73 thereof. In the present embodiment, the ID of the main bore 73 of the universal carrier plate 72 is sized to accept the larger expected OD-sized components (e.g., the LP connection line 16, FIG. 14A) and can be selectively narrowed to accept the smaller expected OD-sized components (e.g., the HP connection line 20). For example, at least one filler, or size-adjuster, 310 may be inserted into the main bores 73 of corresponding carrier plates 72 to narrow the ID thereof to fit and/or allow the passage therethrough of smaller expected OD-sized components (e.g., the first pipe section 24*a* of the HP connection line 20) and/or related components.

When included, the size-adjuster 310 may have any suitable form, configuration, components and operation. In this embodiment, the size-adjuster 310 includes a removeable, replaceable bushing 312, which may extend through the main bores 73 of both carrier plates 72*a*, 72*b* of the gearbox 31 and also the central bores 39, 56 of the exemplary respective rotation tool 36 and primary gear wheel 48 (e.g., FIGS. 6 & 7), when included. The illustrated bushing 312 is shown held in position via a snap wire 312, but could be retained in place with any other features or components or in any other manner.

Still referring to FIG. 14F, the first pipe section 24*a* of the HP connection line 20 coming from the frac pump 170 may typically extend through the bushing 312 from the rear end 31*b* to the front end 31*a* of the gearbox 31. The second pipe section 24*b* of the exemplary HP connection line 20 coming from the frac missile 156 will typically extend from the general direction of the frac missile 156 to the front end 31*a* of the gearbox 31. At or near the front end 31*a* of the illustrated gearbox 31, the connection portions 179*a*, 179*b* carried by the first and second pipe sections 24*a*, 24*b* are typically engaged and disengaged. The illustrated bushing 312 may be configured to help align whichever connector portion 179*a*, 179*b* is carried on the first pipe section 24*a* with the connector portion 179*a*, 179*b* carried on the second pipe section 24*b*. Other embodiments may have an entirely different configuration of components. If desired, the bushing 312 (or other form of size-adjuster 310) may also, or instead, help preserve the integrity and/or shape of the bores 39, 56, 73 within which it is situation and/or the HP connection line 20 (or other components) disposed in the bushing 312. For example, the size-adjuster 310 may be formed at least partially of material (e.g., brass, bronze, etc.) that is softer than those adjacent components so impact or contact between them may cause wear or damage to the replaceable size-adjuster 310 before (e.g., substantially) wearing or damaging the other components. However, any other form and configuration of components may be used or the size-adjuster 310 may not be included. Moreover, when included, the decoupler 30, gearbox 31, carrier plates 72 and actuator 58 may have any other form, configuration, components, construction and operation.

Referring now back to FIG. 14A, in another independent aspect, one or more stops, or linear movement inhibitors, 320 may be associated with those portions of the LP and HP connection lines 16, 20 (e.g., first pipe sections 24*a*) that extend into the rear of the exemplary gearboxes 31 from the frac pump 170. The exemplary stop(s) 320 may be provided to prevent that part of the connection line 16, 20 from undesirably sliding forward in, or through, the gearbox 31 (e.g., carrier plates 72*a*, 72*b*) and/or for any other purposes. For example, in use of the exemplary FPD system 10, after the illustrated first and second pipe sections 24*a*, 24*b* of the LP or HP connection line 16, 20 are disconnected, the second pipe sections 24*b* and related components may typically drop away from gearbox 31. After both LP or HP connection line 16, 20 are disconnected, the exemplary FPD system 10 may then be moved away from the frac missile 156 (e.g., via the disconnect trailer 212, frac pump carrier 172, etc.). At that time, it may not be desirable for the first pipe section 24*a* to slide, or move, forward in the illustrated gearbox 31, such as through the main bore 73 of either associated carrier plate 72*a*, 72*b* (or other components), which may be preventable with the exemplary stop(s) 320.

Still referring to FIG. 14A, when included, the stop 320 may have any suitable form, configuration, components and operation. In this embodiment, the stop 320 includes at least one projection 322 extending sufficiently radially outwardly from the pipe section 24*a* sufficient to abut or engage the backside of the rear carrier plate 72*b* (or other components) and prevent the pipe section 24*a* from undesired forward linear movement. Typically, the exemplary projection(s) 322 may be rigidly coupled to, or integral with, the pipe section 24*a* and sufficiently rigid and secure to keep the pipe section 24*a* from such movement (e.g., when subject to increased friction, pulling or pushing forces or the like).

Figure 15:
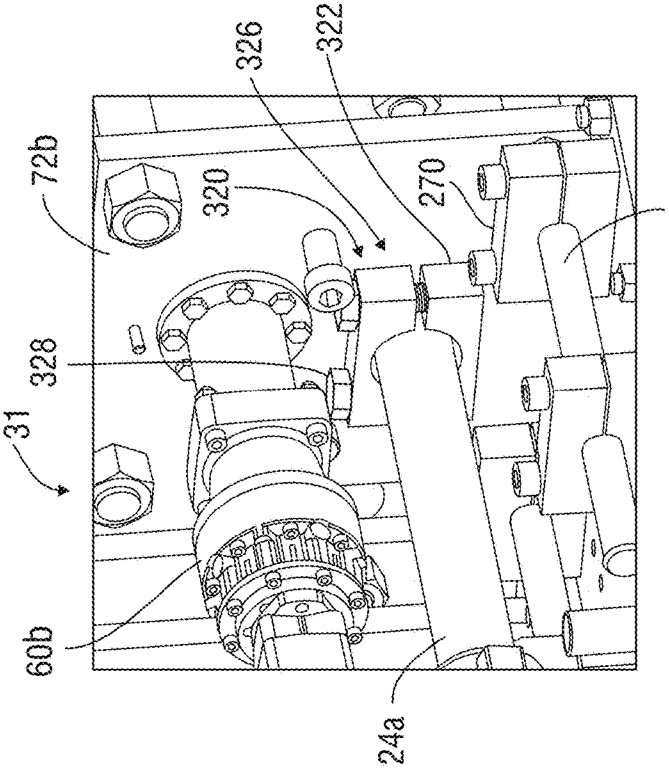
FIG. 15 is a perspective view of parts of an exemplary FPD system having an exemplary stop associated with an exemplary pipe section in accordance with one or more embodiments of the present disclosure.

In some embodiments, the projection 322 may include one or more large-OD portions, or shoulders, of the pipe section 24*a* to provide an OD that is greater than the ID of the main bore 73 of the rear carrier plate 72*b*. For other examples, the projection 322 may include one or more snap wires, sleeves or like components coupled to or tightened down at least partially around the pipe section 24*a*. In the embodiment of FIG. 15, the projection 322 is in the form of a pipe clamp 326 secured around the pipe section 24*a*, such as with bolts 328 or in any other manner. However, the stop(s) 320 may have any other configuration of components and operation. For example, the stop 320 or one or more portions thereof may be disposed on the rear carrier plate 72*b* or another part of the gearbox 31 or other component. In some embodiments, the stop 320 may include mating features on numerous components, such as the pipe section 24*a* and rear carrier plate 72*b* or one or more intermediate components. Moreover, some embodiments may not need or include any stops 320.

Referring now back to FIG. 14B, in another independent aspect, the FPD system 10 may include one or more yokes, or anti-rotation devices, 370 to help prevent undesirable rotation of one or more pipe sections 24, its corresponding connector portion 179*a*, 179*b* and/or other components, for any other purposes or a combination thereof. This may be particularly warranted, for example, when the FPD system 10 is used to connect and or disconnect rotatably-engageable connectors 180. In this embodiment, a yoke 370 is used to prevent undesirable rotation of the second pipe section 24*b* (and other components) for each of the LP and HP connection lines 16, 20 at least during actuation of the associated decoupler 30. However, other embodiments may include a yoke 370 for use with only one of the LP and HP connection lines 16, 20 or a single yoke 370 may be provided for use with both. For another example, one or more yokes 370 may be configured to allow some desired rotation.

Figure 16B:
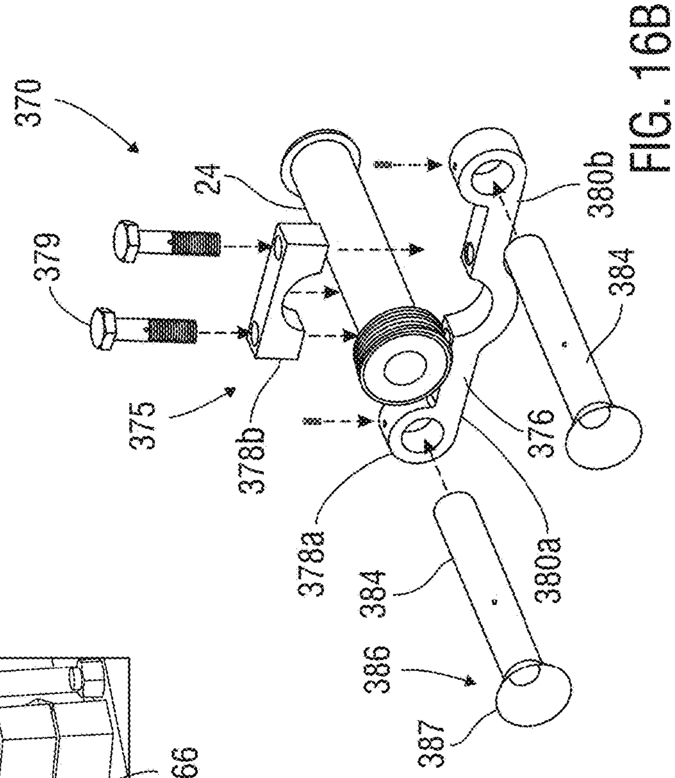
FIG. 16B is an exploded view of the exemplary anti-rotation device shown in FIG. 16A in accordance with one or more embodiments of the present disclosure.
Figure 16A:
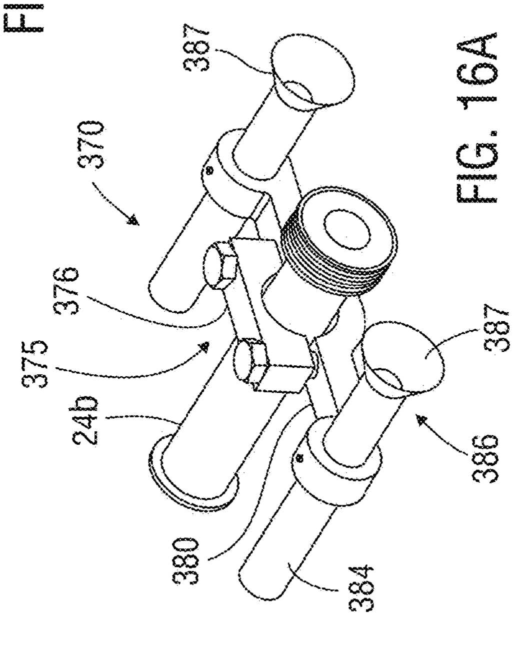
FIG. 16A is a perspective view of parts of an exemplary anti-rotation device in accordance with one or more embodiments of the present disclosure.

When included, the yoke(s) 370 may have any suitable form, configuration, construction, components and operation. Referring to FIG. 16A-B, each exemplary yoke 370 includes at least one main body 375 that (e.g., releasably) rigidly grips the second pipe section 24*b* so they are rotatably locked. For example, the main body 375 may include a gripper, or clamp, 376 that wraps at least partially around the second pipe section 24*b*. The illustrated main body 375 may also include at least one arm 380 extending laterally outwardly therefrom and which may be integral therewith or rigidly (e.g., releasably) coupled thereto. At least one elongated receiver 384 extends from the exemplary arm(s) 380 in the forward and rear directions. For example, a first arm 380*a* may extend to one side of the clamp 376 and a second arm 380*b* may extend to the opposite side (or other location), each arm 380*a*, 380*b* having a respective receiver 384. The exemplary main body 375, arm(s) 380 and receiver(s) 384 are configured to be rotatably locked.

In this embodiment, the clamp 376 includes first and second clamp portions 378*a*, 378*b* releasably, rigidly interconnected and rotatably locked with one or more fasteners 379 or in any other suitable manner. The exemplary fasteners 379 are bolts threaded into the second clamp portion 378*b* and configured to prevent rotation of the main body 375 and second pipe section 24*b* under the expected torque applied thereto. The illustrated arms 380*a*, 380*b* are shown extending from the first clamp portion 378*a* (which could be on top or bottom of the pipe section 24*b*).

Still referring to FIG. 16A-B, each illustrated receiver 384 is hollow, or includes a main bore extending longitudinally therethrough, and is slidably engageable over a spear, or bar, 390 (e.g., FIG. 14B) extending outwardly from the front end 31*a* of the gearbox 31 (e.g., front carrier plate 72*a*). The exemplary spear 390 is a solid rod with a tapered (e.g., pointed) front end and is rigidly coupled to the gearbox 31, such as with one or more nuts 268 (e.g., FIGS. 14A & 14E), but could be hollow or take any other suitable form and configuration. When included, the spear 390 may be used to align the yoke 370 with the gearbox 31 and/or other component, bear forces placed thereupon by the receiver 384 (e.g., during actuation of the decoupler 30), for any other purposes or a combination thereof.

If desired, each receiver 384 may include one or more alignment portions 386 to assist in aligning the receiver 384 over the corresponding alignment spear 390 and/or for any other purposes. For example, the alignment portion 386 may include a rearward facing guide 387 (e.g., cone, or funnel), or other components or features. However, the anti-rotation device 370 may have any other form, configuration, components, construction, location and operation or not be included.

Shifting briefly back to FIGS. 8 & 9, in another independent aspect, the decoupler(s) 30 and related components (e.g., gearbox 31) may be fully or partially contained within one or more enclosures 94, such as for protection from debris, personnel safety and/or for other purposes. In the present embodiment, the LP and HP decouplers 30*a*, 30*b* each have a separate enclosure 94, but could instead be at least partially contained in the same enclosure 94 or other structure. If desired, the enclosure 94 (e.g., box, encasement) may contain the decoupler 30 and associated carrier plates 72 (e.g., FIG. 7), or one or both plates 72 could at least partially serve as or be part of any among upper, lower and sides or other parts of the enclosure 94. In various embodiments, when the exemplary enclosure 94 encloses the decoupler 30, one or more openings 96 may be provided therein through which at least part of the corresponding LP or HP connection line 20, 16 and/or associated connector portions 179*a*, 179*b* (e.g., FIG. 7) can pass, drop out, be removed or a combination thereof. It should be noted that the HP decoupler 30*b* is shown without the front carrier plate 72*a* or enclosure 94 in FIGS. 1-4 to help show certain components.

Still referring to FIGS. 8 & 9, in yet another independent aspect of the present disclosure, the decoupler(s) 30 and related components may be provided at any desired location in any suitable manner. For example, the decoupler(s) 30 and related components may be carried on the frac pump 170, frac pump carrier 172, frac missile 156 or other components (e.g., LP and/or HP bleed-off manifolds, disconnect carrier 210 (FIG. 13A)). For the reader's convenience, whatever unit(s) or structure(s) a decoupler 30 and related components are carried on in any particular arrangement is sometimes referred to herein generally as the "underlying structure". In some embodiments, the decoupler(s) 30 and related components may be directly coupled to, or be integral with (e.g., forged or machined) or permanently affixed (e.g., via weld) to the underlying structure.

In other embodiments, the decouplers 30*a*, 30*b* (and related components) may be releasably mounted to, or carried on, the underlying structure, such as via one or more support frames 196, pedestals 198, platforms 199 (e.g., FIG. 14A) and/or any other components. In the illustrated embodiment, each decoupler 30*a*, 30*b* is shown mounted to a distinct frame 196 that is mounted to a common pedestal 198 (e.g., the frac pump trailer 172*a* frame; see also, FIG. 4). If desired, the decoupler(s) 30 or related components may be equipped with one or more universal couplings 216 (e.g., FIG. 14G), such as slide-in or mateable connectors, hitches or other couplings or the like, to be quickly and easily coupled to any known, many, most, or some versions of frac pump carriers 172, frac missiles 156 or other components without any, or minimal modification, to the underlying structure.

The support frame 196, pedestal 198, platform 199 and/or other components useful to help mount the decoupler(s) 30 (and related components) to the underlying structure may have any suitable form, configuration components, construction and operation. For example, in FIG. 14A, each gearbox 31, or pair of carrier plates 72*a*, 72*b*, is carried on a separate and distinct platform 199 mounted to the underlying structure (e.g., the disconnect trailer 212). In this embodiment, each platform 199 included an upper support plate 260 that is interconnectable with the corresponding gearbox 31 (or carrier plates 72*a*, 72*b*) and underlying structure. In other embodiments, both gearboxes 31 (or all carrier plates 72) may be carried on the same platform 199 (e.g., upper support plate 260) or in any other manner.

When included, the upper support plates 260 may have any suitable form, configuration, components and operation. In this embodiment, each upper support plate 260 is an at least substantially flat, at least substantially horizontally-oriented plate or any other form of component. Thus, while the illustrated upper support plates 260 are plates, they may have any other form, configuration and construction.

Still referring to FIG. 14A, the exemplary gearbox 31, or pair of carrier plates 72*a*, 72*b*, may be carried on the platform 199 in any suitable manner. This may be done with at least one connector, or torsion, rod 266 and or other components. When included, the torsion rod 266 (or other connection components) may have any suitable form, configuration, construction and operation. For example, the torsion rods 266 may have additional purposes beyond coupling the carrier plates 72 to the platform 199, such as to help counter torque applied to the platform 199 (e.g., upper support plate 260) from the carrier plates 72 and prevent them from flipping over during actuation of the decoupler(s) 30 and/or at other times. For another example, as shown in FIG. 14E, the illustrated torsion rod 266 will act as a spacer 298 to help maintain the plates 72*a*, 72*b* in spaced relationship. (While briefly referencing FIG. 14E, this illustration shows various exemplary components of the gearboxes 31 of FIGS. 13A-14D, including exemplary retainer rings 61 not described elsewhere herein and which are useful, for example, to retain the associated components in their desired positions and/or for any other purposes.)

Referring back to FIG. 14A, in this embodiment, a separate, elongated, generally horizontally-extending torsion rod 266 is coupled between the left and right lower corners of each carrier plate 72*a*, 72*b* and the corresponding upper support plate 260. An exemplary torsion rod 266 is shown extending at least partially along or proximate to the left and right sides of the corresponding upper support plate 260. However, any other configuration of any number of upper support plates 260 and torsion rods 266 or other components may be used for coupling the carrier plates 72 to the underlying structure.

Figure 17B:
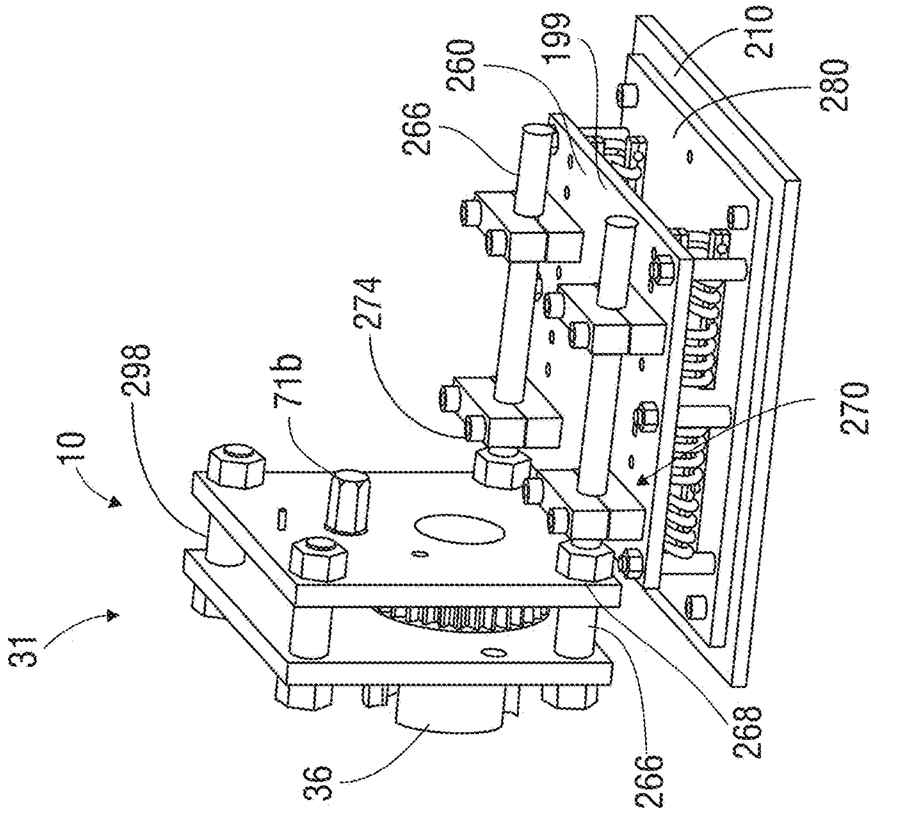
FIG. 17B is a perspective view of the exemplary gearbox connection system shown in FIG. 17A in accordance with one or more embodiments of the present disclosure.
Figure 17A:
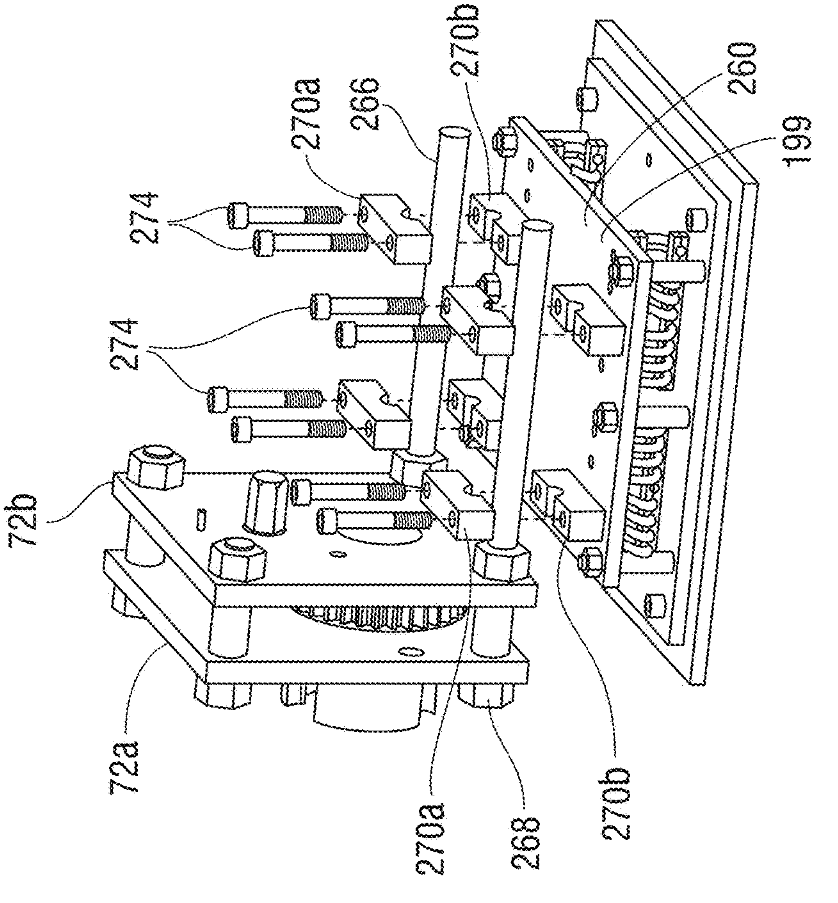
FIG. 17A is an exploded view of parts of an exemplary gearbox connection system in accordance with one or more embodiments of the present disclosure.

Referring now to FIGS. 17A-B, in some configurations, the torsion rod 266 may be rigidly coupled to the corresponding gearbox 31, or carrier plates 72*a*, 72*b*, and selectively moveable relative to the platform 199. This may be desirable, for example, to change the position of the gearbox 31 or carrier plates 72 (and corresponding decoupler 30 and other components) relative to the platform 199 and underling structure, such as to disengage the rotation tool 36 from at least part of the corresponding connector 178 or expose one or both connector portions 179*a*, 179*b* (e.g., FIG. 14B), redistribute weight on the underlying structure, reposition the decoupler(s) 30 relative to other components (e.g., one or both connector portions 179*a*, 179*b*, the frac pump 170 or frac missile 156 (e.g., FIG. 13A)), for any other purposes or a combination thereof.

Still referring to FIGS. 17A-B, changing the position of the gearbox 31 or carrier plates 72 and related components relative to the platform 199 and underlying structure (e.g., the disconnect carrier 210, FIG. 14B) may be accomplished in any suitable manner. In this embodiment, each torsion rod 266 is rigidly releasably secured to the corresponding carrier plates 72*a*, 72*b* via threadable engagement with front and rear nuts 268 or any other suitable components. Each exemplary torsion rod 266 is coupled to the associated upper support plate 260 (or other form of platform 199) with two respective pairs of spaced-apart upper and lower mounting block (e.g., C-clamp) portions 270*a*, 270*b* (or any other suitable components) via one or more corresponding fasteners 274. The exemplary fasteners 274 (e.g., socket head cap screws) are configured to extend through the upper and lower mounting block portions 270*a*, 270*b* and (e.g., threadably) engage the platform 199.

In this embodiment, the fasteners 274 can be loosened when desired to move the corresponding torsion rod 266 (gearbox 31, carrier plates 72*a*, 72*b* and other components) forward (e.g., FIG. 18A) and rearward (e.g., FIG. 18B), such as up to 6" or more or less, relative to the LP and HP connection lines 16, 20 (e.g., first and second pipe sections 24*a*, 24*b* & connector portions 179*a*, 179*b*), platform 199 and underlying structure and then tightened to secure their new position. In some instances, this process may be automated to allow movement of the torsion rod 266 (carrier plates 72*a*, 72*b* and components carried thereby) forward and rearward without any operators 200 in the red zone. However, the torsion rods 266 (or other components) may be rigidly coupled to the corresponding carrier plates 72*a*, 72*b* (or other component(s)) and/or selectively moveable forward and rearward with any other components and in any other manner. Moreover, in some embodiments, the torsion rods 166 may not be rigidly coupled to the carrier plates 72 and/or not moveable relative to the LP and HP connection lines 16, 20, platform 199 and/or other components.

Figure 18B:
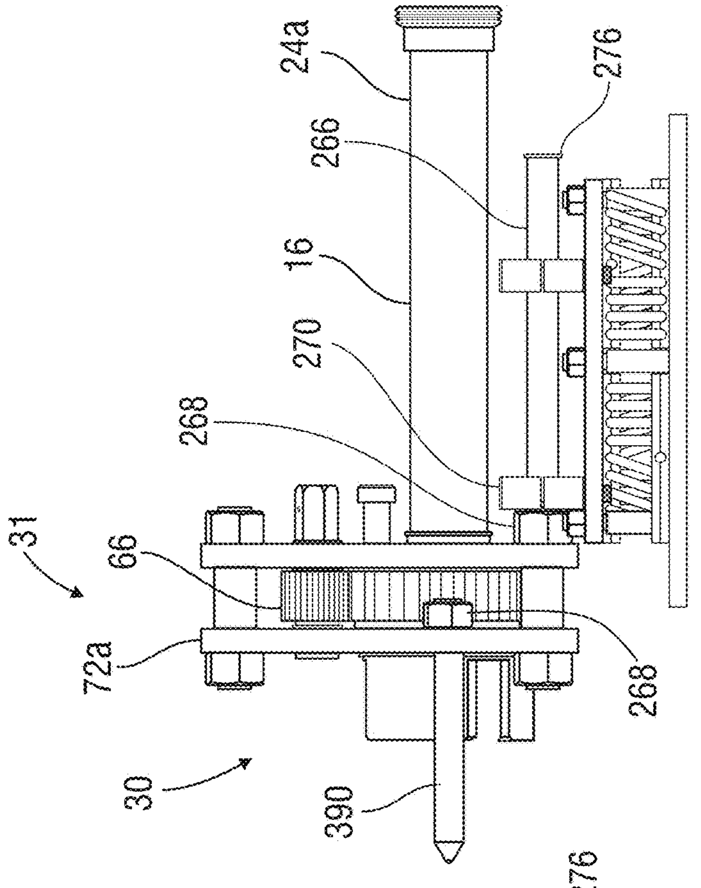
FIG. 18B is a side view of the exemplary gearbox connection system of FIG. 18A showing the exemplary torsion rods in a rear-most position in accordance with one or more embodiments of the present disclosure.
Figure 18A:
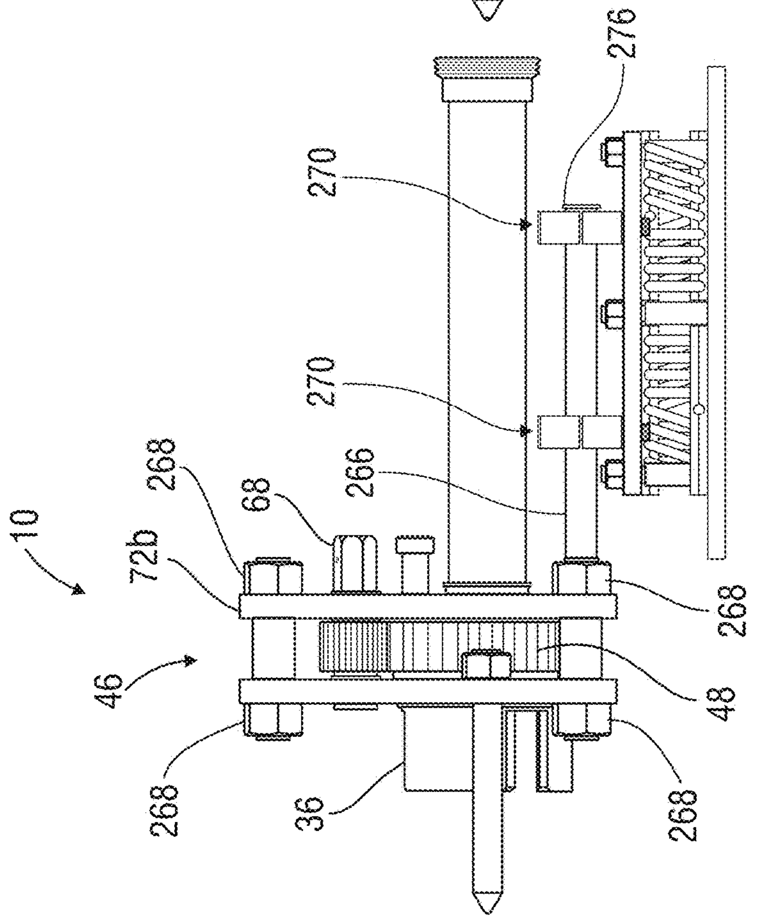
FIG. 18A is a side view of parts of an exemplary gearbox connection system showing exemplary torsion rods in a forward-most position in accordance with one or more embodiments of the present disclosure.

Referring now to FIGS. 18A-B, if desired, the torsion rod 266 may have defined forward-most and/or rearward-most (or any other) positions. This may be accomplished in any suitable manner with any desired components. For example, the forward-most position of the torsion rod 266 (FIG. 18A) may be reached when a stop 276 (e.g., cap, ring, etc.) or other component at the end of, or at another location on, the torsion rod 266 abuts at least part of the rear-most corresponding mounting block 270 (or other component). The rear-most position of the exemplary torsion rod 266 (FIG. 18B) may be reached when the nut 268 securing the torsion rod 266 to the rear carrier plate 72*b*, or a different feature or component, abuts the forward-most corresponding mounting block 270 (or other component). However, any other components may be used to define one or more positions of the torsion rod 266 or other components.

In FIGS. 14B, the exemplary FPD system 10 is shown in an exemplary operating position with the torsion rods 266 in a forward-most position (e.g., FIG. 18A) and the rotation tool 36 of each respective decoupler 30*a*, 30*b* shown at least substantially encapsulating the nut 184 of the respective first connector portions 179*a*. From this operating position, the rotation tool 36 can be disengaged from the connector 178 and/or one or both connector portion 179*a*, 179*b* can be exposed by moving the corresponding exemplary torsion rods 266 rearward as desired. This may be warranted, for example, upon a malfunction of the associated decoupler 30, problem with the connector 178 or other components or other events or at any other time, such as to be able to manually connect or disconnect the connector 178 (e.g., bang on the HU nut 194*a*), allow access to the connector portions 179*a*, 179*b*, inspect the connector 178 or other components of the FPD system 10, for any other purposes or a combination thereof. It should be noted that while the illustrated operating position of the FPD system 10 in FIG. 14B shows the torsion rods 266 in a forward-most position, the present disclosure is not limited to this particular configuration. Depending upon the embodiment, the FPD system 10 may be in an operating position with the torsion rods 266 in any other desired position relative to the platform 199, underlying structure or other components.

Referring briefly back to FIGS. 8 & 9, when included, the support frame 196, pedestal 198, platform 199 and/or any other components useful to help mount the decoupler(s) 30 and related components to the underlying structure may be integral with, or directly or indirectly coupled to, the underlying structure as desired. In this embodiment, for example, each frame 196 is releasably coupled to a common pedestal 198, which is integral with, or rigidly coupled to (e.g., via weld) the underlying structure (frac pump trailer 172*a*). For another example, in FIG. 14A, each platform 199 (upper support plate 260) is coupled to a corresponding lower support plate 280 with one or more releasable fasteners 288, such as shoulder bolts 290. However, the illustrated upper support plate 260, as well as other forms and configurations of platforms 199, could instead be coupled directly to the underlying structure (e.g., disconnect carrier 210, frac pump carrier 172, etc.), such as by bolt, weld or any other form of connection or components.

Referring to FIG. 14A, when included, the lower support plate 280 may have any suitable form, configuration, construction, components and operation. For example, the lower support plate 280 may be an at least substantially flat, at least substantially horizontally-oriented plate or any other form of component, coupled, such as by bolt, weld, etc. between the upper support plate 260 and underlying structure (e.g., disconnect carrier 210). Thus, while the illustrated lower support plate 280 is a plate, it may have any other form or configuration. The exemplary plate is rigidly coupled to the disconnect trailer 212, such as by weld or with bolts or other suitable connectors, but could be integral thereto. In some embodiments, the lower support plate 280 may not be necessary or included.

Figure 20:
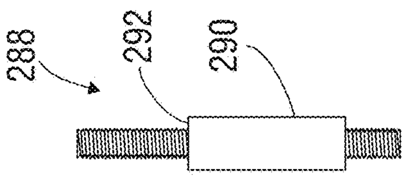
FIG. 20 is a side view of an exemplary fastener useful with an exemplary upper support plate in accordance with one or more embodiments of the present disclosure.
Figure 19A:
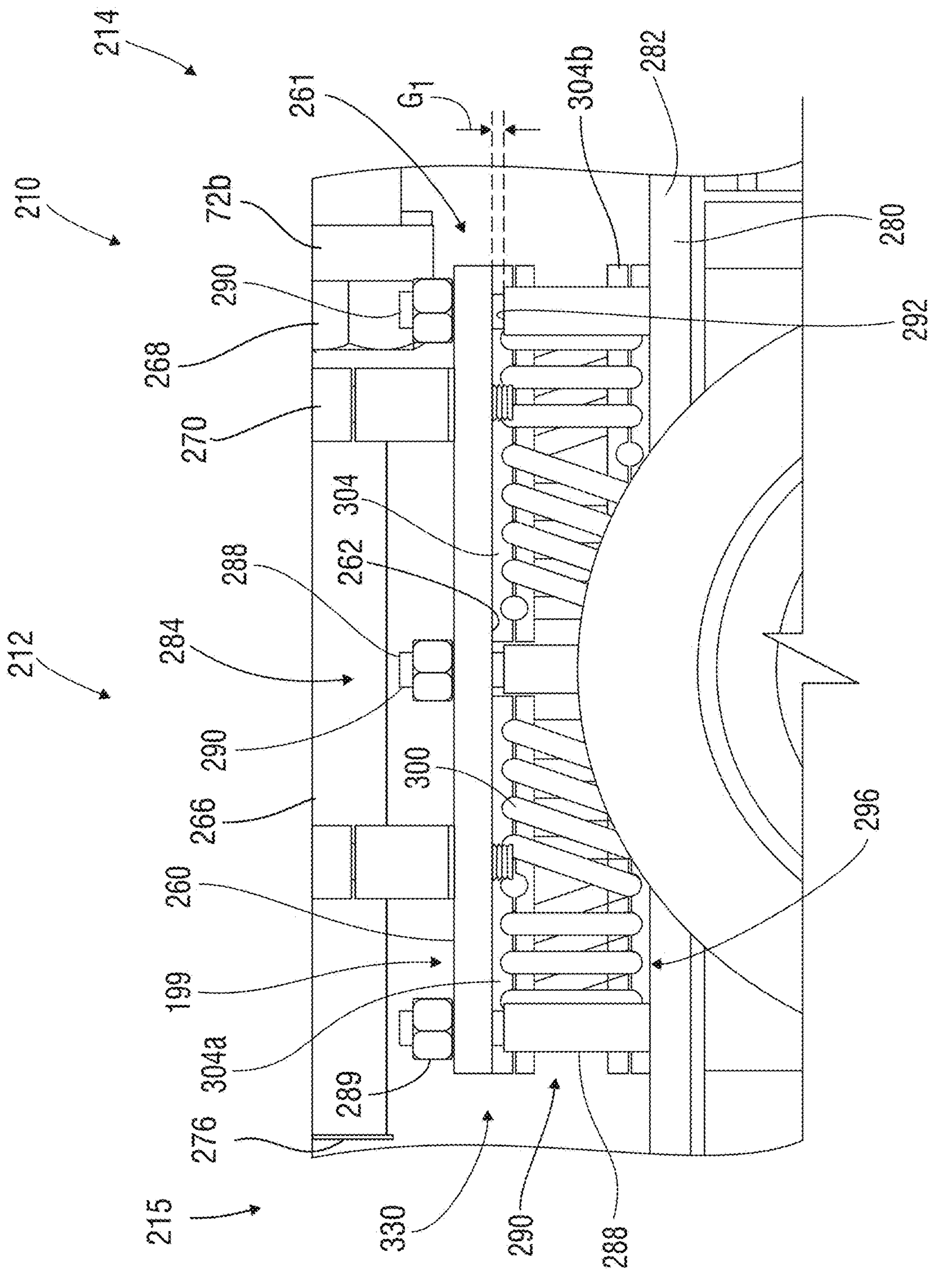
FIG. 19A is a side view of parts of an exemplary stabilizer in accordance with one or more embodiments of the present disclosure.

Still referring to FIG. 14A, in another independent aspect, the FPD system 10 may include one or more stabilizers 284 to help level or balance the gearbox 31 and/or other components when desired, for any other purposes or a combination thereof. For example, the platform 199 (e.g., upper support plate 260), support frame 196 or pedestal 198 (e.g., FIGS. 8 & 9) and/or any other components that help mount the decoupler(s) 30 to the underlying structure may be configured to be able to flex, float or be repositioned relative to the underlying structure. This may be provided in any suitable manner. In the illustrated embodiment, such as shown in FIG. 19A, the stabilizer 284 includes one or more gaps $G_1$ (e.g., of 0.25 inches, or more or less) formed between the underside 262 of the upper support plate 260 and a ledge, or upper shoulder, 292 of each fastener 288 (e.g., FIG. 20) associated therewith.

In some embodiments, if the distribution of weight on the exemplary upper support plate 260 causes it to be slanted (not level), one or more of the fasteners 288 (e.g., nuts 289) may be tightened, reducing the size of the gap(s) $G_1$ at that location and/or raising the opposite side of the upper support plate 260 to help level it and components coupled to it. Referring back to FIG. 14A, for example, if the disconnect assembly 31 weighs the front end 261 of the upper support plate 260 down so it is not level, the two sets of rearmost fasteners 288*a*, 288*b* (or their nuts 289) may be tightened down to raise the upper support plate 260 to at, or near, level. In this embodiment, while a fastener 288 (e.g., nut 289) can be tightened to effectively reduce the size of the gap(s) $G_1$ at its location, it should preferably not eliminate the gap(s) $G_1$ entirely at any location around the upper support plate 260 (or other form of platform 199). During operation of the frac pump 170 and frac missile 156, the exemplary gap(s) $G_1$ may also, or instead, allow the platform 199 to move or flex up and down therein around the perimeter thereof to help establish and maintain a level position of the platform 199 and components coupled thereto (e.g., the carrier plates 72 and decoupler 30) and/or have any other purposes.

Referring again to FIG. 19A, in some configurations, the stabilizer(s) 284 may include one or more biasing members 296 or other components, to provide biasing forces on the platform 199 (e.g., upper support plate 260), support frame 196 or pedestal 198 (e.g., FIGS. 8 & 9) or other supporting components, helping level, balance or stabilize them, for any other purposes or a combination thereof. The biasing member(s) 296 (or other components) may have any suitable form, configuration, construction, components and operation. In the present embodiment, the biasing members 296 include at least one isolator, or spring, 300 acting upon the underside 262 of the upper support plate 260. For example, a distinct spring 300 (or multiple aligned sections thereof) may be provided under each torsion rod 266. The illustrated springs 300 (e.g., wound metal wire rope) are configured as coil-type springs oriented lengthwise relative to the platform 199, but could be any other type of spring, such as one or more helical springs, leaf springs, Belleville washers, and/or be oriented vertically or in another manner or direction (e.g., angularly).

Figure 19B:
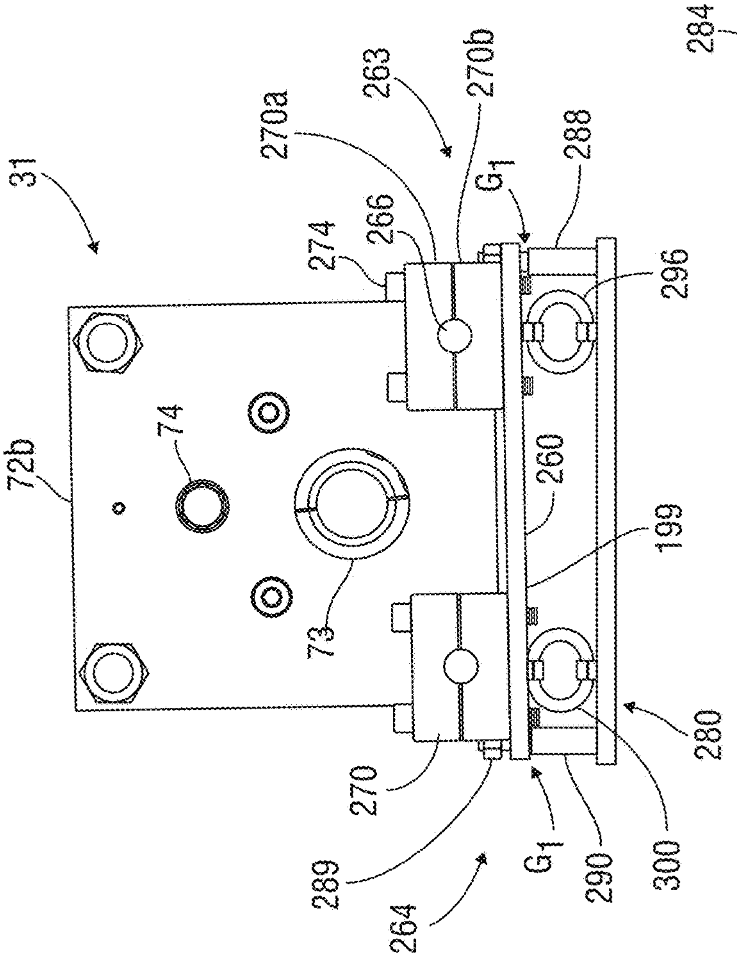
FIG. 19B is a rear view of parts of an exemplary stabilizer showing the exemplary upper support plate slanted in one direction in accordance with one or more embodiments of the present disclosure.
Figure 19C:
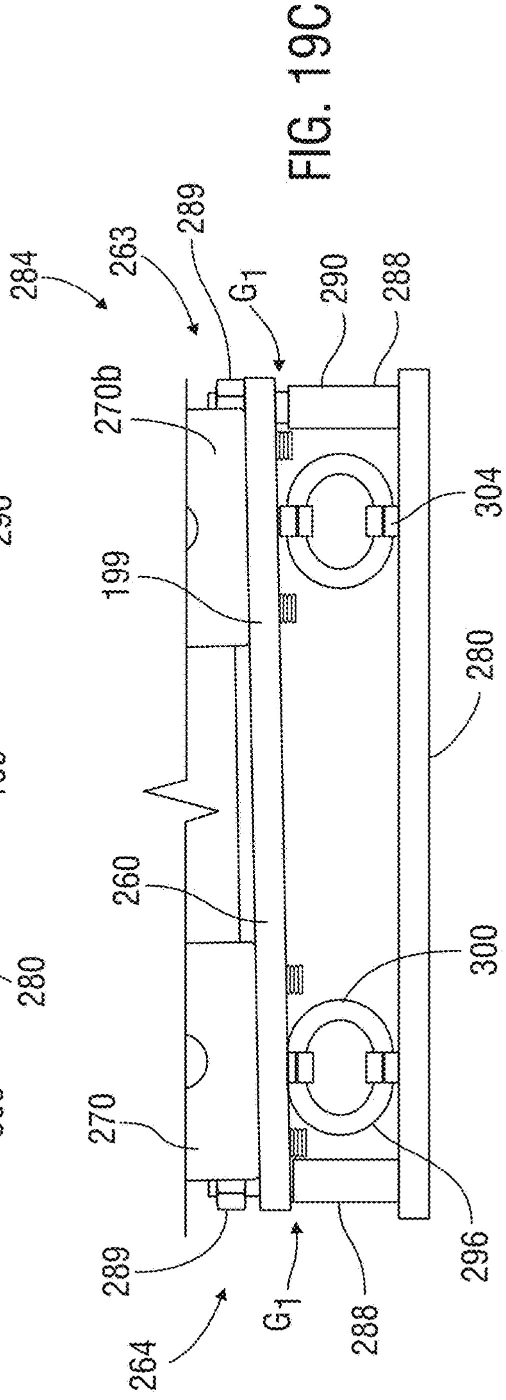
FIG. 19C is a partial view of the exemplary stabilizer shown in FIG. 19A in accordance with one or more embodiments of the present disclosure.

If desired, the biasing members 296 may be sandwiched between the platform 199 (or other components) and one or more other features, such as the lower support plate 280. For example, the spring 300 (or other biasing member 296) may be at least partially rigidly coupled to the upper and lower support plates 260, 280, such as to provide continuing upward biasing forces on the upper support plate 260 and/or for any other purposes. The illustrated springs 300 are at least partially coupled to, or wound on, an upper spring mount 304*a* rigidly affixed thereto (e.g., with bolts, staples, pins or other connectors, via weld, etc.) and a lower spring mount 304*b* rigidly affixed to the lower support plate 280 (e.g., with bolts, staples, pins or other connectors, via weld, etc.). As forces are placed upon the exemplary upper support plate 260 (or other form of platform 199) during use of the FPD system 10 and/or frac pump 170 and frac missile 156 that cause the upper support plate 260 to flex, or move, down in the gap(s) $G_1$, one or more of the biasing members 296 may urge the upper support plate 260 upwardly to help level, balance or stabilize the upper support plate 260 and/or other components. In FIGS. 19B-C, for example, the upper support plate 260 is shown slanted toward its right side 264 (e.g., during connection of the corresponding connector 178), with one or more biasing members 296 pushing up on the upper support plate 260 to help it continue to try to float in the gap(s) $G_1$. It should be noted that the stabilizer 284 may have any other form, configuration, components, construction, location and operation or not be included.

Referring back to FIG. 14A, in another independent aspect, one or more vibration dampeners 330 may be associated with the decoupler(s) 30 or other components. This may be desirable, for example, to help dampen, reduce or suppress vibrations caused during use of the frac pump 170 and frac missile 156 (or other components) or at other times and, consequently, reducing problems that vibration may cause (e.g., wear, damage or loosening of various components) and/or the frequency of inspection, repair and/or maintenance, for any other purposes or a combination thereof.

When included, the vibration dampener 330 may have any suitable form, configuration, components and operation. In some embodiments, the vibration dampener 330 may include one or more springs, isolators, shock absorbers or the like provided on the underlying structure (e.g., frac pump carrier 172 (e.g., FIG. 1), disconnect trailer 212, etc.). For example, the underlying structure may be equipped with one or more leaf springs, which could serve as effective vibration dampeners 330. In some configurations, the vibration dampeners 330 on the underlying structure may alleviate the need for the upper and/or lower support plates 260, 280, biasing members 296 or a combination thereof.

Still referring to FIG. 14A, in the present embodiment, the vibration dampener 330 includes the gap(s) $G_1$ and one or more biasing members 296 at least partially rigidly coupled to the upper support plate 260, such as described above. For example, vibration caused during use of the frac pump 170 and frac missile 156 could be communicated generally from the first and/or second pipe sections 24*a*, 24*b* to the carrier plates 72, to the torsion rods 266 and their mounting blocks 270, then to the upper support plate(s) 260 and then to the corresponding springs 300. With the exemplary upper support plates 260 coupled to the corresponding springs 300 and moveable in the gap(s) $G_1$ associated therewith, the springs 330 may dampen the vibrations and/or act like shock-absorbers. In some applications, maintaining the exemplary biasing member(s) 296 in compression (e.g., due to the weight of, or on, the upper support plate 260) and/or positioning them directly below the exemplary torsion rods 266 (e.g., FIG. 14H) may allow optimal vibration dampening effect of the springs 300. However, the vibration dampener 330 may have any other form, configuration, components, construction, location and operation or not be included.

Referring back to FIGS. 13A & 14A, as previously mentioned, in some embodiments the FPD system 10 may be associated with a disconnect carrier 210, which may have any suitable form, configuration, construction, components and operation. For example the disconnect carrier 210 may be a (e.g.., dedicated) disconnect trailer 212, skid, vessel, wagon, dolly or other structure or form of wheeled or non-wheeled carrier which is separate and distinct from the frac missile 156, frac pump 170, frac pump carrier 172 and/or other components.

In the present embodiment, the disconnect carrier 210 carries the decouplers 30, associated gearboxes 31 and related components. This may be accomplished in any suitable manner. Referring again to FIG. 14B, the disconnect carrier 210 may include one more substructures 340 to help support the weight of the gearbox(es) 31 and/or other or related components and/or for any other purposes. When include, the substructure 340 may have any suitable form, configuration, components and operation. In this embodiment, the substructure 340 includes a pair of adjacent support wheels 344 positioned at, or forward of, the front end 214 of the disconnect carrier 210. For example, the support wheels 344 may be coupled to a wheel mount 348 that is integral with or rigidly coupled to the disconnect carrier 210. The illustrated wheel mount 348 includes at least one cover, or shield, 349 to help protect the support wheels 344 from foreign objects and/or for any other purposes.

When included, the exemplary support wheels 344 and/or wheel mount 348 should preferably be appropriately rated, sized, reinforced, connected and positioned to effectively support the expected weight imparted thereto from the disconnect carrier 210. In this embodiment, the support wheels 344 (e.g., dual caster wheels) are pivotably coupled to the wheel mount 348 (e.g., via one or more 360° swivels), such as to assist in the mobility and directional movement of the disconnect carrier 210 and/or for any other purposes. In other embodiments, only one, or more than two, support wheels 344 (or other support structure) may be located anywhere on, or relative to, the disconnect carrier 210 and pivotably or rigidly coupled to any desired components (e.g., directly to the disconnect carrier 210). In yet other embodiments, the substructure 340 may have any other form, configuration, components, location and operation. In still further embodiments, there may be no need for a substructure 340, such as when the disconnect assemblies 31 are centered on the disconnect carrier 210 or moved closer to its centerline or primary axel.

Still referring to FIG. 14B, the disconnect carrier 210 (or other components) may include one or more deflectors 360 to help deflect one or more pipe sections 24 of the LP and/or HP connection lines 16, 20 (and related components) away from the disconnect carrier 210 and/or any particular components after the associated connector 178 has been disconnected. In this embodiment, for example, after one of the connectors 178 has been disconnected, the second pipe section 24*b* of the associated LP or HP connection line 16, 20 and components coupled thereto (e.g., associated yoke 370) may typically drop away from the decoupler 30. At such time, one or more exemplary deflectors 360 may help such falling components to clear the disconnect carrier 210 and/or particular components (e.g., support wheels 344), not impede the movement thereof, not get run over, or otherwise become damaged or cause damage thereto, have any other purposes or a combination thereof.

When included, the deflector 360 may have any suitable form, configuration, components and operation. In this embodiment, the deflector 360 includes at least one angularly oriented, or sloped, plate 364 provided at least partially in the path of the falling components (e.g., second pipe section 24*b* and associated yoke 370). For example, first and second sloped plates 364 may extend from the left and right sides of the wheel mount 348 to deflect each respective pipe section 24*b* or other components. However, the substructure 340 may include any other configuration of these and/or any other components.

Referring now back to FIG. 13A, the disconnect carrier 210 may be moveable independent of other components or along with one or more other components. For example, the disconnect carrier 210 may be self-powered, such as via a motor or other device(s) and/or fully or partially automated or remotely controllable/moveable. In the present embodiment, the disconnect trailer 212 is releasably engageable and movable with the frac pump carrier 172. For example, the disconnect trailer 212 may be towable by the frac pump carrier 172, such as toward and away from the frac missile 156 (e.g., in the red zone) or otherwise as desired.

Referring now to FIGS. 13A & 14A, the disconnect carrier 210 may be engageable with the frac pump carrier 172 or other structures or components in any suitable manner. In this embodiment, the disconnect carrier 210 is releasably engageable with the frac pump carrier 172 via at least one connection arm 220 extendable (e.g., rearwardly) from the rear 215 of the disconnect carrier 210. For example, at least two spaced-apart connection arms 220 (e.g., FIG. 14G) may be provided to help maintain the desired alignment of the disconnect carrier 210 with the frac pump carrier 172 during backup or other movement, avoid buckling or undesirable turning of the disconnect carrier 210 during movement, maintain balance of the disconnect carrier 210, for any other purposes or a combination thereof.

Figure 14G:
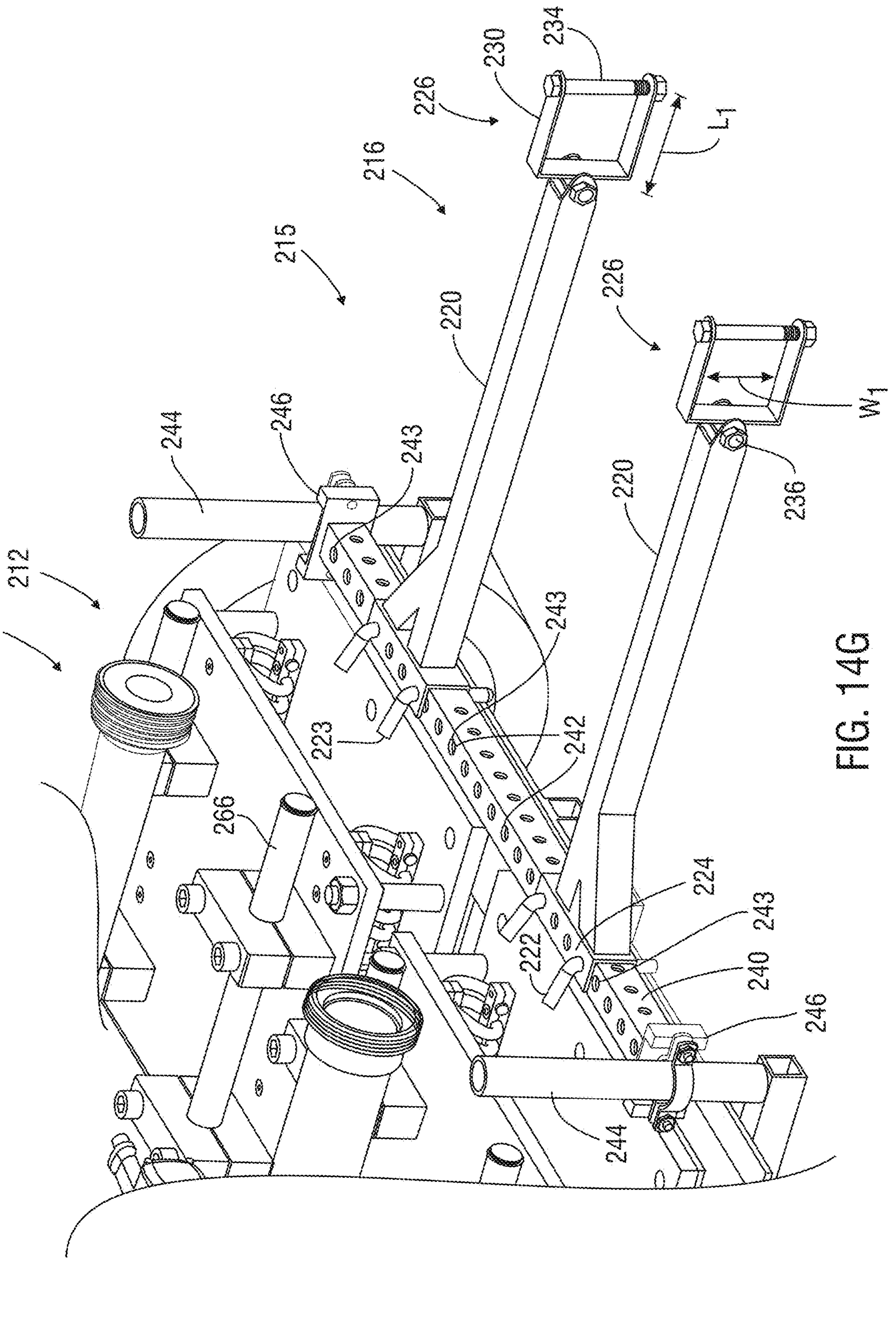
FIG. 14G is a partial view of the exemplary FPD system shown in FIG. 14A in accordance with one or more embodiments of the present disclosure.
Figure 14H:
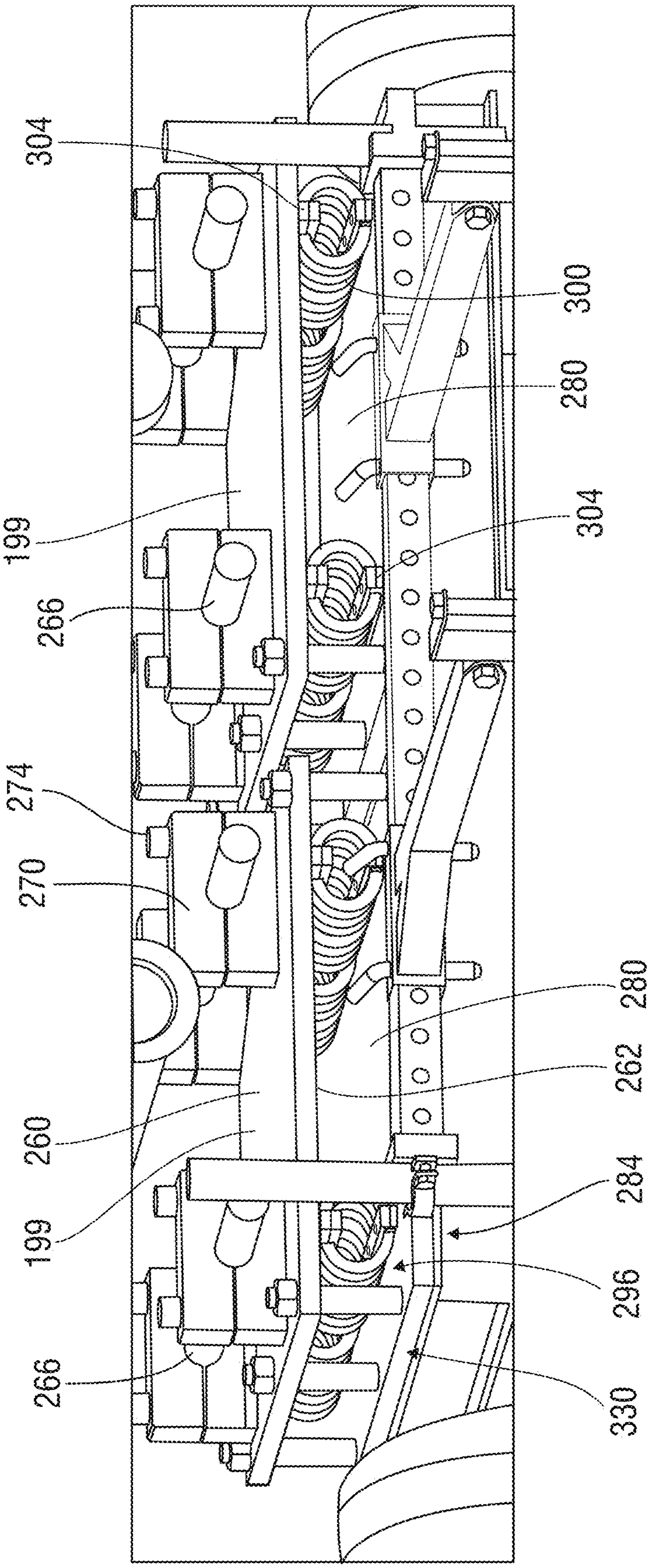
FIG. 14H is a partial view of the exemplary FPD system shown in FIG. 14G in accordance with one or more embodiments of the present disclosure.

Referring now to FIGS. 13A & 14G, when included, the connection arm 220 may have any suitable form, configuration, components, construction and operation. Each illustrated connection arm 220 includes at least one clamp 226 configured to be releasably engaged with a bumper 173, or other component, of the frac pump carrier 172. In this instance, the bumper 173 is at the rear end of the frac pump trailer 172*a*, but could be at any other desired part of the frac pump trailer 172*a*, other frac pump carrier 172 (e.g., primary mover or truck) or other component.

The clamp 226 may likewise have any suitable form, configuration, components, construction and operation. In this embodiment, the clamp 226 includes a C-shaped main body 230 configured to fit at least partially over or around the bumper 173 (or other component) of the frac pump carrier 172 and at least one removeable, or retractable, finger 234 to help secure the main body 230 to the bumper 173 (or other components). The illustrated finger 234 is a removable fastener having any suitable form (e.g., bolt, pin, spring biased arm, etc.). In some embodiments, the angle of the clamp 226 relative to the bumper 173 (or other component) may be adjustable, such as to help align them and/or for any other purposes. For example, the main body 230 may be pivotably connected to the connection arm 220, such as via a pivot pin, or connector, 236 (e.g., bolt, rod, etc.), to allow angular adjustment.

Still referring to FIGS. 13A & 14G, in some embodiments, the clamp 226 may be sized and configured, or configurable, to be engageable with the bumpers 173 (or other components) of all or many known frac pump trailers 172*a* or other frac pump carriers 172 (e.g., primary mover or truck) with minimal or no needed modification to the frac pump trailer 172*a* or other frac pump carrier 172. For example, the width $W^1$ and/or length $L^1$ of the main body 230 may be sized to fit over the largest known bumper 173 (or other component) so that it will also fit over all smaller-sized versions. For another example, the width $W^1$ and/or length $L^1$ of the main body 230 may be adjustable to fit different sized bumper 173 (or other components). For still a further example, the clamp 226 may be removable (e.g., via connector 236) for size-appropriate replacement.

If desired, the connection arm 220 may be adjustable in height, length, laterally or in any other manner to help align it for engagement with the frac pump carrier 172 or other component and/or for any other purposes. In this embodiment, to provide vertical adjustment, the connection arm 220 is coupled to a vertically adjustable bar 240. The exemplary bar 240 is selectively moveable up and down relative to one or more vertical posts 244, such as with one or more pipe clamps 246 or other components. To adjust the length of the connection arm 220, for example, the connection arm 220 may include multiple telescoping, slidable, ratchet-connected, folding or expandable and/or retractable sections.

Still referring to FIGS. 13A & 14G, also if desired, the lateral, or side-to-side, position of the connection arm 220 may be selectively adjustable relative to the frac pump carrier 172 or other component. In the present embodiment, the connection arm 220 is selectively moveable along at least part of the length of the bar 240 to change its position relative to the frac pump carrier 172 or other component. For example, the bar 240 may include numerous receivers 242 along at least part of its length to receive one or more extensions 222 associated with the connection arm 220. In this embodiment, the receivers 242 are apertures 243 and the extensions 222 are bent hitch pins 223 slidable through any of the apertures 243 and one or more brackets 224 of, or coupled to, the connection arm 220, but could take any other form and configuration. Moreover, when included, the disconnect carrier 210 may be engageable with the frac pump carrier 172 or other structures or components with any other configuration of components.

Referring now back to FIGS. 1 & 2, if desired, the FPD system 10 may be configured to help at least temporarily support at least part of the exemplary LP and/or HP connection lines 16, 20, such as between the decoupler(s) 30 and frac missile 156 (or other components). Supporting the LP and/or HP connection lines 16, 20 may be desirable, for example, to help carry or support their weight, help position them for connection, disconnection and reconnection between the frac missile 156 and frac pump 170 (e.g., without any personnel in the red zone), for any other purposes or a combination thereof. This may be accomplished in any suitable manner. For example, the LP and/or HP connection lines 16, 20 may be at least partially supported via the support structure 110. In this embodiment, the support structure 110 is a skid 110*a* with one or more cradles 114 (or other features) to help at least temporarily support and/or position the respective LP and HP connection lines 16, 20 as desired. The illustrated configuration includes two cradles 114, one for each connection line 16, 20, but could have one cradle 114 for both lines 16, 20 or any other configuration of parts. Moreover, the skid 110*a* or other form of support structure 110 may have any other arrangement of components or not be included.

For another example, in FIGS. 13A-B, at least part of the LP and HP connection lines 16, 20 are supported via a hoist skid, or gantry, 120. The illustrated gantry 120 is standalone and includes one or more transport points 122 which are useful for moving or transporting the gantry 120. In this embodiment, the transfer points 122 include a pair of fork pockets 123 formed in the base 146 of the gantry 120 and engageable with the fork tines of a forklift or other mover. However, the transfer points 122 may take any other form (e.g., hoist connections, lifting rings, loops, hooks, wheels, casters, etc.) and be provided at any other location. Moreover, the gantry 120 may instead be coupled to, carried on, associated with, or part of, one or more other components (e.g., bleed-off manifold(s) 18, 22 (e.g., FIG. 2), support structure 110, disconnect carrier 210, etc.).

When included, the gantry 120 may have any suitable form, configuration, construction, components and operation. For example, the gantry 120 may include one or more suspension arms 128 configured to suspend first and second slings 124 (e.g., straps, chains, belts, ropes) useful for holding the respective connection lines 16, 20. In some embodiments, the vertical, lateral and/or any other positions of the sling(s) 124 may be adjustable. This may be done in any suitable manner. For example, the gantry 120 may include at least one adjustable positioner 130 that can be actuated to move one or more slings 124 up and down and/or side to side or in any other desired direction.

Figure 12:
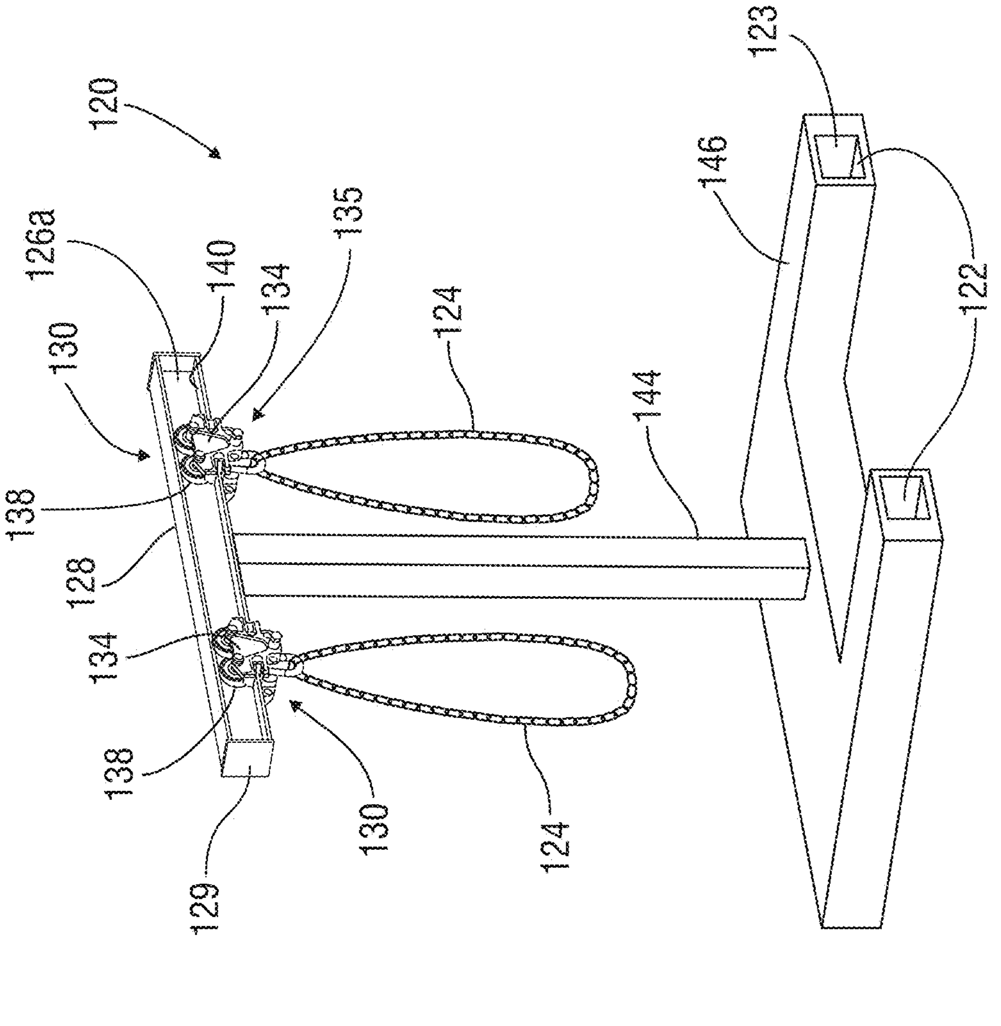
FIG. 12 is a perspective view of an exemplary gantry useful for supporting exemplary LP and HP fluid flow connection lines in accordance with one or more embodiments of the present disclosure.

Referring to FIG. 12, the positioner 130 may itself have any suitable form, construction, components and operation. In the present embodiment, a separate positioner 130 in the form of a (e.g., chain) hoist 134 is provide for each sling 124. When included, the hoist 134 may have any suitable components, such as a hook or carabiner, wheel, chain or brake. In this embodiment, each exemplary hoist 134 includes one or more up/down mechanisms 135 that may be selectively actuated to lengthen and shorten the length, or raise and lower, the associated sling(s) 124. For lateral (side-to-side) movement of the associated sling(s) 124, each illustrated hoist 134 includes at least one support roller, or wheel, 138 moveable laterally relative to the suspension arm 128. For example, the positioner 130 may have a respective pair (or fewer or more) of rollers 138 that can roll along a rail 140 on each respective side 126*a*, 126*b* of the suspension arm 128 (e.g. FIG. 13B). One or more locking mechanisms may be associated with the hoist 134, or other form of positioner 130, to help secure the desired position thereof and/or the associated sling(s) 124 relative to the suspension arm(s) 128 and/or other components of the gantry 120.

In this embodiment, the suspension arm 128 includes an I-beam with removable end caps 129 to allow mounting of the positioners 130 thereon and prevent them from undesirably separating therefrom. In some embodiments, the positioner 130 and/or other components of the gantry 120 may be automated (e.g., for positional adjustment of one or both connection lines 16, 20 without any personnel in the red zone), manually-actuated or both. However, the positioner 130 (e.g., hoist 134) and related components may have any other form, configuration, features and operation. For example, the positioner 130 may include one or more tackles, pulley systems, clamp systems, ratchet systems and the like. Moreover, the gantry 120 may have any other suitable components and configuration or not be included.

It should be noted that while many components and features of the present disclosure are described or shown in this patent as being part of, carried or coupled to a disconnect carrier 210 (e.g., trailer 212, FIGS. 13A-14D), they may instead be provided on the frac pump carrier 172 or any other desired structures or components.

Referring again to FIGS. 1-4, in some exemplary methods of using the illustrated FPD system 10 to assist in disconnecting the frac pump 170 from the HP side 161 of the frac missile 156, after the frac pump 170 is turned off, the primary isolation valve 102 may be closed, isolating the pump 170 from the HP side 161 of the missile 156. If the illustrated secondary isolation valve 105 is not already open, it can be opened, then the bleed-off valve(s) 103 opened to drain the HP connection line 20 and, in some instances, the HP line 176 of the frac pump 170 and/or other components. After the exemplary HP connection line 20 and possibly also the HP line 176 and/or other components, are drained, the bleed-off valve 103 and secondary isolation valve 105 may be closed and the decoupler 30*b* used to disconnect the HP connection line 20 from the frac pump 170.

In an exemplary method of using the illustrated FPD system 10 to assist in disconnecting the frac pump 170 from the LP side 159 of the frac missile 156, after the frac pump 170 is turned off, the primary isolation valve 106 may be closed, isolating the frac pump 170 from the LP side 159 of the missile 156. If the illustrated secondary isolation valve 108 is not already open, it can be opened, then the bleed-off valve(s) 107 opened to drain the LP connection line 16 and, in some instances, the LP line 174 of the frac pump 170 and/or other components. After the exemplary LP connection line 16 and possibly also the LP line 174 and/or other components are drained, the bleed-off valve 107 and secondary isolation valve 108 may be closed and the decoupler 30*a* used to disconnect the LP connection line 16 from the frac pump 170.

In many embodiments, any, or all, of the above actions and components may be automated, automatic, manually initiated or controlled by one or more operators 200 outside the red zone, remotely controlled or a combination thereof, allowing the frac missile 156 to remain pressurized and continue operations with other frac pumps 170 and/or for any other purposes. After the frac pump 170 is disconnected from the frac missile 156, the frac pump 170 (e.g., carrier 172) and FPD system 10 may then be moved away from the frac missile 156 out of the red zone, such as for inspection, maintenance, repair, replacement or any other purposes and thereafter returned to the red zone and reconnected to any desired frac missile 156 in a reverse order of the actions above. However, in some embodiments, the aforementioned actions could be implemented in a different order and/or additional or different steps, actions and components could be included.

In various exemplary methods of use of the FPD system 10 shown in FIGS. 13A-19A, the disconnect carrier 210 (e.g., connection arms 220) may be connected to the frac pump carrier 172, such as described above. The exemplary LP and HP connection lines 16, 20 or other lines (e.g., LP hose, HP rigid iron or hose) fluidly coupled to the frac pump 170 may be coupled to the corresponding first pipe sections 24*a*, which are often already positioned in the respective gearboxes 31 on the disconnect carrier 210 with the associated connector portions 179*a* (e.g., nuts 184) loaded in the respective decouplers 30 (rotation drivers 36). If not, the first pipe sections 24*a* and associated connector portions 179*a* can be so positioned.

The illustrated LP and HP connection lines 16, 20 or other lines (e.g., hoses) fluidly coupled to the frac missile 156 (e.g., and bleed-off manifolds) may be hung on the gantry 120 (if included) and the corresponding second pipe sections 24*b* with yokes 370 may be coupled thereto. The exemplary frac pump carrier 172 with disconnect carrier 210 coupled thereto may be backed up to the gantry 120 (or frac missile 156). The exemplary yokes 370 may be connected to the respective gearboxes 31, such as by sliding the receivers 384 (e.g., FIG. 16A) over the corresponding bars 390. Connecting the illustrated yokes 270 to the gearboxes 31 may typically align the respective second pipe sections 24*b* and connector portions 179*b* coupled thereto with the first pipe sections 24*a* and connector portions 179*a* (already positioned in the gearboxes 31). If not, the connector portions 179*b* (e.g., the female threads thereof) may need to be aligned with the connector portions 179*a* (e.g., the male threads thereof).

Still referring to FIGS. 13A-19A, the respective connector portions 179*a*, 179*b* may be connected in any suitable manner. For example, the activator(s) 82 (e.g. FIG. 3C) may be actuated to "close" the connectors 178. For another example, the connector portions 179*a*, 179*b* may be manually connected, such as with a wrench or other tools. To do so, in some embodiments, if the torsion bars 266 are in a forward position (e.g., FIG. 18A), they may need to be moved rearward to allow sufficient access to the connector portion 179*b* (e.g., nut 184), such as described above. In such instances, the stops 320 (e.g., FIG. 15) may need to be at least temporarily disconnected or removed from the respective pipe sections 24*a*, such as to allow the gearboxes 31 to move rearward relative to the pipe sections 24*a*. For disconnecting the exemplary connectors 178, the same or similar actions may be performed generally in reverse. However, methods for connecting and/or disconnecting connectors 178 with the exemplary embodiments of the PFD system 10 may include fewer, more or different actions.

Figure 21A:
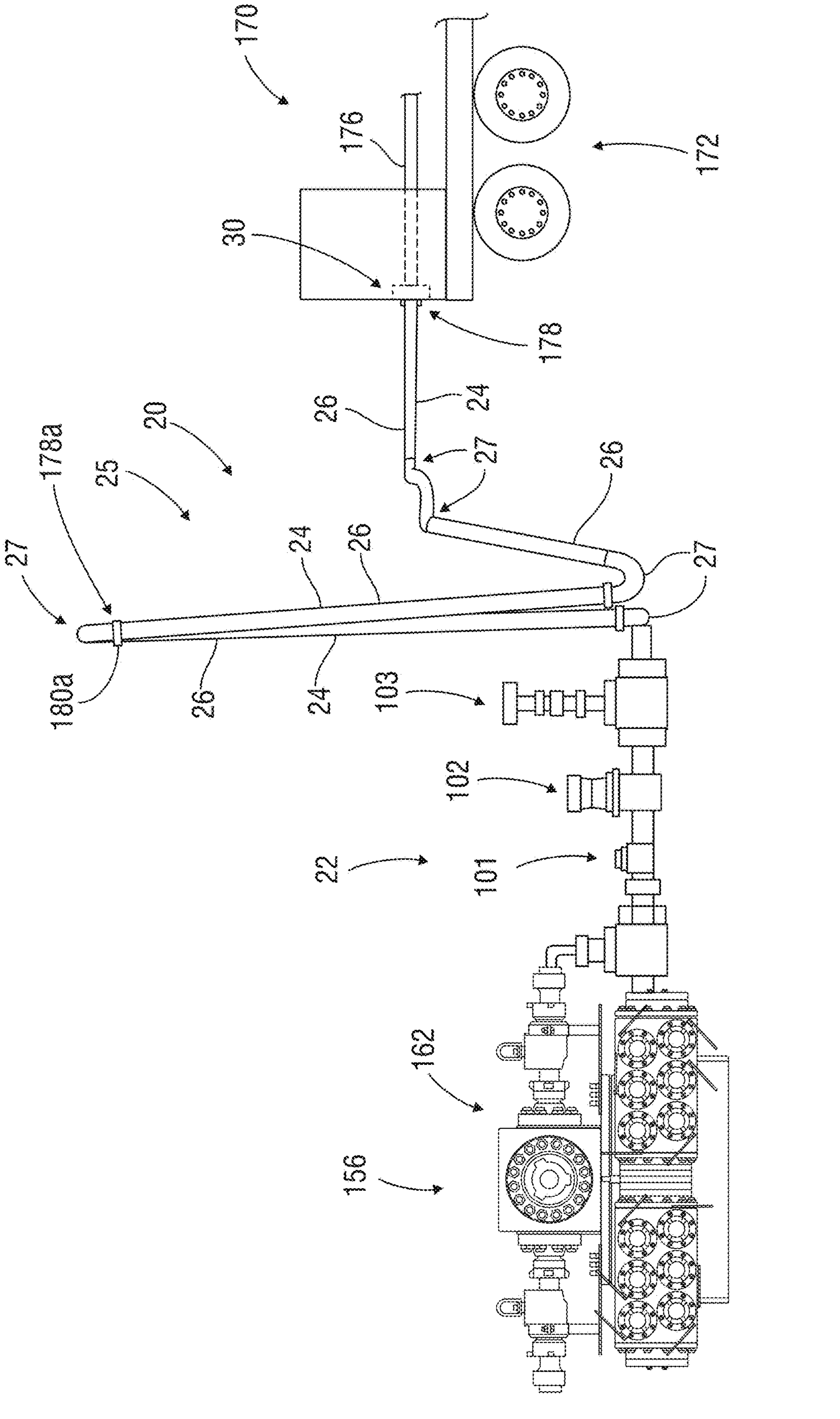
FIG. 21A is a side view of an exemplary expandable connection conduit shown in an exemplary retracted position in accordance with one or more embodiments of the present disclosure.
Figure 21B:
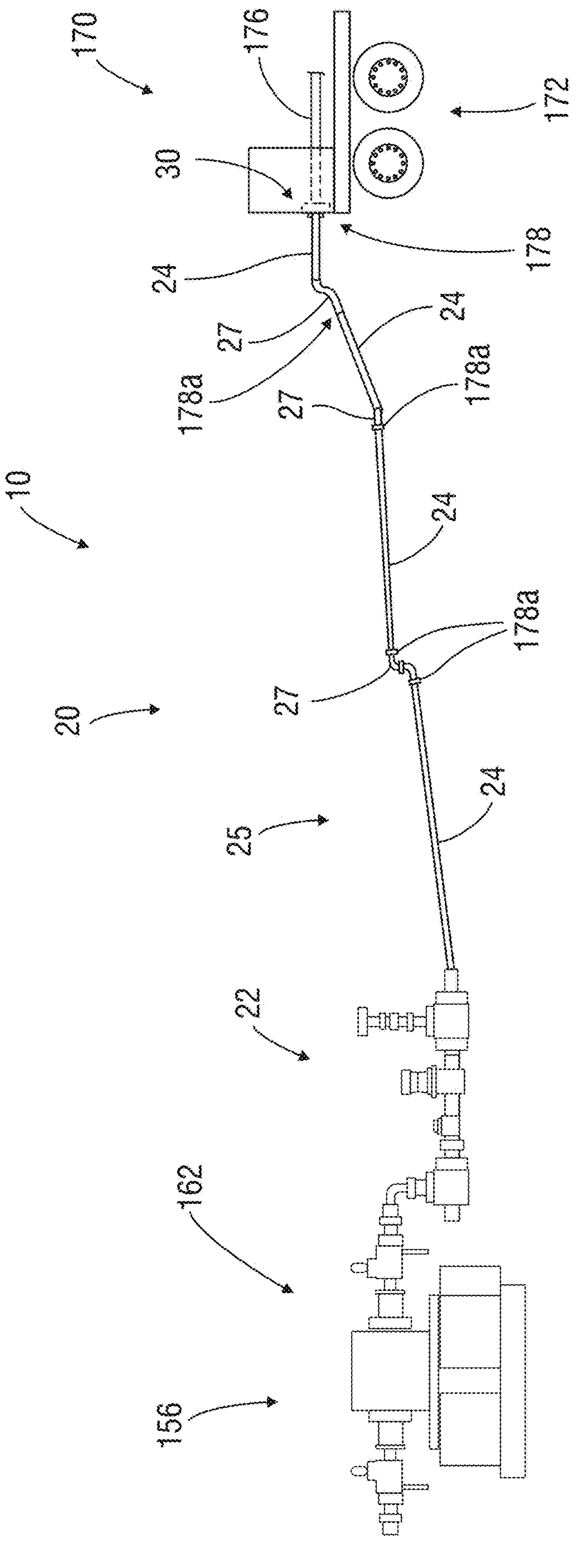
FIG. 21B is a side view of the exemplary expandable connection conduit of FIG. 21A shown in an exemplary extended position in accordance with one or more embodiments of the present disclosure.

Now referring to FIGS. 21A-B, in another independent aspect, the illustrated HP connection line 20 may include one or more expandable connection conduits (ECC) 25 that can be selectively expanded, or extended, such as to allow the frac pump 170 (and/or other components) to be moved out of the red zone while the HP line 176 thereof is still fluidly coupled to the frac missile 156. Once out of the red zone, the illustrated HP line 176 can be disconnected from the frac missile 156 (e.g., manually, with one or more decouplers 30 or in any other manner) and/or any other tasks may be performed, such as inspection, testing, repair, replacement etc. of the frac pump 170, frac pump carrier 172, FPD system 10 or other components. In this embodiment, the ECC(s) 25 can also be retracted, such as for optimal positioning of the frac pump 170 and related components during operations and/or for any other purposes. The exemplary ECC 25 may be movable between any exemplary retracted position (e.g., FIG. 21A) and any exemplary expanded position (e.g., FIG. 21B) as desired.

Though not shown, the LP connection line 16 of various embodiments may also, or instead, include one or more ECCs 25. Accordingly, all of the details of the exemplary ECC 25 and related components and the use and operation thereof as described and shown herein with respect to the exemplary HP connection line 20 apply equally with respect to the exemplary LP connection line 16, except as may be specified otherwise.

Still referring to FIG. 21A-B, when included, the ECC 25 may have any suitable form, configuration, construction, components and operation. In the illustrated embodiment, the ECC 25 includes numerous jointed pipe sections 26 (e.g., rigid pipe, rigid hose, flow iron) that are movable relative to one another to expand or retract the ECC 25. For example, the jointed pipe sections 26 may be interconnected with one or multiple connectors 178*a* and/or multiple flex joints 27 (e.g., swivel unions, Chiksan®) so that adjacent jointed pipe sections 26 can move relative to one another. In various embodiments, the ECC 25 may include numerous HU connectors 180*a* (e.g., seven or more or less), numerous "U" swivel unions (e.g., four or more or less) and one or more "S" swivel unions. However any other combination of these or other components may be used. Thus, the present disclosure is not limited to or by the particular components, configuration and operation of ECC 25, except as may be specified otherwise.

In operation, the exemplary ECC 25 will automatically expand and transition from a retracted to an expanded position by moving the frac pump carrier 172 away from the frac missile 156 (or other components) and vice versa to move the ECC 25 from an expanded to a retraced position. However, in other embodiments, additional or different actions may be necessary to cause the expansion and/or retraction of the ECC 25. If desired, one or more of the flex joints 27 or other components used in the process of expanding and/or contracting the ECC 25 may be automated, automatic, power-actuated (e.g., via pneumatic, hydraulic, electric power), electronically-controlled or a combination thereof.

Figure 22A:
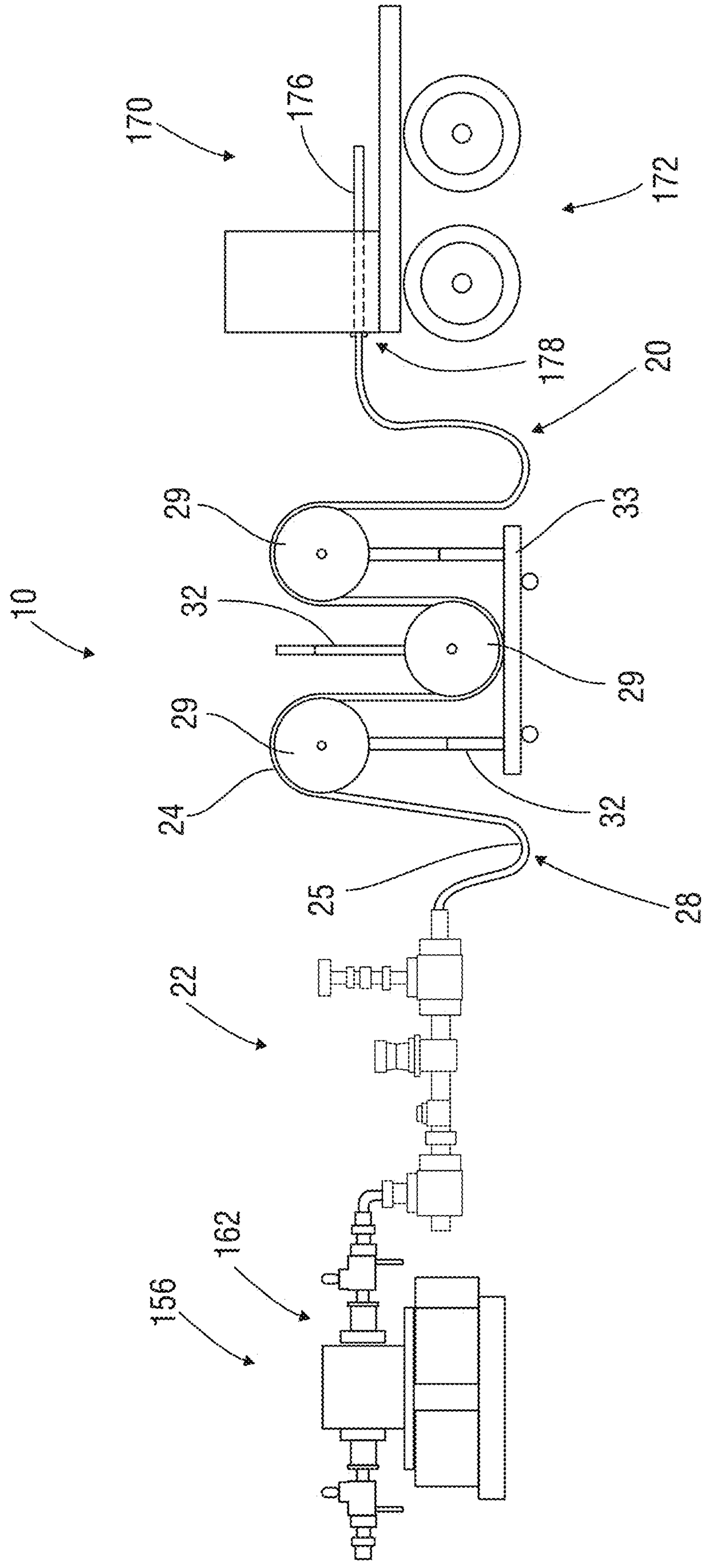
FIG. 22A is a side view of another exemplary expandable connection conduit shown in an exemplary retracted position in accordance with one or more embodiments of the present disclosure.
Figure 22B:
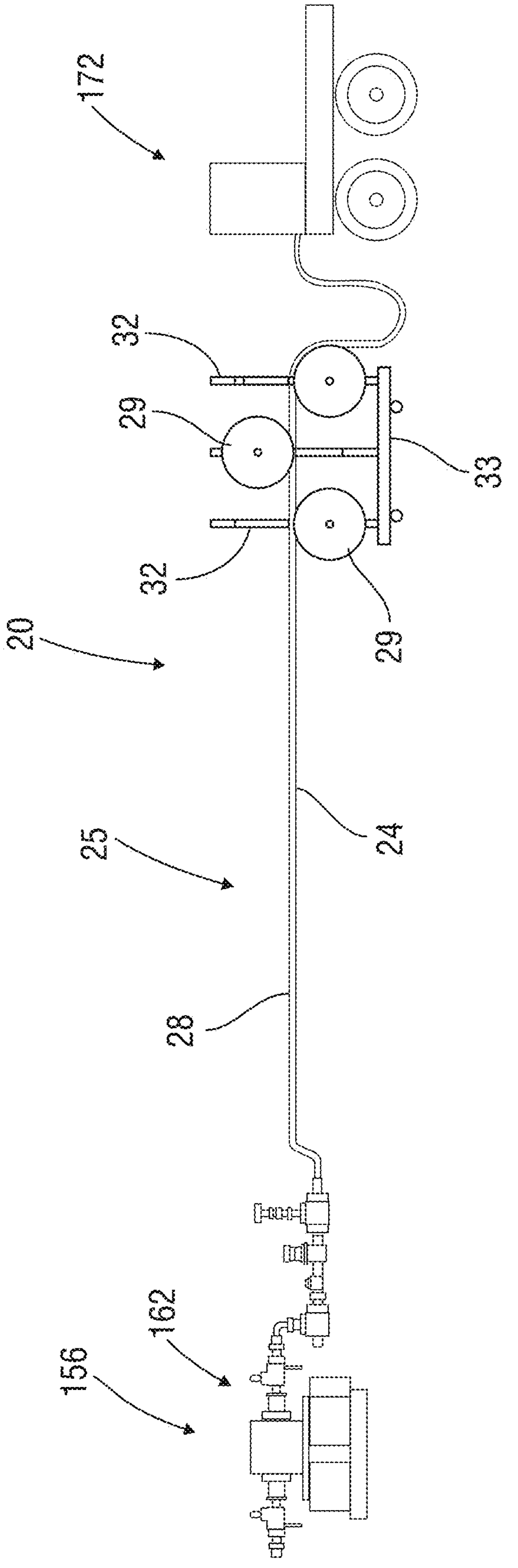
FIG. 22B is a side view of the exemplary expandable connection conduit of FIG. 22A shown in an exemplary extended position in accordance with one or more embodiments of the present disclosure.

In FIGS. 22A-B, the ECC 25 includes at least one flexible pipe or hose 28 ("flex-pipe") that is selectively movable between at least one retracted (e.g., FIG. 22A) and at least one extended (e.g., FIG. 22B) position. This may be accomplished in any suitable manner and with any desired components. For example, the flex-pipe 28 may extend over one or more (e.g., counterbalanced) reels, or spools, 29 useful to help ensure there are no kinks, or sharp turns, in the flex-pipe 28, assist in expanding or contracting the flex-pipe 28, for any other purposes or a combination thereof. In some embodiments, one or more of the spools 29 may be selectively movable relative to one another (e.g., on respective slotted guide posts, or rails, 32), such as to assist in expanding and contracting the flex-pipe 28, help control movement of the flex-pipe 28 as it is retracted and expanded, for any other purposes or a combination thereof. For another example, the spool(s) 29 may be disposed on one or more carriers 33 (e.g., automated or non-automated, skid, vehicle, dolly, wagon, trailer, frame or other structure), such as to move the spool(s) 29 away from the frac missile 156, help expand the flex-pipe 28, for any other purposes or a combination thereof.

It should be noted that the exemplary ECC 25 should preferably be configured so that in the retracted position(s), no components or the configuration thereof will jeopardize, diminish, reduce or otherwise affect the normal desired fluid flow rate, volume, velocity and other flow aspects between the frac pump 170 and frac missile 156. In addition, while the illustrated ECCs 25 are shown fluidly coupled between the frac pump 170 at one end, and various bleed-off components (e.g., the HP check valve 101, primary isolation valve 102 and bleed-off valve 103) at the other end, this is just exemplary. The ECC 25 could be coupled between any desired components. Thus, the present disclosure is not limited to the particular sequence of component connections shown or described herein, except as may be specified otherwise.

When included, the ECC 25 may have any other or additional components, configuration, location and operation. Moreover, any other techniques may be used to move the LP and HP connection lines 16, 20, connector(s) 178, frac pump 170 or a combination thereof into and/or out of the red zone. For example, the ECC 25 may include both rigid hose or pipe and flex-pipe 28. Thus, the present disclosure is not limited to the features, components and operation of the ECC 25 as shown and described herein, except as may be specified otherwise.

The present and other embodiments of the FPD system 10 may include one or more of the following characteristics: one or more exemplary frac pumps 170 may be disconnected from the frac missile 156 without personnel in the red zone and without depressurizing or interrupting operation of the frac missile 156 and/or other frac pumps 170; many, most, substantially all or all components of the FPD system 10 may be constructed of readily available, off the shelf, standard parts and raw materials, making construction and repair less expensive, easier and faster than other known frac pump disconnect systems; the FPD system 10 may be assembled, disassembled and repaired with mostly, substantially all or all standard or readily available tools; the FPD system 10 may not include complex, specialized equipment that is expensive and requires a multitude of unique OEM components that need to be custom-ordered, reducing costs, down time and potential failure points as compared to other known frac pump disconnect systems; the FPD system 10 may be frac missile and pump unit agnostic and/or require little or no modification to any such equipment, making the FPD system 10 universal, versatile, quicker and easier to use with less down-time and fewer potential failure points as compared to other known frac pump disconnect systems; the frac missiles and pump units do not need to be sent to the FPD system 10 OEM for modification, saving cost, time and potential failure points; deployment and use of the exemplary FPD system 10 does not require personnel from the FPD system 10 provider on site, saving time and cost; non-OEM personnel of the operators or any entity can be quickly trained and handle deployment and use of the FPD systems 10; many or all of the exemplary valves used with the FPD system 10 (e.g., valves 102, 103, 105, 106) may be serviceless (e.g., gate) valves not requiring maintenance with grease or the use of special grease systems, reducing cost, complexity and the number of potential failure points; vibration of the FPD system 10 and its components may be controlled or minimized to reduce undesirable effects normally caused by vibration and other known frac pump disconnect systems, such as premature wear, damage, leakage, malfunction; the FPD system 10 may be mobile and coupled to or carried by the pump unit for quick and easy transport into and out of the red zone or between locations; use, repair, inspection, maintenance and replacement of the FPD system 10 or any components thereof can be done with minimal NPT and less NPT than other known frac pump disconnect systems; or a combination thereof.

Any of the actions, processes, methods and operations disclosed in this patent may be performed automatically. Any of the components, actions, processes, methods and operations in this patent may be automated or electronically or remotely controlled. In some instances, such automation may require little or minimal human involvement (e.g., only to set parameters and/or to actuate a switch, button or other activator). In other instances, automated components, actions, processes, methods or operations may involve more human involvement. In some embodiments, one or more actions, processes, methods and operations may be manually performed.

Any of the components of the FPD system 10 may be modular and all components should preferably be formed, constructed, assembled and connected in a manner (e.g., size, location, position) and with appropriately rated material(s) to meet the expected conditions of their use (e.g., temperature, pressure, applied forces and weight). The present disclosure is not limited to the particular sequence in which components are connected shown or described herein, except as may be noted otherwise.

IT IS RECOMMENDED THAT SAFETY PROCEDURES AND PROTOCOLS, REGULATORY STANDARDS AND REQUIREMENTS, OTHER COMPLIANCE STANDARDS AND THE SPECIFICATIONS, RECOMMENDED OPERATING, REPAIR AND MAINTENANCE PROCEDURES AND OTHER RECOMMENDATIONS, INSTRUCTIONS, REPRESENTATIONS, ASSEMBLY AND USE GUIDELINES AND ADVICE OF OEMS, EQUIPMENT USERS, OPERATORS AND ANY OTHER RELEVANT PARTIES NOT BE COMPROMISED WHEN PRACTICING ANY OF THE TEACHINGS OF THIS PATENT.

Preferred embodiments of the present disclosure thus offer advantages over the prior art and are well adapted to carry out one or more of the objects of this disclosure. However, the present disclosure does not require each of the components and acts described above and is in no way limited to the above-described embodiments and methods of operation. Any one or more of the above components, features, aspects, capabilities and processes may be employed in any suitable configuration without inclusion of other components, capabilities, aspects, features and processes disclosed herein. Accordingly, embodiments of the present disclosure may have any one or more of the features described or shown in this patent. Moreover, the present invention includes additional features, capabilities, functions, methods, uses and applications that have not been specifically addressed herein but are, or will become, apparent from the description herein and appended drawings.

The methods that may be described above or are apparent from this patent and any other methods which may fall within the scope thereof can be performed in any desired or suitable order and are not necessarily limited to any sequence described herein. Further, the methods of various embodiments of the present disclosure may include additional acts beyond those mentioned herein and do not necessarily require use of the particular embodiments shown and described herein, but are equally applicable with any other suitable structure, form and configuration of components.

While exemplary embodiments have been shown and described, many variations, modifications and/or changes of the system, apparatus, articles of manufacture and methods of the present disclosure, such as in the features, components, details of construction and operation and arrangements thereof and the manufacture, assembly and use thereof, are possible, contemplated by the present patentee, within the scope of this disclosure and may be made and used by one of ordinary skill in the art without departing from the spirit, teachings and scope of this disclosure. Thus, all matter herein set forth or shown in the accompanying drawings should be interpreted as illustrative and the scope of this disclosure should not be limited to the embodiments described or shown herein.

The invention claimed is:

1. A system for rotatably disconnecting a first high-pressure (HP) fluid flow line coupled to a hydraulic fracturing (frac) pump from a second HP fluid flow line of a frac missile and a first low-pressure (LP) fluid flow line coupled to the frac pump from a second LP fluid flow line of the frac missile without any personnel in the red zone, the frac pump being disposed on a frac pump carrier, the system comprising:

a disconnect trailer separate and distinct from the frac pump, frac pump carrier and frac missile, the disconnect trailer being movable with the frac pump carrier toward and away from the frac missile in the red zone;

a first portion of a HP line connector associated with the first HP fluid flow line and a second portion of the HP line connector associated with the second HP fluid flow line, at least part of each of the first and second HP line connector portions being rotatably engageable with and disengageable from at least part of the other respective HP line connector portion to rotatably connect and disconnect the first and second HP line connector portions, whereby rotatable disengagement of the first and second HP line connector portions disengages the first and second HP fluid flow lines from one another;

at least a first rotation driver disposed on the disconnect trailer and configured to engage and rotate at least part of one of the first and second HP line connector portions into and out of engagement with at least part of the other respective HP line connector portion without any personnel in the red zone;

a first portion of a LP line connector associated with the first LP line and a second portion of the LP line connector associated with the second LP line, at least part of each of the first and second LP line connector portions being rotatably engageable with and disengageable from at least part of the other respective LP line connector portion to rotatably connect and disconnect the first and second LP line connector portions, whereby rotatable disengagement of the first and second LP line connector portions disengages the first and second LP lines from one another;

at least a second rotation driver disposed on the disconnect trailer and configured to engage and rotate at least part of one of the first and second LP line connector portions into and out of engagement with at least part of the other respective LP line connector portion without any personnel in the red zone; and at least one switch configured to actuate the first and second drivers and be selectively operable by personnel outside the red zone, whereby the disconnect trailer is configured to be movable with the frac pump carrier away from the frac missile and red zone after the first and second HP flow lines and the first and second LP flow lines are disconnected, respectively.

2. The system of claim 1 further including at least one actuator associated with the first and second rotation drivers, disposed on the disconnect trailer and configured to selectively rotate the first and second rotation drivers without any personnel in the red zone, wherein the at least one switch is configured to actuate the at least one actuator.

3. The system of claim 2 wherein the at least one actuator includes first and second actuators, the first actuator being associated with and configured to selectively rotate the first rotation driver and the second actuator associated with and configured to selectively rotate the second rotation driver.

4. The system of claim 3 wherein the at least one switch includes first and second switches, the first switch being associated with and configured to actuate the first actuator and the second switch being associated with and configured to actuate the second actuator.

5. The system of claim 1 wherein the first and second portions of the HP line connector are threadably engageable, at least part of one of the first and second HP line connector portions having male threads and at least part of the other of the first and second HP line connector portions includes corresponding female threads engageable with the male threads.

6. The system of claim 5 wherein one of the first and second HP line connector portions include a threaded nut rotatably engageable with the other respective HP line connector portion, further wherein the first rotation driver is configured to engage and rotate the threaded nut.

7. The system of claim 6 wherein the HP line connector is a hammer union (HU) connector and the first HP line connector portion includes a HU nut that is rotatable into and out of threadable engagement with the second HP connector portion, whereby the first rotation driver is configured to engage and rotate the HU nut.

8. The system of claim 6 wherein the HP line connector is a HU connector and the second HP line connector portion includes a HU nut that is rotatable into and out of threadable engagement with the first HP connector portion, whereby the first rotation driver is configured to engage and rotate the HU nut.

9. The system of claim 1 wherein the at least one switch includes at least one manually-operated “on-off” lever or button.

10. The system of claim 1 wherein the at least one switch includes at least one key of an electronic device.

11. The system of claim 1 wherein the at least one switch involves a keystroke of an electronic device.

12. The system of claim 1 further including at least a first gear wheel rotatably coupled to the first rotation driver, the first gear wheel being configured to be selectively actuated to help rotate the first rotation driver.

13. The system of claim 12 further including a first gearbox disposed on the disconnect trailer and having front and rear ends, the front end being configured to be closer to the frac missile and the rear end being configured to be closer to the frac pump during operation of the first rotation driver, the first gearbox at least partially housing the first rotation driver and first gearwheel.

14. The system of claim 13 wherein the first and second portions of the HP line connector are threadably engageable, at least part of the first HP line connector portion having male threads and at least part of the second HP line connector portion having corresponding female threads, further including a HP fluid flow connection line coupled between the first and second HP fluid flow lines, the HP fluid flow connection line including at least a first pipe section which is coupled to the first HP fluid flow line and carries the first HP line connector portion and at least a second pipe section which is coupled to the second HP fluid flow line and carries the second HP line connector portion, wherein the first and second pipe sections of the HP fluid flow connection line are configured to be engaged and disengaged to connect and disconnect the first and second HP fluid flow lines, whereby the first pipe section is configured to extend from the first HP fluid flow line into the first gearbox from the rear end toward the front end thereof and the second pipe section is configured to extend from the second HP fluid flow line to the front end of the first gearbox.

15. The system of claim 14 further including at least one stop associated with the first pipe section and configured to prevent the first pipe section from sliding forward in the first gearbox during disconnection of the first and second pipe sections.

16. The system of claim 14 further including a first yoke configured to be rigidly engageable with the second pipe section and releasably engageable with the first gearbox, the first yoke being further configured to prevent rotation of the second pipe section during actuation of the first rotation driver.

17. A system for rotatably disconnecting a first high-pressure (HP) fluid flow line fluidly coupled to a hydraulic fracturing (frac) pump from a second HP fluid flow line fluidly coupled to a frac missile without any personnel in the red zone, the frac pump being disposed on a frac pump carrier, the system comprising:

at least one HP fluid flow connection line fluidly coupled between the first and second HP fluid flow lines, the at least one HP fluid flow connection line including at least a first pipe section fluidly coupled to the first HP fluid flow line and carrying a male threaded portion of a connector and at least a second pipe section fluidly coupled to the second HP fluid flow line and carrying a female threaded portion of the connector, wherein the first and second pipe sections are configured to be engaged and disengaged to connect and disconnect the first and second HP fluid flow lines;

a wheeled carrier separate and distinct from the frac pump, frac pump carrier and frac missile, the wheeled carrier being movable toward and away from the frac missile into and out of the red zone;

at least a first rotation driver disposed on the wheeled carrier and configured to engage and rotate the male threaded portion of the connector into and out of engagement with the female threaded portion of the connector without any personnel in the red zone;

a first gearbox disposed on the wheeled carrier, having front and rear ends and at least partially housing the first rotation driver, the front end of the first gearbox being configured to be closer to the frac missile and the rear end thereof being configured to be closer to the frac pump, wherein the first pipe section is configured to extend from the first HP fluid flow line into the first gearbox from the rear end toward the front end thereof and the second pipe section is configured to extend from the second HP fluid flow line to the front end of the first gearbox; and a first yoke rigidly engageable with and rotationally lockable to the second pipe section, the first yoke being releasably engageable with the first gearbox at at least two locations and configured to prevent rotation of the second pipe section in any direction during actuation of the first rotation driver.

18. The system of claim 17 wherein the first yoke is configured to releasable couple the second pipe section to the first gearbox.

19. The system of claim 18 wherein the first yoke includes a main body having at least first and second opposing sides, the first yoke further including first and second arms extending laterally from the main body from the first and second sides thereof, respectively, each arm being rigidly releasably engageable with the first gearbox.

20. The system of claim 17 wherein the first gearbox is coupled to the wheeled carrier with an upwardly-biased floating plate and a plurality of fasteners associated therewith, each fastener providing a gap below the floating plate and configured to allow the floating plate to move up and down in the gap.

21. The system of claim 17 further including at least a first gear wheel rotatably coupled to the first rotation driver and housed in the first gearbox, the first gear wheel being configured to be selectively actuated to rotate the first rotation driver.

22. The system of claim 17 wherein the first gearbox does not include any gear assembly components.

23. The system of claim 17 further including at least one stop associated with the first pipe section and configured to prevent the first pipe section from sliding forward in the first gearbox during disconnection of the first and second pipe sections.

* * * * *